(12) United States Patent (10) Patent No.: US 9,036,012 B2
Lee et al. (45) Date of Patent: May 19, 2015

(54) 3D VIEWING DEVICE, IMAGE DISPLAY APPARATUS, AND METHOD FOR OPERATING THE SAME

(75) Inventors: Hyungnam Lee, Seoul (KR); Uniyoung Kim, Seoul (KR); Sangjun Koo, Seoul (KR); Saehun Jang, Seoul (KR); Gangseub Lee, Seoul (KR); Heesu Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 615 days.

(21) Appl. No.: 13/197,939

(22) Filed: Aug. 4, 2011

(65) Prior Publication Data

US 2012/0056876 A1 Mar. 8, 2012

(30) Foreign Application Priority Data

Aug. 9, 2010 (KR) .......................... 10-2010-0076595
Aug. 24, 2010 (KR) .......................... 10-2010-0082141
Sep. 13, 2010 (KR) .......................... 10-2010-0089608
Sep. 13, 2010 (KR) .......................... 10-2010-0089609

(51) Int. Cl.
*G09G 5/00* (2006.01)
*H04N 13/04* (2006.01)
*H04N 13/00* (2006.01)

(52) U.S. Cl.
CPC ............ *H04N 13/047* (2013.01); *H04N 13/004* (2013.01); *H04N 13/007* (2013.01); *H04N 13/0434* (2013.01); *H04N 13/0438* (2013.01); *H04N 13/045* (2013.01); *H04N 13/0497* (2013.01); *H04N 2013/0465* (2013.01); *H04N 13/0018* (2013.01)

(58) Field of Classification Search
CPC .......... H04N 13/0051; H04N 13/0434; H04N 13/047
USPC ....................................... 348/54–58, E13.037
See application file for complete search history.

(56) References Cited

U.S. PATENT DOCUMENTS

| | | | |
|---|---|---|---|
| 2002/0118400 A1* | 8/2002 | Koshimizu et al. ........... | 358/472 |
| 2005/0036673 A1 | 2/2005 | Ohba et al. .................... | 382/154 |
| 2008/0231926 A1* | 9/2008 | Klug et al. ..................... | 359/23 |
| 2008/0310018 A1 | 12/2008 | Tripp ............................. | 359/483 |
| 2009/0282429 A1* | 11/2009 | Olsson et al. .................. | 725/10 |
| 2010/0188489 A1 | 7/2010 | Mashitani et al. ............. | 348/53 |
| 2010/0188498 A1 | 7/2010 | Minamide ....................... | 348/80 |
| 2011/0025821 A1* | 2/2011 | Curtis et al. .................... | 348/43 |
| 2011/0254829 A1* | 10/2011 | Agevik et al. .................. | 345/213 |

OTHER PUBLICATIONS

European Search Report issued in related Application No. 11176387.6 dated Mar. 4, 2014.
Chinese Office Action issued in Application No. 201110300126.7 dated Sep. 1, 2014.

* cited by examiner

*Primary Examiner* — Christopher S Kelley
*Assistant Examiner* — Jonathan Messmore
(74) *Attorney, Agent, or Firm* — Ked & Associates, LLP

(57) ABSTRACT

An image display apparatus and a method for operating the same are disclosed herein. The image display apparatus may include a display to display a 3D image having a left-eye image and a right-eye image, a sensor to detect positions of a first viewing device and a second viewing device for viewing the 3D image, and a controller configured control a perceived view of the 3D image viewed through the viewing devices. The perceived view of the 3D image may be changed based on a position of the viewing devices or the user relative to the display.

16 Claims, 60 Drawing Sheets (b)

FIG.4A
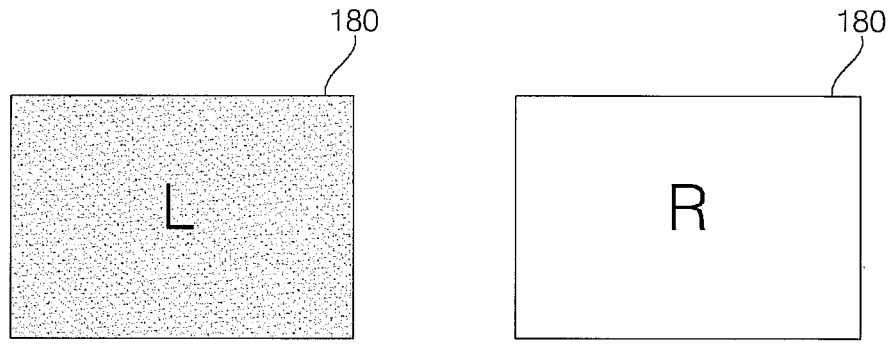
FIG.4B
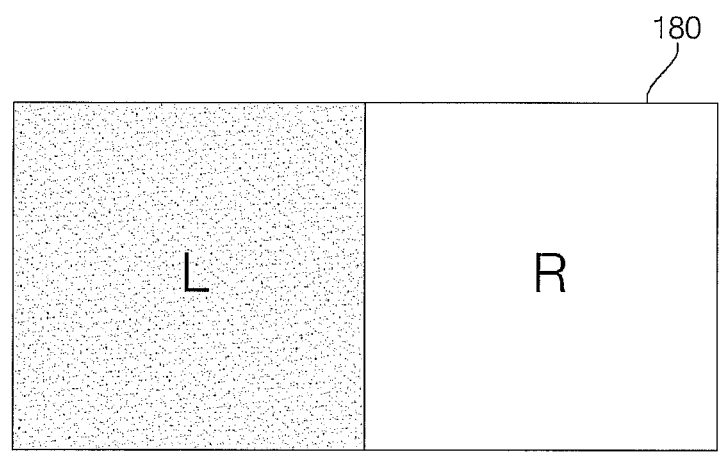
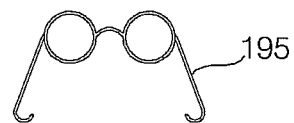

FIG.7A
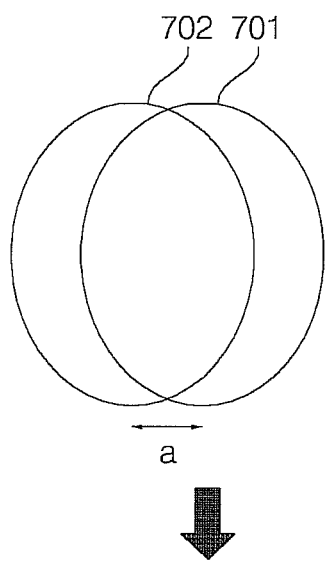
FIG.7B
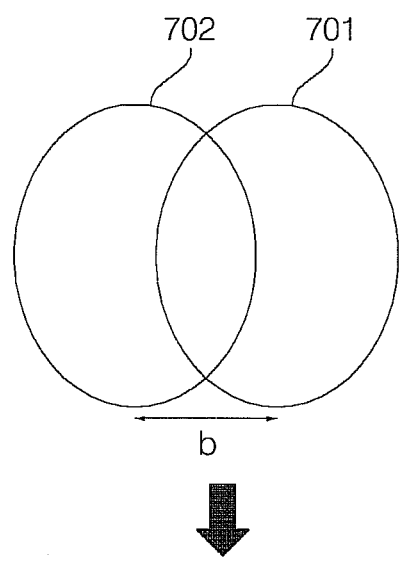
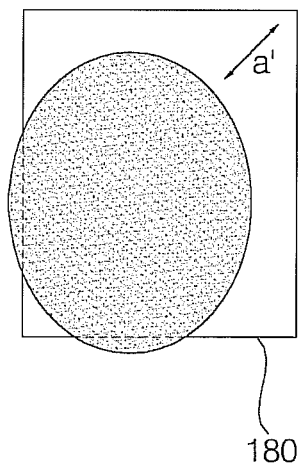
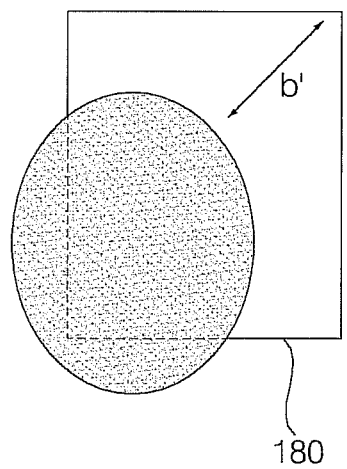

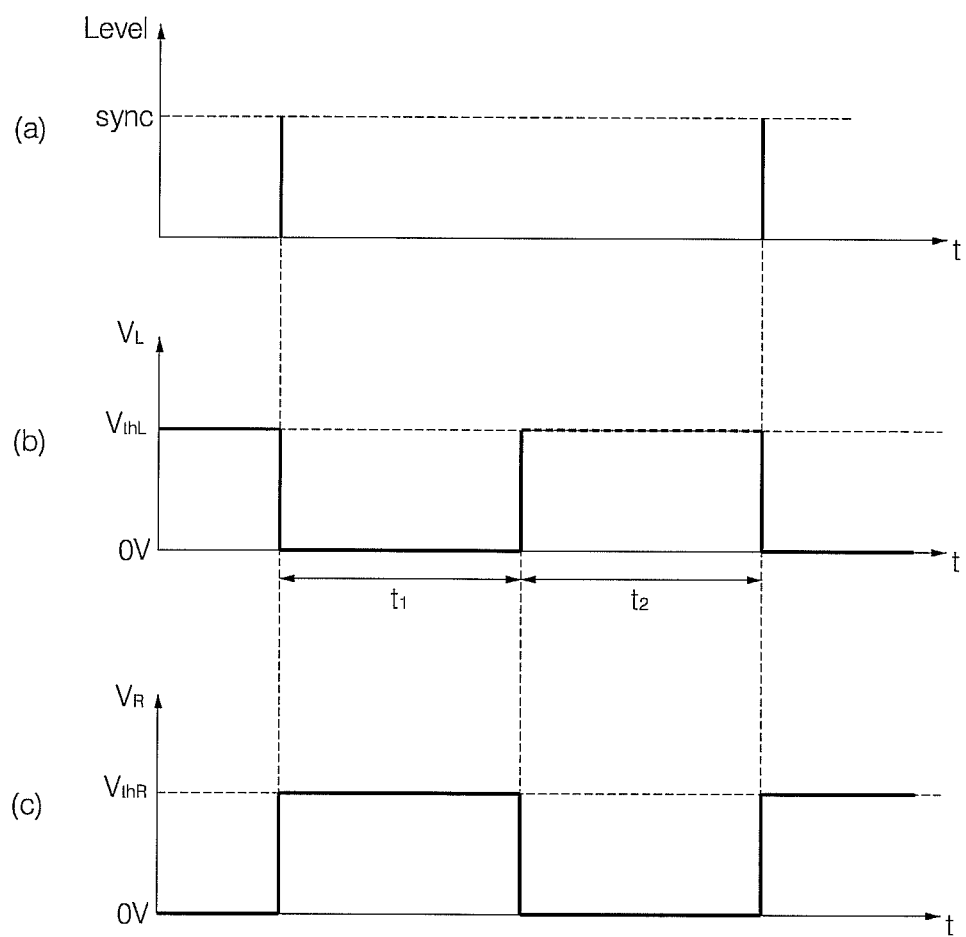

3D VIEWING DEVICE, IMAGE DISPLAY APPARATUS, AND METHOD FOR OPERATING THE SAME

CROSS-REFERENCE TO RELATED APPLICATION(S)

This application claims the benefit of Korean Application Nos. 10-2010-0076595, filed in Korea on Aug. 9, 2010 and 10-2010-0082141, filed in Korea on Aug. 24, 2010 and 10-2010-0089608, filed in Korea on Sep. 13, 2010 and 10-2010-0089609, filed in Korea on Sep. 13, 2010 in the Korean Intellectual Property Office, the disclosures of which are incorporated herein by reference in their entirety.

BACKGROUND

1. Field

A 3D viewing device, image display apparatus, and method for operating the same are disclosed herein.

2. Background 3D viewing devices, image display apparatuses, and methods for operating the same are known. However, they suffer from various disadvantages.

BRIEF DESCRIPTION OF THE DRAWINGS

The embodiments will be described in detail with reference to the following drawings in which like reference numerals refer to like elements wherein:

FIGS. 4A and 4B illustrate an operation of a 3D viewing device according to a format as shown in FIG. 3;

FIGS. 7A and 7B illustrate a difference in a perceived depth of a 3D image according to a distance between a left-eye image and a right-eye image;

FIGS. 22A to 25B illustrate various examples of the method for operating a 3D viewing device of FIG. 21;

DETAILED DESCRIPTION

The present application or patent relates to a 3D viewing device, an image display apparatus, and a method for operating the same, and more particularly to a 3D viewing device, an image display apparatus, and a method for operating the same which allow users to reliably (or correctly) view 3D images.

An image display apparatus is an apparatus which can display an image that can be viewed by the user. The user can view broadcasts through the image display apparatus. The image display apparatus may display a broadcast that the user has selected from among broadcasts transmitted by a broadcast station.

Digital video and audio signals may be transmitted over broadcast signals. Compared to analog broadcasting, digital broadcasting is more robust with respect to external noise, resulting in less data loss, and is also advantageous in terms of error correction while providing clear, high-resolution images or screens. Digital broadcasting can also provide bi-directional services, unlike analog broadcasting. Moreover, digital video and audio signals may allow displaying of stereoscopic images. Stereoscopic images and stereoscopic image technologies may be used not only in computer graphics but also in various other environments and technologies.

The word "module" or "unit", which is added to the end of terms describing components, is used merely for ease of explanation in the present disclosure. However, such terminology is not intended to limit the scope of the present disclosure to a means plus function element. The words "module" and "unit" may be used interchangeably.

Figure 1:
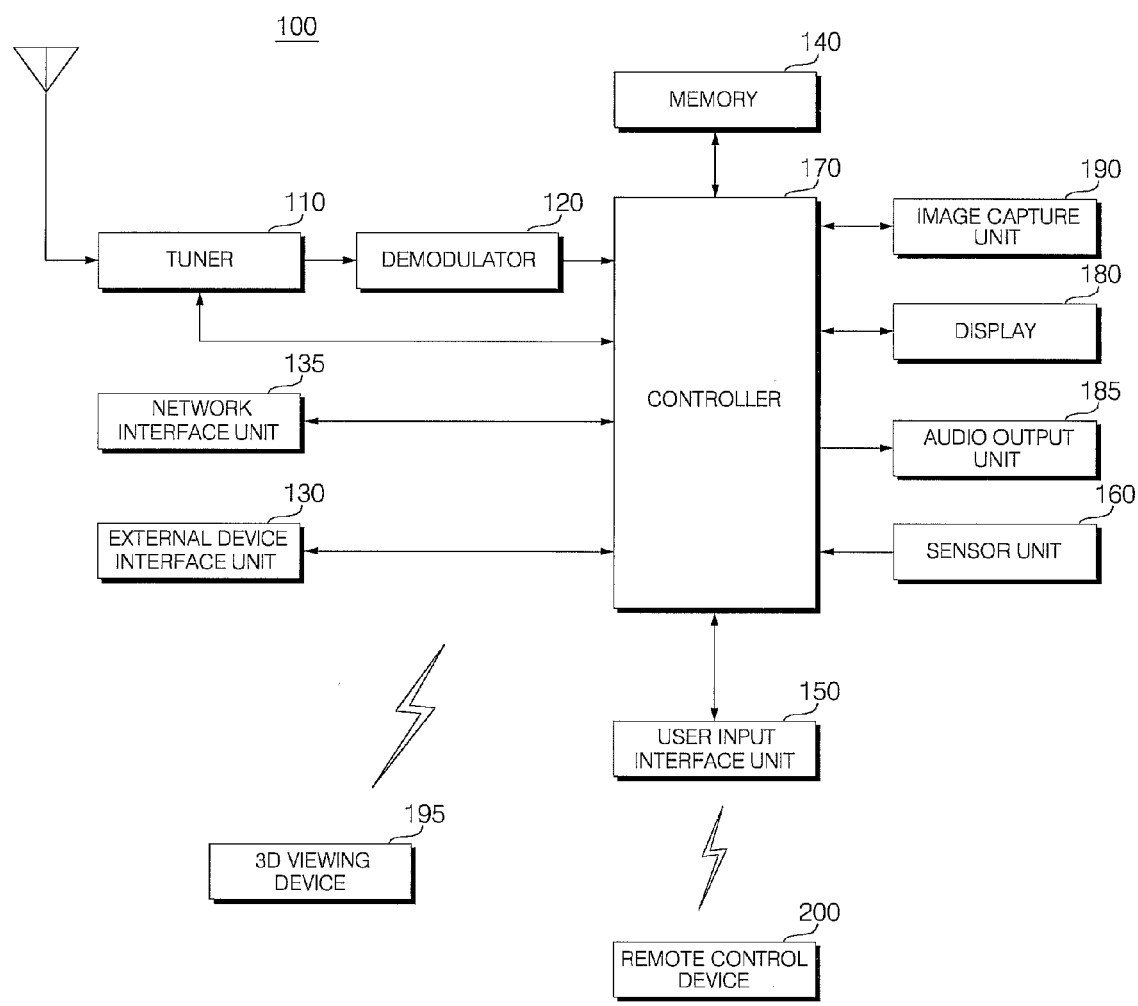
FIG. 1 is a block diagram showing an image display apparatus according to an embodiment of the present disclosure.

FIG. 1 is a block diagram showing an image display apparatus according to an embodiment of the present disclosure. The image display apparatus 100 according to the embodiment of the present disclosure may include a tuner 110, a demodulator 120, an external device interface unit 130, a network interface unit 135, a memory 140, a user input interface unit 150, a sensor unit 160, a controller 170, a display 180, an audio output unit 185, an image capture unit 190, and a 3D viewing device 195.

The tuner 110 may tune to a Radio Frequency (RF) broadcast signal corresponding to a channel selected by a user from among RF broadcast signals received through an antenna or corresponding to each of all stored channels. The tuned RF broadcast signal may be converted into an Intermediate Frequency (IF) signal or a baseband video or audio signal.

For example, if the tuned RF broadcast signal is a digital broadcast signal, the tuned RF broadcast signal may be converted into a digital IF (DIF) signal and, if the tuned RF broadcast signal is an analog broadcast signal, the tuned RF broadcast signal may be converted into an analog baseband video/audio signal (Composite Video Baseband Signal (CVBS)/Sound IF (SIF)). For example, the tuner 110 may process a digital broadcast signal or an analog broadcast signal. The analog baseband video/audio signal (CVBS/SIF) output from the tuner 110 may be directly input to the controller 170.

In addition, the tuner 110 may receive a single-carrier RF broadcast signal according to an Advanced Television System Committee (ATSC) scheme or a multiple-carrier RF broadcast signal according to a Digital Video Broadcasting (DVB) scheme. In the present disclosure, the tuner 110 may sequentially tune to the RF broadcast signals of all the broadcast channels stored through a channel storage function among the RF broadcast signals received through the antenna, and convert the signals into IF signals or baseband video or audio signals.

The demodulator 120 may receive the converted DIF signal from the tuner 110 for demodulation. For example, if the DIF signal output from the tuner 110 is based on the ATSC system, the demodulator 120 may perform a 8-Vestigial Side Band (VSB) modulation. In addition, the demodulator 120 may perform channel decoding. The demodulator 120 may include a trellis decoder, a deinterleaver, a Reed-Solomon decoder, or the like, to perform trellis decoding, deinterleaving, and/or Reed-Solomon decoding.

For example, if the DIF signal output from the tuner 110 is based on the DVB system, the demodulator 120 may demodulate the signal based on Coded Orthogonal Frequency Division Multiple Access (COFDMA) modulation. In addition, the demodulator 120 may perform channel decoding. The demodulator 120 may include a convolutional decoder, a deinterleaver, a Reed-Solomon decoder, or the like, to perform convolutional decoding, deinterleaving or Reed-Solomon decoding.

The demodulator 120 may perform demodulation and channel decoding, and then may output a Transport Stream (TS) signal. The TS signal may be a signal in which an image signal, an audio signal, and a data signal are multiplexed. For example, the TS signal may be an MPEG-2 TS in which an MPEG-2 image signal, a Dolby AC-3 audio signal, or the like are multiplexed. Specifically, the MPEG-2 TS may include a 4-byte header and a 184-byte payload.

The demodulator 120 may include separate demodulators according to the ATSC scheme and the DVB scheme. For example, the demodulator 120 may include an ATSC modulator and a DVB demodulator. The TS signal output from the demodulator 120 may be input to the controller 170. The controller 170 may perform demultiplexing, image/audio signal processing, or the like, and then may output an image through the display 180 and audio through the audio output unit 185.

The external device interface 130 may transmit or receive data to or from an external device connected to the interface 130. To accomplish this, the external device interface 130 may include an A/V input/output unit or a wireless communication unit.

The external device interface 130 may be connected to the external device such as a Digital Versatile Disc (DVD) player, a Blu-ray player, a game console, a camcorder, or a computer (e.g., desktop or notebook) in a wired/wireless manner. The external device interface unit 130 may send an image signal, an audio signal, or a data signal received from the connected external device to the controller 170 of the image display apparatus 100.

The image signal, the audio signal, or the data signal processed by the controller 170 may be output to the connected external device. To accomplish this, the external device interface unit 130 may include an A/V input/output interface or a wireless communication interface. The A/V input/output interface may include a Universal Serial Bus (USB) port, a CVBS terminal, a component terminal, an S-video terminal (analog), a Digital Visual Interface (DVI) terminal, a High Definition Multimedia Interface (HDMI) terminal, an RGB terminal, a D-SUB terminal, or another appropriate type of an interface to transfer the image signal and the audio signal from the external device to the image display apparatus 100.

The wireless communication unit may perform wireless Local Area Network (LAN) communication with another electronic device. The image display apparatus 100 may be connected to another electronic device over a network according to a communication standard such as Bluetooth, Radio Frequency Identification (RFID), Infrared Data Association (IrDA), Ultra Wideband (UWB), ZigBee, Digital Living Network Alliance (DLNA), or another appropriate type of communication standard.

In addition, the external device interface 130 may be connected to various set-top boxes through at least one of the above-described various terminals so as to perform an input/output operation with the set-top boxes. The external device interface unit 130 may transmit or receive data to or from the 3D viewing device 195.

The network interface 135 may provide an interface for connecting the image display apparatus 100 to a wired/wireless network including an Internet network. The network interface 135 may include an Ethernet port for connection with a wired network. The network interface unit 135 may also use communication standards such as wireless LAN (WLAN) (Wi-Fi), wireless broadband (Wibro), world interoperability for microwave access (WiMax), high speed downlink packet access (HSDPA), or another appropriate type of wireless communication standard for connection with a wireless network.

The network interface 135 may receive content or data provided by an Internet or content provider or a network manager over a network. For example, the network interface 135 may receive content such as movies, advertisements, games, VOD, broadcast signals, or another appropriate type of content or data, as well as information associated with the content provided by the Internet or content provider over a network. In addition, the network interface 135 may receive update information and update files (e.g., firmware updates) provided by the network manager. In addition, the network interface 135 may transmit data to the Internet or content provider or to the network manager. In addition, the network interface 135 may be connected to, for example, an Internet Protocol TV (IPTV) to receive and transmit an image, audio, or data signal processed by a set-top box for the IPTV to the controller 170 and to transmit signals processed by the controller 170 to the set-top box for the IPTV in order to enable bidirectional communication.

The IPTV may include an ADSL-TV, a VDSL-TV, an FTTH-TV, or the like, according to the type of the transmission network or may include a TV over DSL, a Video over DSL, a TV over IP (TVIP), a Broadband TV (BTV), or the like. In addition, the IPTV may include an Internet TV capable of Internet access or a full-browsing TV.

The memory 140 may store a program for performing signal processing and control in the controller 170 and may store a processed image, audio or data signal. In addition, the memory 140 may temporarily store an image, audio, or data signal input through the external device interface unit 130. In addition, the memory 140 may store information about predetermined broadcast channels through a channel storage function such as a channel map.

The memory 140 may include at least one of a flash memory storage medium, a hard disk storage medium, a multimedia card micro medium, a card memory (e.g., SD memory, XD memory, or the like), a RAM, a ROM (EEPROM or the like), or another appropriate type of storage device. The image display apparatus 100 may reproduce and provide a file, such as a moving image file, a still image file, a music file, a document file, or the like, stored in the memory 140 to the user.

Although FIG. 1 shows an example in which the memory 140 is provided separately from the controller 170, the present disclosure is not limited to this example. For example, the memory 140 may be included in the controller 170.

The user input interface 150 may transfer a signal input by the user to the controller 170 or transfer a signal from the controller 170 to the user. For example, the user input interface 150 may receive a user input signal, such as power on/off, channel selection or screen setup signal from a remote control device 200, or may transmit a signal from the controller 170 to the remote control device 200 according to various communication schemes such as a Radio Frequency (RF) communication scheme or an Infrared (IR) communication scheme. In addition, for example, the user input interface unit 150 may transmit a user input signal input through use of a local key such as a power key, a channel key, a volume key, or a setup value to the controller 170.

The sensor unit 160 may sense the position of or gestures made by the user or the position of the 3D viewing device 195. To accomplish this, the sensor unit 160 may include a touch sensor, a voice sensor, a position sensor, a motion sensor, a gyro sensor, or the like. A signal indicating the sensed position or gesture of the user or the sensed position of the 3D viewing device 195 may be input to the controller 170. While FIG. 1 shows the sensor connected directly to the controller 170, the sensor signal may also be input to the controller 170 through the user input interface 150.

The controller 170 may demultiplex the TS signal input through the tuner 110, the demodulator 120, or the external device interface unit 130 or may process demultiplexed signals to generate and output image or audio signals. The image signal processed by the controller 170 may be input to the display 180 such that an image corresponding to the image signal is displayed on the display 180. The image signal processed by the controller 170 may also be input to an external output device through the external device interface 130.

The audio signal processed by the controller 170 may be audibly output through the audio output unit 185. In addition, the audio signal processed by the controller 170 may be input to an external output device through the external device interface 130. Although not shown in FIG. 1, the controller 170 may also include a demultiplexer, an image processor, or the like, as described in further detail with reference to FIG. 2 hereinafter.

The controller 170 may be configured to control the overall operation of the image display apparatus 100. For example, the controller 170 may control the tuner 110 to tune to an RF broadcast corresponding to a channel selected by the user or a stored channel. In addition, the controller 170 may control the image display apparatus 100 according to a user command input through the user input interface 150 or an internal program.

For example, the controller 170 may control the tuner 110 to receive the signal of a channel selected according to a predetermined channel selection command received through the user input interface 150. The controller 170 then may process the image, audio, or data signal of the selected channel. The controller 170 may allow information of the channel selected by the user to be output through the display 180 or the audio output unit 185 together with the image or audio signal. In another example, the controller 170 may allow an image or audio signal received from the external device, for example, a camera or a camcorder, through the external device interface 130 to be output through the display 180 or the audio output unit 185 according to an external device image reproduction command received through the user input interface unit 150.

The controller 170 may control the display 180 to display an image. For example, the controller may allow a broadcast image input through the tuner 110, an external input image input through the external device interface unit 130, an image input through a network interface unit 135, or an image stored in the memory 140 to be displayed on the display 180. Here, the image displayed on the display 180 may be a still image, a moving image, a 2D image, or a 3D image.

The controller 170 may generate and display a predetermined object in the image displayed on the display 180 as a 3D object. For example, the object may be at least one of a web page (newspaper, magazine, or the like), an Electronic Program Guide (EPG), various menus, a widget, an icon, a still image, a moving image, text, or another appropriate type of graphical image. Such a 3D object may be configured to have a perceived depth which is different from that of the image displayed on the display 180. For example, the 3D object may be configured such that the 3D object appears to be located in front of the image displayed on the display 180, e.g., appears to protrude or recede into the display ore relative to the image.

The controller 170 may determine a user's position based on an image captured using the image capture device 190. The controller 170 can obtain, for example, a distance (z-axis coordinate) between the user and the image display apparatus 100. In addition, the controller can obtain an X-axis coordinate and a y-axis coordinate on the display 180 corresponding to the user's position.

On the other hand, the image display apparatus 100 may further include a channel browsing processing unit to generate a thumbnail image corresponding to a channel signal or an external input signal. The channel browsing processing unit may receive a Transport Stream (TS) signal output from the demodulator 120 or a TS signal output from the external device interface 130, extract an image from the received TS signal, and generate a thumbnail image which may include a video image or still image. The generated thumbnail image may be input to the controller 170 without conversion or after being encoded.

In addition, the generated thumbnail image may be input to the controller 170 after being encoded into a stream format. The controller 170 may display a thumbnail list including a plurality of thumbnail images on the display 180 using the received thumbnail images. The thumbnail list may be displayed in a brief viewing manner in which the thumbnail list is displayed in a portion of the display 180 on which an image is being displayed, or in a full viewing manner in which the thumbnail list is displayed over most of the display 180. Thumbnail images in the thumbnail list may be sequentially updated.

The display 180 may convert an image signal, a data signal, an OSD signal or a control signal processed by the controller 170 or an image signal, data signal or a control signal received through the external device interface unit 130 and may generate a drive signal. The display 180 may include a Plasma Display Panel (PDP), a Liquid Crystal Display (LCD), an Organic Light Emitting Diode (OLED) display, a flexible display, or another appropriate type of display device. The display 180 may include a 3D display according to an embodiment of the present disclosure.

The display 180 for 3D image viewing may be divided into a supplementary display type and a single display type. In the single display type, a 3D image may be implemented on the display 180 without a separate subsidiary device, e.g., glasses. Examples of the single display type may include various types such as a lenticular type and a parallax barrier type.

In the supplementary display type, 3D imagery is implemented using a subsidiary device as a 3D viewing device 195, in addition to the display 180. Examples of the supplementary display type include various types such as a Head-Mounted Display (HMD) type and a glasses type. The glasses type may be divided into a passive type such as a polarized glasses type and an active type such as a shutter glasses type. The HMD type may be divided into a passive type and an active type.

Simply for ease of discussion, the embodiments of the present disclosure will be described wherein the 3D viewing device 195 is a 3D glasses type that enables 3D image viewing. The 3D glasses 195 may include passive-type polarized glasses or active-type shutter glasses. The 3D glasses 195 will also be described as conceptually including the HMD type.

The display 180 may include a touch screen and function as an input device as well as an output device. The audio output unit 185 may receive the audio signal processed by the controller 170, for example, a stereo signal, a 3.1 channel signal, or a 5.1 channel signal, and may output corresponding audio. The audio output unit 185 may be implemented using various types of speakers.

The image capture device 190 may be used to capture an image, for example, an image of the user. Although the image capture device 190 may be implemented using one camera, the present disclosure is not limited to one camera, and the image capture unit 190 may be implemented using a plurality of cameras. The image capture unit 190 may be provided on an upper portion of the display 180. Image information/data of the image captured by the image capture unit 190 may be input to the controller 170. Moreover, the controller 170 may sense user gestures by the image captured using the image capture unit 190, the signal sensed using the sensing unit 160, or a combination thereof.

The remote control device 200 may transmit a user input signal to the user input interface 150. To accomplish this, the remote control device 200 may use Bluetooth, Radio Frequency Identification (RFID) communication, IR communication, Ultra Wideband (UWB), ZigBee, or another appropriate wireless communication protocol. The remote control device 200 may receive the image, audio, or data signal output from the user input interface 150 and may then display or audibly output the received signal.

The image display apparatus 100 may be a fixed digital broadcast receiver capable of receiving at least one of an ATSC (8-VSB) digital broadcast, a DVB-T (COFDM) digital broadcast, an ISDB-T (BST-OFDM) digital broadcast, or the like, or a mobile digital broadcast receiver capable of receiving at least one of a terrestrial DMB digital broadcast, a satellite DMB digital broadcast, an ATSC-M/H digital broadcast, a DVB-H (COFDM) digital broadcast, a media forward link only digital broadcast, or the like. In addition, the image display apparatus 100 may be a cable, satellite, or IPTV digital broadcast receiver.

The image display apparatus described in the present disclosure may include a TV receiver, a mobile phone, a smart phone, a notebook computer, a digital broadcast terminal, a Personal Digital Assistant (PDA), a Portable Multimedia Player (PMP), or the like. FIG. 1 is a block diagram of the image display apparatus 100 according to one embodiment of the present disclosure. Some of the components of the image display apparatus 100 shown in the block diagram may be combined or omitted or other components may be added thereto according to the specifications of the image display apparatus 100 that is actually implemented. For example, two or more components of the image display apparatus 100 may be combined into one component or one component thereof may be divided into two or more components as necessary. The functions of the components described below are merely examples to facilitate description of the embodiments of the present disclosure, and specific operations and units thereof do not limit the scope of the present disclosure.

Figure 2:
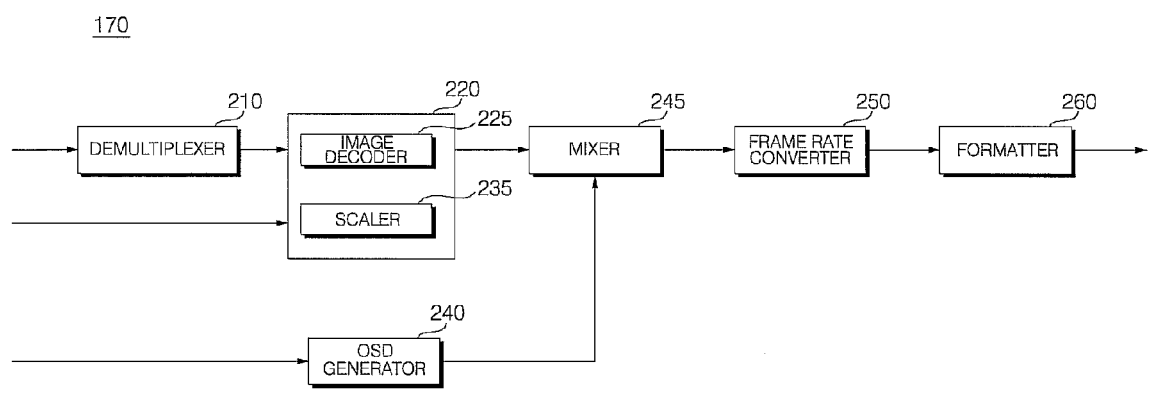
FIG. 2 is a block diagram of a controller shown in FIG. 1.
Figure 3A:
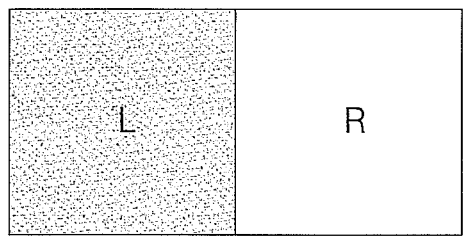
FIGS. 3A to 3E illustrate various formats for displaying a 3D image.

FIG. 2 is a block diagram showing the controller shown in FIG. 1, FIGS. 3A to 3E illustrate various formats for displaying a 3D image, and FIGS. 4A to 4B illustrate an operation of a 3D viewing device according to a format as shown in FIG. 3A. Referring to FIG. 2, the controller 170 according to one embodiment of the present disclosure may include a demultiplexer 210, an image processor 220, an OSD generator 240, a mixer 245, a Frame Rate Converter (FRC) 250, and a formatter 260. The controller 170 may further include an audio processor 230 and a data processor.

The demultiplexer 210 may demultiplex an input TS signal. For example, if an MPEG-2 TS signal is input, the demultiplexer may demultiplex the MPEG-2 TS signal into image, audio, and data signals. The TS signal input to the demultiplexer 210 may be a TS signal output from the tuner 110, the demodulator 120, or the external device interface unit 130. The image processing unit 220 may perform image processing upon the demultiplexed image signal. The image processing unit 220 may include an image decoder 225 and a scaler 235.

The image decoder 225 may decode the demultiplexed image signal and the scaler 235 may adjust the resolution of the decoded image signal such that the image signal can be output through the display 180. The image decoder 225 may include various types of decoders. For example, the image decoder 225 may include at least one of an MPEG-2 decoder, an H.264 decoder, an MPEG-C decoder (MPEG-C part 3), an MVC decoder, an FTV decoder, or another appropriate decoder based on the protocol implemented. The image signal decoded by the image processing unit 220 may include a 2D image signal alone, a mixture of a 2D image signal and a 3D image signal, or a 3D image signal alone.

For example, an external image signal received from the image capture unit 190 or a broadcast image signal of a broadcast signal received through the tuner 110 may include a 2D image signal alone, a mixture of a 2D image signal and a 3D image signal, or a 3D image signal alone. Accordingly, the controller 170, specifically, the image processor 220 in the controller 170, may perform signal processing upon the external image signal or the broadcast image signal to output a 2D image signal alone, a mixture of a 2D image signal and a 3D image signal, or a 3D image signal alone.

The image signal decoded by the image processor 220 may include a 3D image signal in various formats. For example, the decoded image signal may be a 3D image signal including a color difference image and a depth image, or a 3D image signal including multi-view image signals. The multi-view image signals may include, for example, a left-eye image signal and a right-eye image signal.

As shown in FIGS. 3A to 3E, the format of the 3D image signal may include a side-by-side format (FIG. 3A) in which the left-eye image L and the right-eye image R are arranged in a horizontal direction, a top/down format (FIG. 3B) in which the left-eye image and the right-eye image are arranged in a vertical direction, a frame sequential format (FIG. 3C) in which the left-eye image and the right-eye image are arranged in a time division manner, an interlaced format (FIG. 3D) in which the left-eye image and the right-eye image are mixed in lines (i.e., interlaced), or a checker box format (FIG. 3E) in which the left-eye image and the right-eye image are mixed in boxes (i.e., box-interlaced).

The OSD generator 240 may generate an OSD signal according to a user input signal or automatically. For example, the OSD generator 240 may generate a signal for displaying a variety of information as graphics or text on the screen of the display 180 based on a user input signal. The generated OSD signal may include a variety of data such as a user interface screen, various menu screens, a widget, or an icon of the image display apparatus 100. The generated OSD signal may include a 2D object or a 3D object.

The mixer 245 may mix the OSD signal generated by the OSD generator 240 with the image signal decoded by the image processing unit 220. Here, each of the OSD signal and the decoded image signal may include at least one of a 2D signal or a 3D signal. The mixed image signal may be provided to the frame rate converter 250.

The frame rate converter 250 may convert the frame rate of the input image. For example, a frame rate of 60 Hz may be converted to 120 Hz or 240 Hz. In the case where the frame rate of 60 Hz is converted to 120 Hz, the frame rate converter 250 may insert a first frame between the first frame and a second frame, or may insert a third frame estimated from the first frame and the second frame between the first frame and the second frame. In the case where the frame rate of 60 Hz is converted into 240 Hz, the frame rate converter 250 may insert the same three frames or three estimated frames between the frames.

The frame rate converter 250 may also directly output an input image signal without frame rate conversion. Preferably, when a 2D image signal is input to the frame rate converter 250, the frame rate converter 250 may directly output the 2D image signal without frame rate conversion. On the other hand, when a 3D image signal is input, the frame rate converter 250 may convert the frame rate of the 3D image signal as described above.

The formatter 260 may receive the mixed signal (i.e., the mixture of the OSD signal and the decoded image signal) from the mixer 245 and separate the mixed signal into a 2D image signal and a 3D image signal. In the present specification, the 3D image signal may include a 3D object. Examples of such an object may include a Picture In Picture (PIP) image (still image or moving image), an EPG indicating broadcast program information, various menus, a widget, an icon, text, an object, a person or a background present in an image, a web page (newspaper, magazine, or the like), etc. The formatter 260 may change the format of the 3D image signal to, for example, any of the various formats as shown in FIGS. 3A to 3E. Accordingly, the operation of the glasses-type 3D viewing device may be performed as shown in FIG. 4.

FIG. 4A shows the operation of the 3D glasses 195 (specifically, shutter glasses type) when the formatter 260 arranges and outputs the 3D image signal in the frame sequential format from among the formats shown in FIG. 3. Specifically, a left portion of FIG. 4A shows the case where the left-eye glass (left-eye lens) of the shutter glasses 195 is opened and the right-eye glass (right-eye lens) of the shutter glasses is closed to display the left-eye image L on the display 180. The right portion of FIG. 4A shows the case where the left-eye glass of the shutter glasses 195 is closed and the right-eye glass of the shutter glasses is opened to display the right-eye image R on the display 180.

FIG. 4B shows the operation of the 3D glasses 195 (specifically, polarized glasses) when the formatter 260 arranges and outputs the 3D image signal in the side-by-side format from among the formats shown in FIG. 3. The 3D glasses 195 used in the case of FIG. 4B may also be shutter glasses. In this case, the shutter glasses may keep the left and right-eye glasses opened, and thus operate as polarized glasses.

The formatter 260 may switch a 2D image signal to a 3D image signal. For example, according to a 3D image generation algorithm, the formatter 260 may detect an edge or a selectable object from a 2D image signal and may then separate an object according to the detected edge or selectable object to generate a 3D image signal. The formatter 260 may then separate and arrange the generated 3D image signal into a left-eye image signal L and a right-eye image signal R as described above.

The controller 170 may further include a 3D processor for 3-dimensional (3D) effects signal processing, downstream of the formatter 260. The 3D processor may perform signal processing for brightness, tint, and color adjustment of an image signal in order to increase 3D effects. For example, the 3D processor may perform signal processing for making a near image portion clear and making a distant image portion unclear. The functions of the 3D processor may be incorporated into the formatter 260 or the image processor 220 as described in further detail with reference to FIGS. 5A to 5D hereinafter.

The audio processing unit 230 in the controller 170 may perform audio processing upon the demultiplexed audio signal. To accomplish this, the audio processing unit 230 may include various decoders. For example, when the demultiplexed audio signal is a coded audio signal, the audio processing unit may decode the coded audio signal. Specifically, when the demultiplexed audio signal is an audio signal encoded based on the MPEG-2 standard, the audio processing unit may decode the audio signal using an MPEG-2 decoder. When the demultiplexed audio signal is an audio signal coded based on the MPEG-4 Bit Sliced Arithmetic Coding (BSAC) standard according to a terrestrial DMB scheme, the audio processor may decode the audio signal using an MPEG-4 decoder.

When the demultiplexed audio signal is an audio signal coded based on the MPEG-2 Advanced Audio Codec (AAC) standard according to the satellite DMB or DVB-H scheme, the audio processor may decode the audio signal using an AAC decoder. When the demultiplexed audio signal is an audio signal coded based on the Dolby AC-3 standard, the audio processor may decode the audio signal using an AC-3 decoder. The audio processor 230 in the controller 170 may perform base and treble adjustment (equalization), volume adjustment, or the like.

The data processor in the controller 170 may perform data processing upon the demultiplexed data signal. For example, if the demultiplexed data signal is a coded data signal, the data processor may decode the coded data signal. The coded data signal may be EPG information including broadcast information such as a start time and an end time of a broadcast program broadcast through each channel. For example, the EPG information may include ATSC-Program and System Information Protocol (ATSC-PSIP) information in the ATSC system and include DVB-Service Information (DVB-SI) in the DVB system. The ATSC-PSIP information and the DVB-SI may be included in a (4-byte) header of the above-described TS, For example, the MPEG-2 TS.

Although, in the example of FIG. 2, the signals from the OSD generator 240 and the image processing unit 220 are mixed by the mixer 245 and are then subjected to 3D processing by the formatter 260, the present disclosure is not limited to the example of FIG. 2 and the mixer 245 may be located downstream of the formatter 260. For example, the formatter 260 may perform 3D processing upon the output of the image processing unit 220 to generate a 3D signal and the OSD generator 240 may generate an OSD signal and perform 3D processing upon the OSD signal to generate a 3D signal, and the mixer 245 may then mix the 3D signals.

The controller 170 shown in the block diagram of FIG. 2 is an embodiment of the present disclosure. Some of the components of the controller 170 may be combined or omitted or other components may be added thereto according to the type of the controller 170 that is actually implemented. In particular, the frame rate converter 250 and the formatter 260 may be individually provided outside the controller 170.

FIGS. 5A to 5D illustrate various scaling schemes of a 3D image signal according to an embodiment of the present disclosure. The controller 170 may perform 3D effects signal processing on the 3D image signal to increase 3D effects. Specifically, the controller 170 may perform signal processing to adjust the size or slope of a 3D object in the 3D image.

Figure 5A:
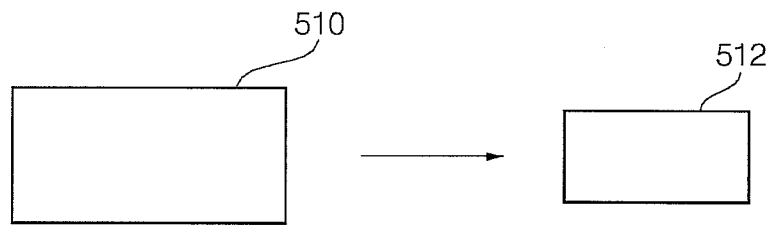
FIGS. 5A to 5D illustrate various scaling schemes of a 3D image signal according to an embodiment of the present disclosure.
Figure 5B:
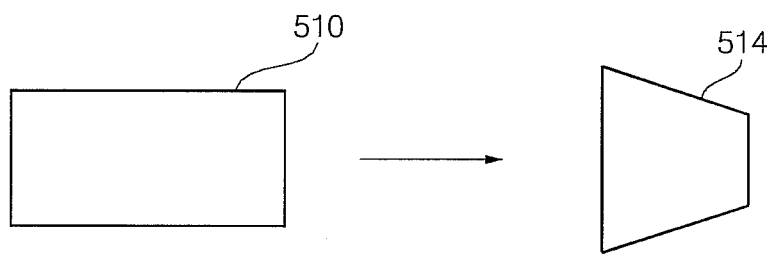
Figure 5C:
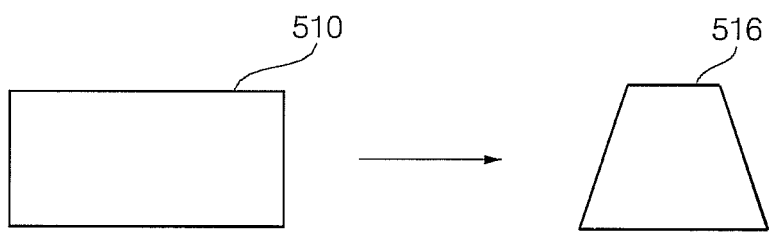
Figure 5D:
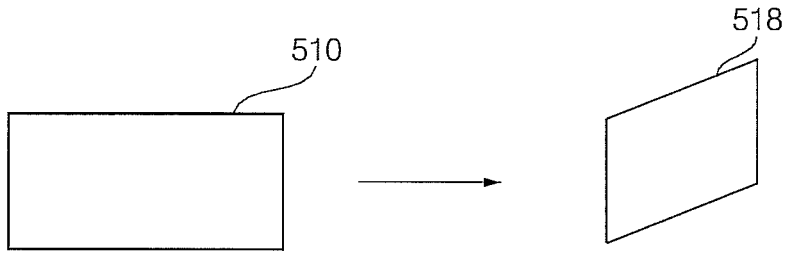

The controller 170 may enlarge or reduce a 3D image signal or a 3D object 510 in the 3D image signal by a specific ratio as shown in FIG. 5A, where the 3D object 510 is scaled to generate a reduced 3D object 512. In addition, the controller 170 may partially enlarge or reduce the 3D object 510 into trapezoidal forms 514 and 516 as shown in FIGS. 5B and 5C, respectively. The controller 170 may also rotate at least part of the 3D object 510 into a parallelogram form 518 as shown in FIG. 5D. The stereoscopic effect (i.e., 3D effect) of the 3D image or the 3D object in the 3D image can be emphasized to a greater extent through such scaling (i.e., size adjustment) or slope adjustment.

The difference between two parallel sides of the parallelogram 514 or 516 may be increased as the slope is increased, as shown in FIG. 5B or 5C, or the rotation angle may be increased as the slope is increased, as shown in FIG. 5D. The size adjustment or slope adjustment may be performed after the formatter 260 arranges the 3D image signal in a specific format. The size adjustment or slope adjustment may be performed by the scaler 235 in the image processor 220. The OSD generator 240 may generate an OSD object in any of the forms illustrated in FIGS. 5A to 5D to emphasize 3D effects.

Moreover, signal processing such as brightness, tint, or color adjustment, in addition to size or slope adjustments of FIG. 5, may be performed on an image signal or object to increase 3D effects. For example, signal processing may be performed to make a near portion clear and making a distant portion unclear (e.g., blurred or faded). Such 3D effects signal processing may be performed in the controller 170 or in a separate 3D processor. When the 3D effects signal processing is performed in the controller 170, the 3D effects signal processing may be performed, together with the size or slope adjustment, in the formatter 260 or may be performed in the image processing unit 220.

According to an embodiment of the present disclosure, signal processing for changing at least one of brightness, contrast, or tint of a 3D image or a 3D object of the 3D image or adjusting the size or slope of an object in the 3D image may be performed when the arrangement of the display 180 of the image display apparatus 100 is switched from an upright configuration to a horizontal configuration (e.g., display surface is parallel to the ground). This may improve the stereoscopic effects of the 3D image or 3D object compared to when the display 180 is arranged perpendicular to the ground, as described later with reference to FIG. 11. Moreover, the operational configuration of the image display apparatus 100 may be automatically changed to the horizontal configuration when the image display apparatus 100 is positioned within a prescribed angle with respect to the ground or from horizontal. It should be appreciated that the display mode (vertical or horizontal mode) of the image display apparatus 100 may be manually set.

Figure 6:
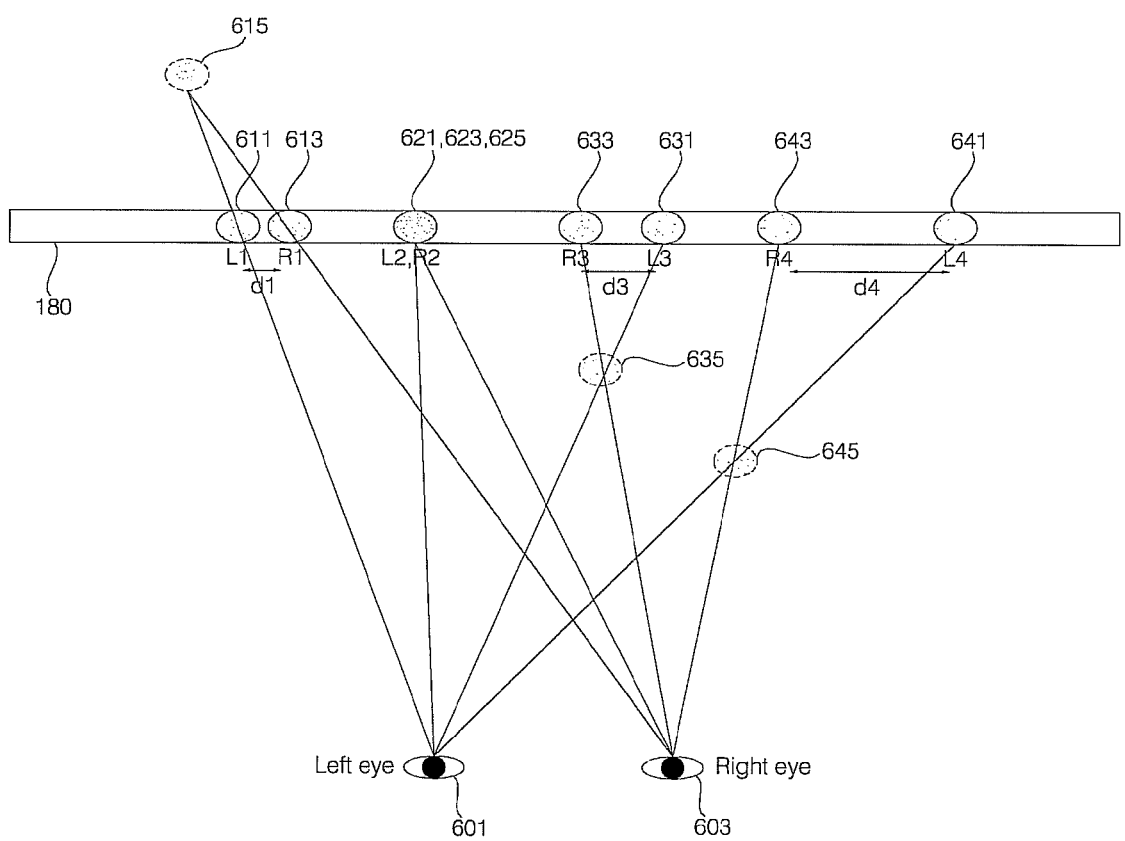
FIG. 6 illustrates a formation of an image using a left-eye image and a right-eye image.

FIG. 6 illustrates a formation of an image using a left-eye image and a right-eye image, and FIGS. 7A and 7B illustrate a difference in perceived depth of a 3D image according to the distance between a left-eye image and a right-eye image. Referring to FIG. 6, a plurality of images or a plurality of objects 615, 625, 635 and 645 may be displayed. First, the first object 615 may include a first left-eye image 611 (L) based on a first left-eye image signal and a first right-eye image 613 (R) based on a first right-eye image signal. A distance between the first right-eye image 613 and the first left-eye image 611 on the display 180 may be d1, as illustrated. Here, the user perceives that an image is formed at an intersection of a line connecting the left eye 601 and the first left-eye image 611 and a line connecting the right eye 603 and the first right-eye image 613. Accordingly, the user perceives that the first object 615 is located behind the display unit 180.

Next, the second object 625 may include a second left-eye image 621 (L) and a second right-eye image 623 (R). Since the second left-eye image 621 and the second right-eye image 623 are displayed so as to overlap each other on the display 180, a distance between the second left-eye image 621 and the second right-eye image 623 is 0, as illustrated. Accordingly, the user perceives that the second object 625 is located on the display 180.

Next, the third object 635 may include a third left-eye image 631 (L) and a third right-eye image 633 (R), and the fourth object 645 may include a fourth left-eye image 641 (L) and a fourth right-eye image 643 (R). The distance between the third left-eye image 631 and the third right-eye image 633 is d3 and the distance between the fourth left-eye image 641 and the fourth right-eye image 643 is d4, as illustrated.

According to the above-described method, the user perceives that the third objects 635 and the fourth object 645 are located at image formation locations, and thus, appear to be located in front of the display 180, as shown in FIG. 6. Here, the user perceives that the fourth object 645 is located in front of the third object 635, i.e., protrudes further than the third object 635, since the distance d4 between the fourth left-eye image 641 (L) and the fourth right-eye image 643 (R) is greater than the distance d3 between the third left-eye image 631 (L) and the third right-eye image 633 (R).

In the embodiment of the present disclosure, the apparent distance between the display 180 and each of the objects 615, 625, 635 and 645, as perceived by the user is referred to as a "depth." The depth of the object that appears to the user to be located behind the display 180 has a negative value (−) and the depth of the object that appears to the user to be located in front of the display 180 has a positive value (+). For example, the depth may increase as the degree of protrusion of the object from the display toward the user increases.

Referring to FIGS. 7A and 7B, when the distance a between a left-eye image 701 and a right-eye image 702 as shown in FIG. 7A is less than the distance b between a left-eye image 701 and a right-eye image 702 as shown in FIG. 7B, the depth a' of the 3D object of FIG. 7A is correspondingly less than the depth b' of the 3D object of FIG. 7B.

When the 3D image includes a left-eye image and a right-eye image, a position at which the image is formed as perceived by the user changes according to the distance between the left-eye image and the right-eye image. Accordingly, by adjusting the displayed distance between the left-eye image and the right-eye image, it is possible to adjust the perceived depth of the 3D image or the 3D object.

Figure 8A:
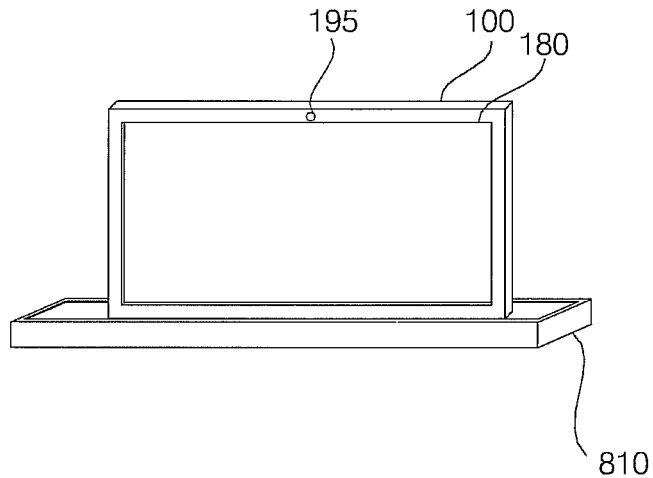
FIGS. 8A and 8B illustrate an exemplary arrangement of a display of the image display apparatus of FIG. 1.
Figure 8B:
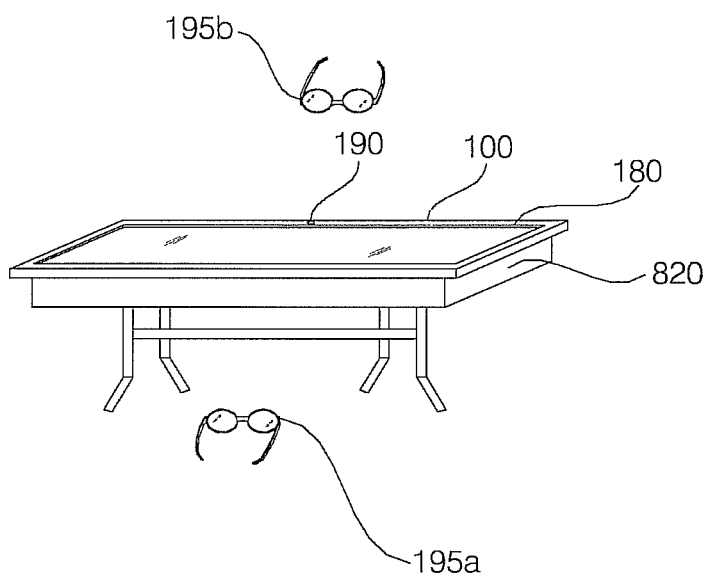

FIGS. 8A and 8B illustrate an exemplary arrangement of the display of the image display apparatus of FIG. 1. First, FIG. 8A illustrates that the display 180 of the image display apparatus 100 may be arranged perpendicular to the ground. To accomplish this, the image display apparatus 100 may be arranged on a support 810 for vertical arrangement.

Here, the support 810 may be a set-top box which may include at least one of the tuner 110, the demodulator 120, the external device interface 130, the network interface 135, the memory 140, the user input interface 150, the sensor 160, the controller 170, the audio output unit 185, or a power supply. Signal processing of an input image may be performed by the image display apparatus 100 and may also be performed by the support 810 if it is a set-top box. In this case, the support 810 and the image display apparatus 100 may communicate with each other through wired communication.

FIG. 8B illustrates that the display 180 of the image display apparatus 100 may be arranged parallel or to the ground or within a prescribed angle with respect to horizontal (e.g., horizontal configuration). To accomplish this, the image display apparatus 100 may be arranged on a support 820 for horizontal arrangement. The image display apparatus 100 may also be placed on a table, a desk, a flat piece of furniture, a floor, or another appropriate structure rather than on the support 820. Moreover, the operational configuration of the image display apparatus 100 may be automatically changed to the horizontal configuration when the image display apparatus 100 is positioned within a prescribed angle with respect to the ground or from horizontal. It should be appreciated that the display mode (vertical or horizontal mode) of the image display apparatus 100 may also be manually set.

When the display 180 of the image display apparatus 100 is arranged parallel to the ground as shown in FIG. 8B, signal processing of an input image may be performed by the image display apparatus 100 and may also be performed by the support 810 which may be a set-top box as described above with reference to FIG. 8A. In this case, the support 810 and the image display apparatus 100 may perform wireless communication with each other. Moreover, support 820 may be configured as a set-top box as previously described with reference to support 810. When the display 180 of the image display apparatus 100 is arranged parallel to the ground as shown in FIG. 8B, the user may view a 3D image displayed on the display 180 using 3D viewing devices 195a and 195b. The method of operating the image display apparatus 100 and the method of operating the 3D viewing devices 195a and 195b may vary depending on the positions of the 3D viewing devices 195a and 195b, as described in further detail with reference to FIG. 11 hereinbelow.

Figure 9:
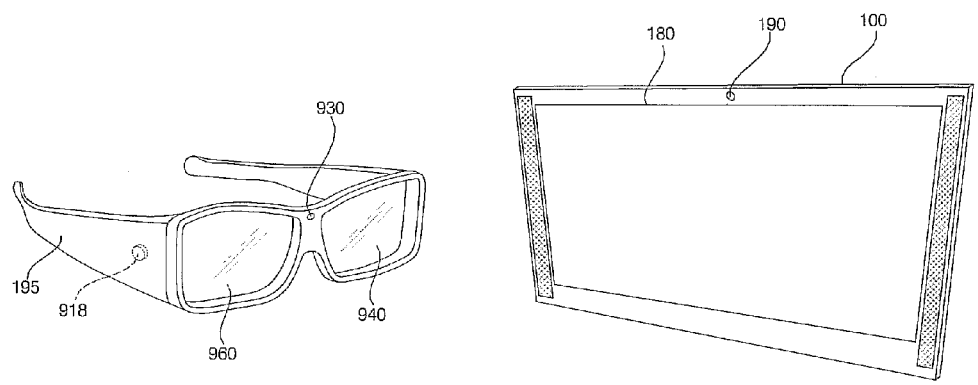
FIG. 9 illustrates a viewing device and an image display apparatus according to an embodiment of the present disclosure.
Figure 10:
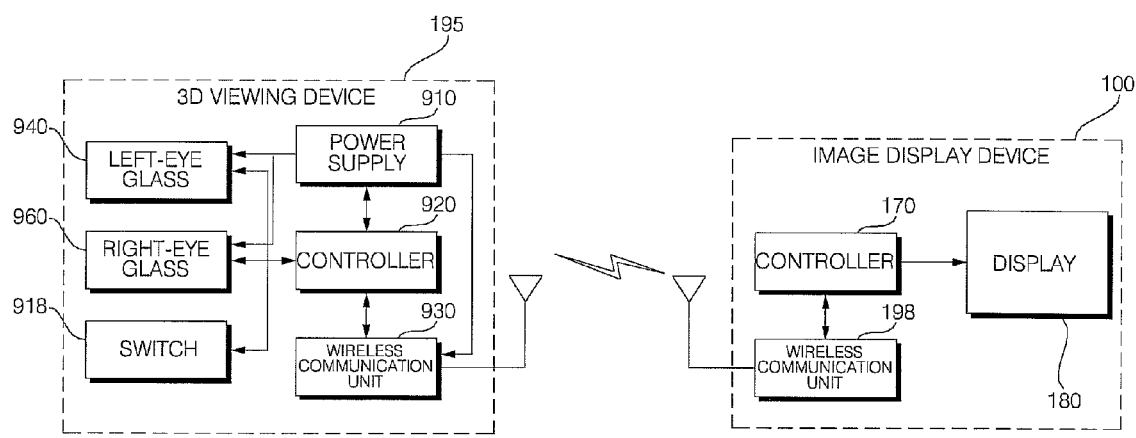
FIG. 10 is a block diagram of the 3D viewing device and the image display apparatus of FIG. 9.

FIG. 9 illustrates a 3D viewing device and an image display apparatus according to an embodiment of the present disclosure, and FIG. 10 is a block diagram of the 3D viewing device and the image display apparatus of FIG. 9. As shown in FIGS. 9 and 10, the 3D viewing device 195 according to the embodiment of the present disclosure may include a power supply 910, a switch 918, a controller 920, a wireless communication interface 930, a left-eye glass 940, and a right-eye glass 960.

The power supply 910 may supply power to the left-eye glass 940 and the right-eye glass 950. A drive voltage $V_{thL}$ may be applied to the left-eye glass 940 and a drive voltage $V_{thR}$ may be applied to the right-eye glass 960. Each of the left-eye glass 940 and the right-eye glass 960 may be opened according to the applied drive voltage. Moreover, the drive voltages $V_{thL}$ and $V_{thR}$ may be alternately provided in different periods and the drive voltages $V_{thL}$ and $V_{thR}$ may have different levels so that polarization directions of the left-eye and right-eye glasses 940 and 950 are different.

The power supply 910 may supply operation power to the controller 920 and the wireless communication interface 930 in the 3D viewing device 195. The switch 918 may turn on or off the 3D viewing device 195. Specifically, the switch 918 is used to turn on or off the operation power of the 3D viewing device 195. For example, when the switch 918 is turned on, the power supply 910 is activated to supply the operation power to the controller 920, the wireless communication unit 930, the left-eye glass 940, and the right-eye glass 960. The switch 918 may also be configured to control other types of operations. For example, the switch 918 may be used to change a synchronization timing of the left and right lenses 940, 960 (e.g., shutter type glasses) or a polarization of the left and right lenses 940, 960 (e.g., polarized type glasses).

The controller 920 may control the left-eye glass 940 and the right-eye glass 960 in the 3D viewing device 195 to be opened or closed in synchronization with a left-eye image frame and a right-eye image frame displayed on the display 180 of the image display apparatus 100. Here, the controller 920 may open or close the left-eye glass 940 and the right-eye glass 960 in synchronization with a synchronization signal Sync received from the wireless communication interface 198 in the image display apparatus 100.

The controller 920 may control the operation of the power supply 910 and the wireless communication interface 930. When the switch 918 is turned on, the controller 920 may control the power supply 910 to be activated to supply power to each component. The controller 920 may control the wireless communication interface 930 to transmit a pairing signal to the image display apparatus 100 to perform pairing with the image display apparatus 100. The controller 920 may also receive a pairing signal from the image display apparatus 100.

The wireless communication interface 930 may transmit or receive data to or from the wireless communication interface 198 of the image display apparatus 100 using an Infrared (IR) scheme or a Radio Frequency (RF) scheme. Specifically, the wireless communication interface 930 may receive a synchronization signal Sync for opening or closing the left-eye glass 940 and the right-eye glass 960 from the wireless communication interface 198 of the image display apparatus 100. Opening and closing the left-eye glass 940 and the right-eye glass 960 may be controlled according to the synchronization signal Sync.

The wireless communication interface 930 may transmit or receive a pairing signal to or from the image display apparatus 100. The wireless communication unit 930 may also transmit a signal to the image display apparatus 100 indicating whether or not the 3D viewing device 195 is being used.

The left-eye glass 940 and the right-eye glass 960 may be active-type left-eye and right-eye glasses that are polarized according to an applied electrical signal. The left-eye glass 940 and the right-eye glass 960 may change their polarization directions according to an applied voltage. For example, the left-eye glass 940 and the right-eye glass 960 may be alternately opened according to a synchronization signal Sync from the image display apparatus 100. The 3D viewing device 195 may be shutter glasses as described above.

The image display apparatus 100 may include the wireless communication interface 198, the controller 170, and the display 180 as described above with reference to FIGS. 1 and 2.

When a 3D viewing device 195 is detected, the wireless communication interface 198 in the image display apparatus 100 may transmit a synchronization signal to the 3D viewing device 195. For example, the wireless communication interface 198 may transmit a synchronization signal allowing the left-eye glass 940 and the right-eye glass 960 of the 3D viewing device 195 to be opened in synchronization with a left-eye image frame and a right-eye image frame that are sequentially displayed on the display 180 of the image display apparatus 100.

The controller 170 in the image display apparatus 100 may control the wireless communication interface 198 to output a corresponding synchronization signal according to a left-eye image frame and a right-eye image frame that are sequentially displayed on the display 180 of the image display apparatus 100. The controller 170 may control the wireless communication interface 198 to transmit or receive a pairing signal to perform pairing with the 3D viewing device 195.

Figure 11:
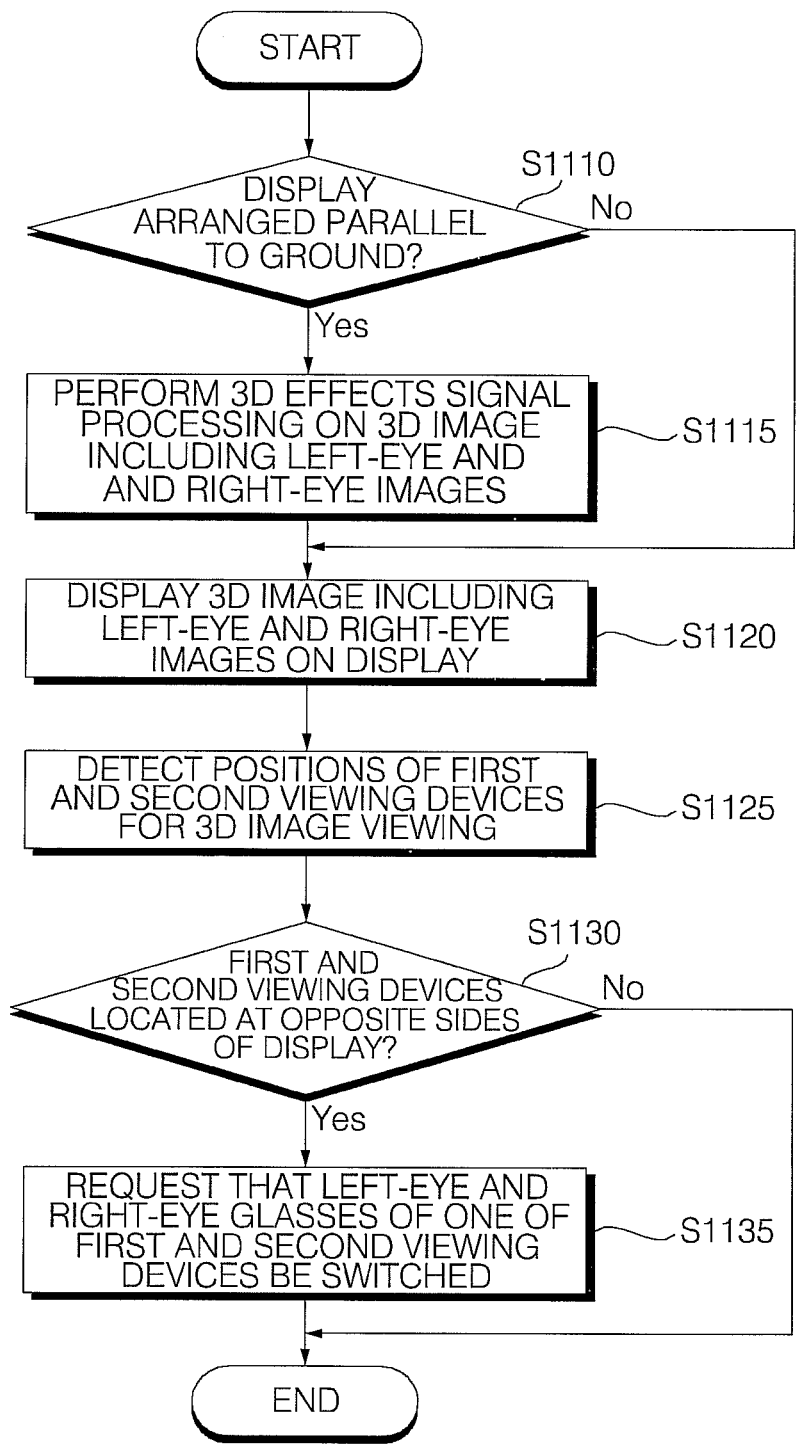
FIG. 11 is a flow chart of a method for operating an image display apparatus according to an embodiment of the present disclosure.

FIG. 11 is a flow chart illustrating a method for operating an image display apparatus according to an embodiment of the present disclosure and FIGS. 12A to 16D illustrate various examples of the method for operating the image display apparatus of FIG. 11. First, the controller 170 may determine whether or not the display is arranged parallel to the ground, in step S1110. When the display is arranged parallel to the ground (or substantially parallel to the ground within a prescribed angle), the controller 170 may perform 3D effects signal processing on a 3D image including a left-eye image and a right-eye image, in step S1115. The controller 170 then may display the 3D image including the left-eye and right-eye images on the display, in step S1120. When the display is arranged perpendicular to the ground (arranged substantially vertical to the ground within a prescribed angle), the controller 170 may perform step S1120 to display the 3D image including the left-eye and right-eye images on the display based on this orientation.

The controller 170 may determine whether or not the display is arranged parallel to the ground (see FIG. 8B) using the sensor unit 160 or the memory 140. For example, whether or not the display 180 is arranged parallel to the ground may be detected using a gyro sensor in the sensor unit 160 and the detection signal may then be input to the controller 170.

When a 3D image is displayed, the controller 170 may perform 3D effects signal processing on the 3D image if the display is arranged parallel to the ground. The 3D effects signal processing may be a signal processing to change at least one of sharpness, brightness, contrast, or tint of a 3D image or signal processing for adjusting the size or slope of an object in the 3D image. Moreover, the 3D effects signal processing may be deactivated when the display 180 of the image display apparatus 100 is arranged parallel to the ground and may then be performed when the display 180 is arranged perpendicular to the ground. When the display 180 is arranged vertically, a greater amount of 3D effects signal processing may be performed than when the display 180 is arranged horizontally.

Figure 12A:
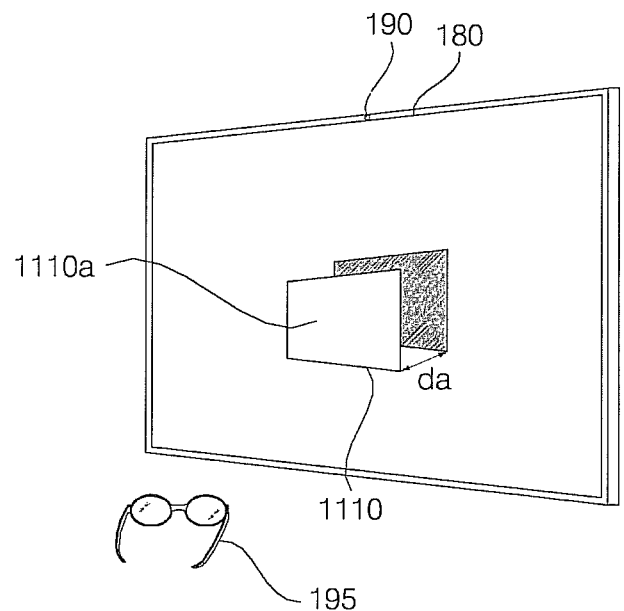
FIGS. 12A to 16D are illustrate various examples of the method for operating the image display apparatus of FIG. 11.

FIG. 12A illustrates a display of a 3D object 1110 when the display 180 of the image display apparatus 100 is arranged perpendicular to the ground. When the user wears the 3D viewing device 195, they can view the 3D object 1110 such that the 3D object 1110 appears to have a specific depth da, e.g., such that a first surface 1110a of the 3D object 1110 appears to protrude from the surface of the display 180.

Figure 12B:
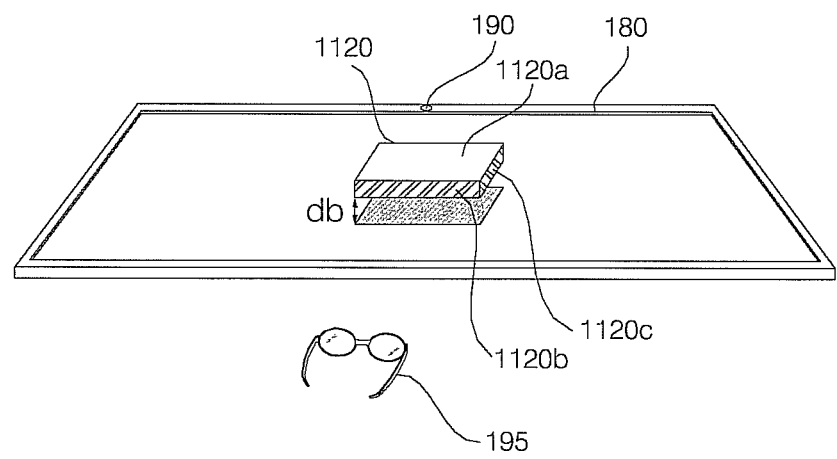

FIG. 12B illustrates a display a 3D object 1120 when the display 180 of the image display apparatus 100 is arranged parallel to the ground. When the user wears the 3D viewing device 195, they can view the 3D object 1120 as a protruding 3D object having a specific depth db (or height db). The user can view the 3D object 1120 such that not only a first surface 1120a is displayed, but also both a second surface 1120b and a third surface 1120c of the 3D object 1120 to protrude.

When the display 180 of the image display apparatus 100 is arranged parallel to the ground, there is no graphical background around the 3D object 1120. Thus, the 3D object 1120 may be configured to provide a realistic stereoscopic effect such that the 3D object 1120 appears to stand within the real space in which the user is located, similar to a hologram.

Figure 12C:
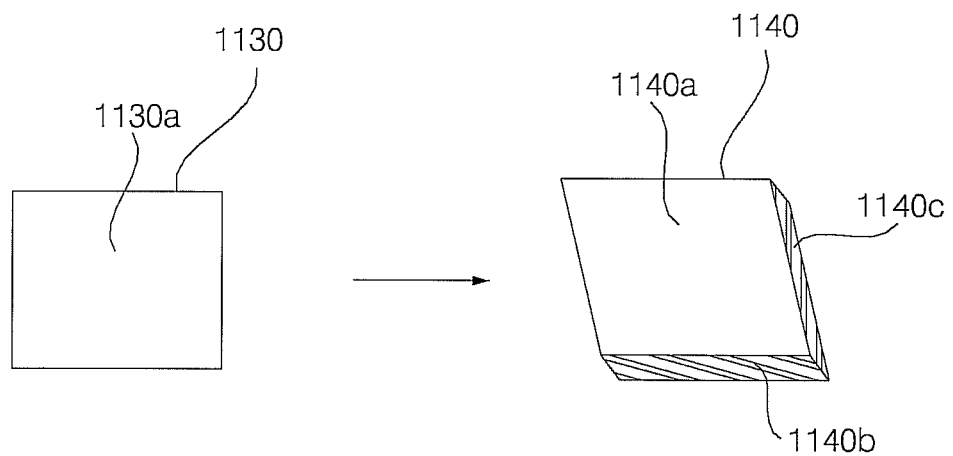

FIG. 12C illustrates 3D effects signal processing. When the display 180 of the image display apparatus 100 is arranged perpendicular to the ground, the controller 170 may assign an object 1130 a depth da caused by the binocular disparity between left-eye and right-eye images. Accordingly, the 3D object 1110 may appear to protrude as shown in FIG. 12A. 3D effects signal processing may be omitted or performed to add a small amount of 3D effects. Thus, scaling or slope adjustment described above with reference to FIG. 5 may be omitted on a first region 1130a of the object 1130.

On the other hand, when the display 180 of the image display apparatus 100 is arranged parallel to the ground, the controller 170 assigns an object 1140 a depth db caused by the binocular disparity between left-eye and right-eye images. Accordingly, the 3D object 1120 appears to protrude as shown in FIG. 12B. In addition, 3D effects signal processing may be performed. Here, the 3D effects signal processing may be performed to add a greater amount of 3D effects than when the display 180 is arranged vertically.

Thus, processing may be performed to partially rotate a first region 1140a of the object 1140 such that the shape of the object 1140 is changed from a rectangular form to a parallelogram form as described above with reference to FIGS. 5A to 5D. In addition, a second region 1140b and a third region 1140c may be added to edges of the first region 1140a to provide 3D effects. The second region 1140b and the third region 1140c may be newly generated based on the edges of the first region 1140a.

The 3D effects signal processing described above may be performed by decoding an image of a new view and adding the decoded image to the original image. For example, when an input image signal is a multi-view image encoded according to multi-view video coding (MVC), or the like, an image of a view corresponding to the second region 1140b shown in FIG. 12C and an image of a view corresponding to the third region 1140c included in the multi-view image may be decoded and the decoded images of the views may then be added to the image (i.e., left-eye and right-eye images) of the view corresponding to the first region 1140a of FIG. 12C. Accordingly, it is possible to increase the stereoscopic effect (i.e., 3D effect) of the 3D object when the display 180 is arranged parallel to the ground, compared to than when the display 180 is arranged perpendicular to the ground.

Referring again to FIG. 11, the controller 170 may detect the positions of a first viewing device and a second viewing device for 3D image viewing, in step S1125. The controller 170 then determines whether or not the first viewing device and the second viewing device are located at opposite sides of the display 180, in step S1130. When the first viewing device and the second viewing device are located at opposite sides of the display 180, the controller 170 may request that the left-eye and right-eye glasses of one of the first and second viewing devices be switched, in step S1135.

The sensor unit 160 or the image capture unit 190 may detect the position of the 3D viewing device 195 for 3D image viewing. For example, the user or the 3D viewing device 195 may be detected using a position sensor in the sensor unit 160.

The position of the 3D viewing device 195 may also be detected using the wireless communication interface 198 of the image display apparatus 100 which communicates with the wireless communication interface 930 of the 3D viewing device 195.

Figure 13A:
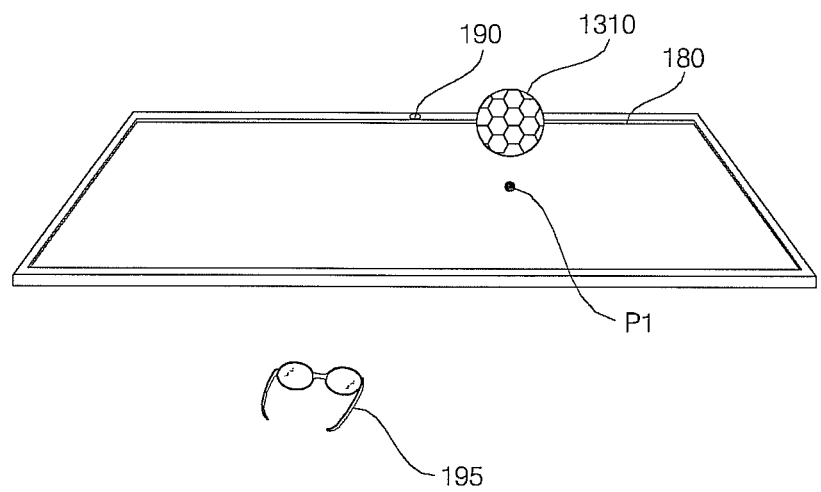

FIG. 13A illustrates a display of a 3D object when the display 180 is arranged parallel to the ground. Specifically, when the user wears the 3D viewing device 195 at a position near the lower portion of the display 180 on which the image capture unit 190 is not provided, the 3D object 1310 may appear to protrude (or to be positioned) at a certain distance above a point P1 on the display 180.

Figure 13B:
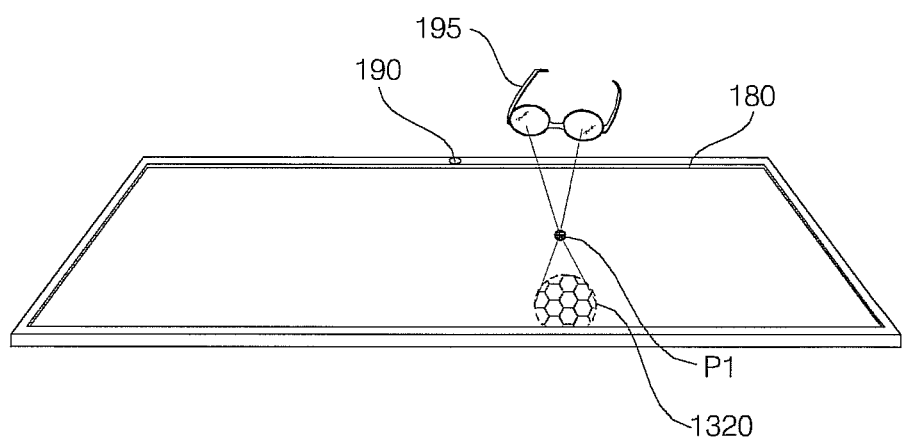

FIG. 13B illustrates a display of a 3D object when the display 180 is arranged parallel to the ground. Specifically, when the user wears the 3D viewing device 195 at a position near the upper portion of the display 180 on which the image capture unit 190 is provided, the 3D object 1310 may appear to be sunken or recessed (or to be positioned) below the point P1 on the display 180.

Figure 14A:
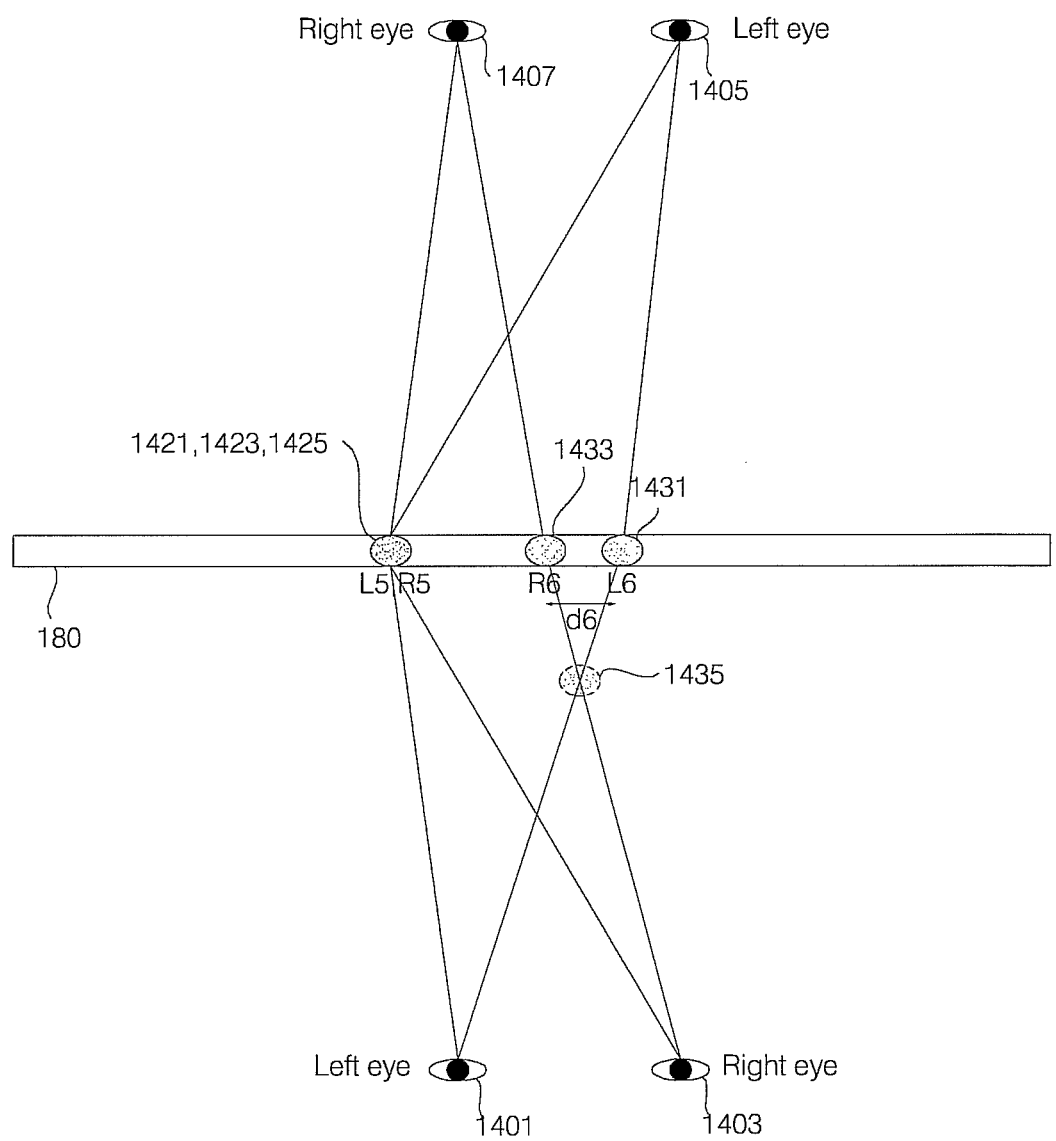

FIG. 14A illustrates how an image of a 3D object is formed depending on the position of each user, i.e., the position of the 3D viewing device 195. In FIG. 14A, it is assumed that a first user, i.e., a first viewing device, is located near the lower portion of the display 180 on which the image capture unit 190 is not provided, as shown in FIG. 13A, and that a second user, i.e., a second viewing device, is located near the upper portion of the display 180 on which the image capture unit 190 is provided as shown in FIG. 13B.

In the example of FIG. 14A, a first object 1425 may include a first left-eye image 1421(L) and a first right-eye image 1423(R) that are displayed at an interval of 0 in an overlapping manner on the display 180. Accordingly, the first and second users may perceive that the first object 1425 is located on the display 180. A second object 1435 may include a second left-eye image 1431(L) and a second right-eye image 1433(R) that are displayed at an interval of d3. Here, the first user may perceive that an image is formed at an intersection between a line connecting a left eye 1401 and the second left-eye image 1431 and a line connecting a right eye 1403 and the second right-eye image 1433. Thus, the first user perceives the second object 1435 as being located in front of the display 180 such that it protrudes from the display 180.

On the other hand, the second user may perceive that an image is formed at an intersection between a line connecting a left eye 1405 and the second left-eye image 1431 and a line connecting a right eye 1407 and the second right-eye image 1433. The point of intersection is positioned beyond the display in the perspective of the second user. Thus, the second user may perceive the second object 1437, as being located below the display 180 such that it is sunken below the display 180.

For example, when the first viewing device and the second viewing device are located at opposite sides of the display 180 that is arranged parallel to the ground, a user wearing one of the first and second viewing devices perceives a 3D image or 3D object displayed on the display 180 as a protruding 3D image and a user wearing the other viewing device may perceive the 3D image or 3D object as a recessed image.

Thus, in an embodiment of the present disclosure a left-eye glass and a right-eye glass of one of the plurality of viewing devices may be switched such that the orientation of the object may appear to be the same when viewed through all of the viewing devices.

Figure 14B:
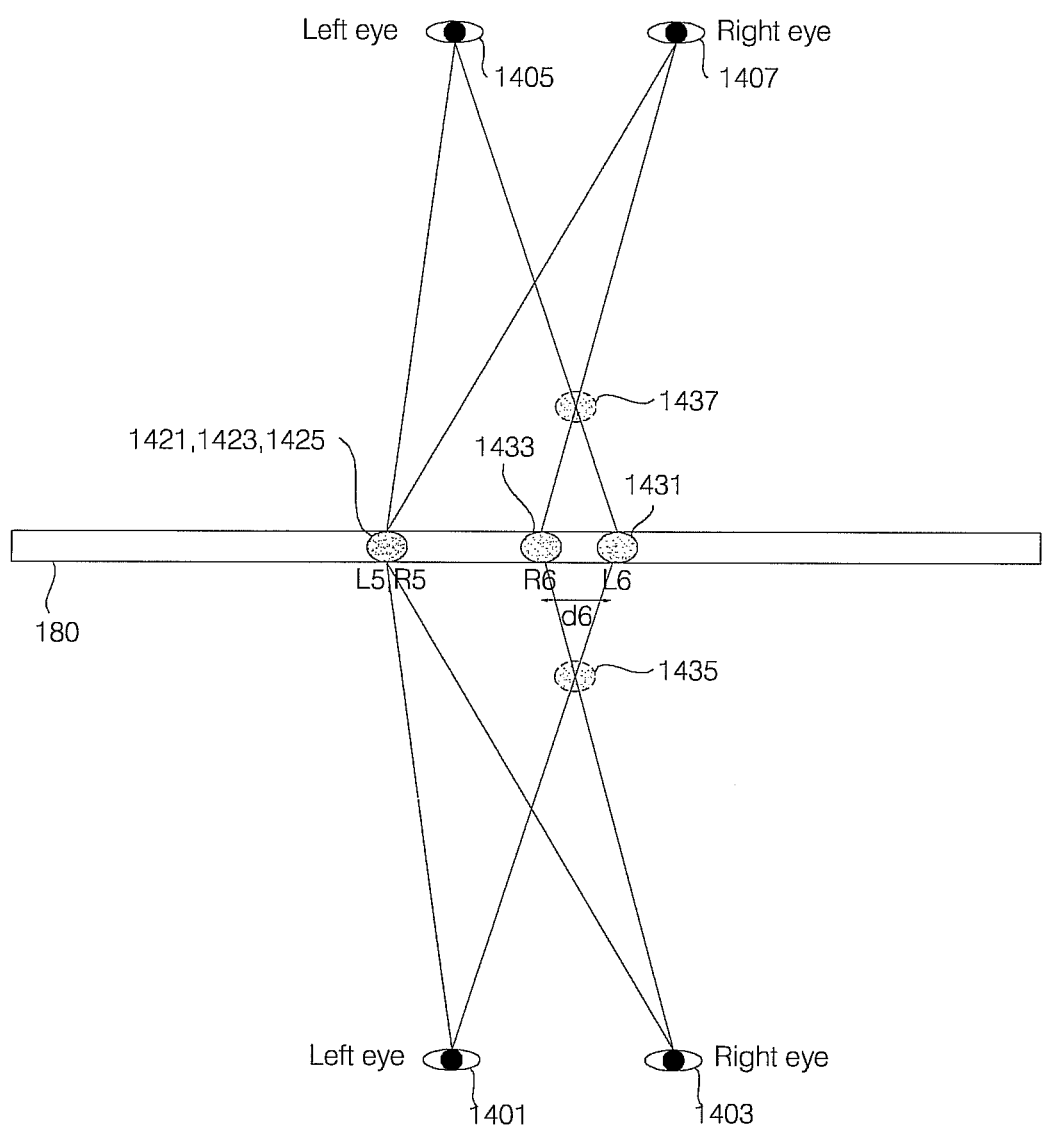

FIG. 14B illustrates how an image of a 3D object is formed depending on the position of each user, i.e., the position of the 3D viewing device 195. The difference of FIG. 14B from FIG. 14A is that the left and right eyes of the second user are switched. Specifically, the left-eye glass and the right-eye glass of the 3D viewing device worn by the second user, are switched. As can be seen from FIG. 14B, both the first and second users may perceive the first object 1425 to protrude on the display 180 as shown in FIG. 14A.

In addition, the first user may perceive that an image is formed at an intersection between a line connecting the left eye 1401 and the second left-eye image 1431 and a line connecting the right eye 1403 and the second right-eye image 1433. Thus, the first user perceives the second object 1435 as being located in front of the display 180 such that the second object 1435 appears to protrude from the display 180.

On the other hand, the second user perceives that an image is formed at an intersection between a line connecting the left eye 1405 and the second left-eye image 1431 and a line connecting the right eye 1407 and the second right-eye image 1433. The second user perceives the second object 1435 as being located in front of the display 180 such that the second object 1435 appears to protrude from the display 180 since the left eye 1405 and the right eye 1407 of the second user have been switched compared to the case of FIG. 14A.

Figure 15A:
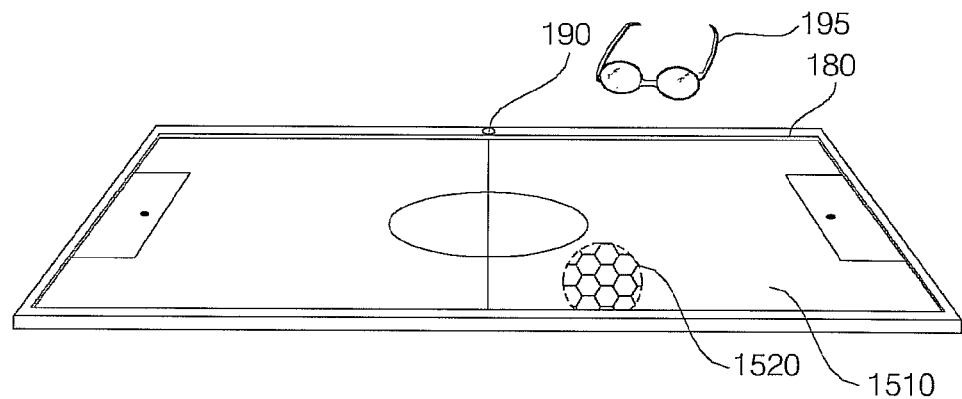

FIG. 15A illustrates a display of an image 1510 and a 3D object 1520 on the display 180 when the display 180 is arranged parallel to the ground. Since the first and second viewing devices 195a and the 195b may be located at opposite sides of the display 180, the first and second users may perceive the 3D object as being oriented opposite to one another (e.g., protruding vs. recessed) as described above with reference to FIG. 14A. For example, the user wearing the first viewing device 195a may perceive the 3D object as a protruding 3D object 1520a (not shown) and the user wearing the second viewing device 195b may perceive the 3D object as a recessed 3D object 1520b as shown in FIG. 15A.

Figure 15B:
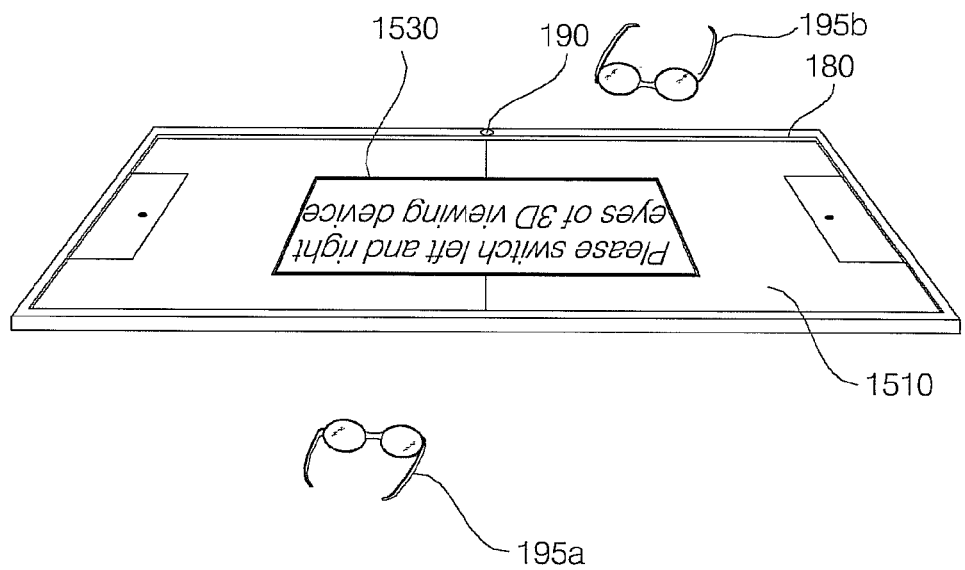
Figure 15C:
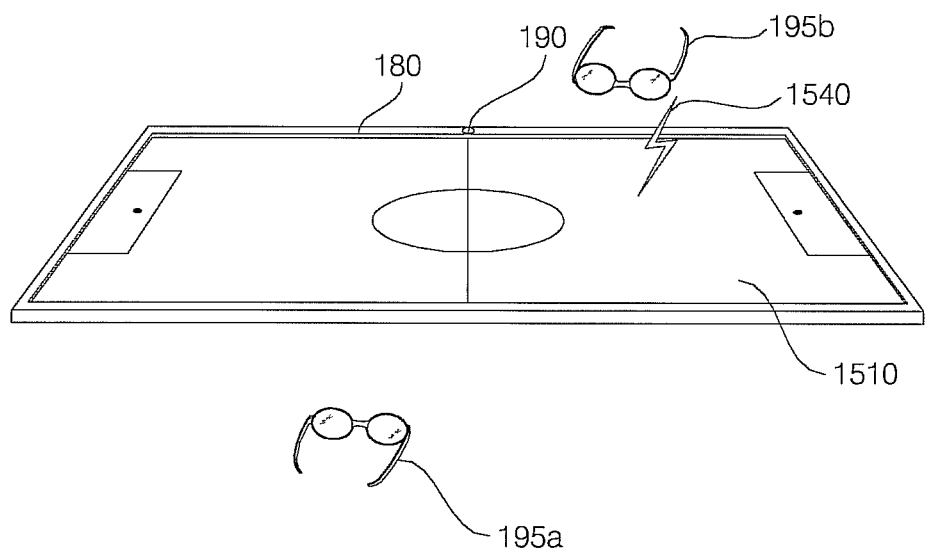

When the controller 170 determines, through the sensor unit 160 or the like, that the first viewing device 195a and the second viewing device 195b are located at opposite sides of the display 180 as described above, the controller 170 may request that the left-eye and right-eye glasses of one of the first and second viewing devices 195a and 195b be switched. The controller 170 may issue the switching request by displaying an object 1530, which requests that the left-eye and right-eye glasses of one of the first and second viewing devices 195a and 195b be switched, on the display 180 as shown in FIG. 15B. Alternatively, the switching request may be a wirelessly transmitted message 1540, which requests that the left-eye and right-eye glasses of one of the first and second viewing devices 195a and 195b be switched, as shown in FIG. 15C. For example, as shown in FIGS. 15B and 15C, the request to reconfigure the viewing device may be displayed or transmitted to the second viewing device 195b such that the perceived 3D image viewed through the second viewing device 195b may correspond to the perceived 3D image viewed through the first viewing device 195a.

The object 1530 requesting the user to switch the left-eye and right-eye glasses may be displayed as text on the display 180, as shown in FIG. 15B. Here, the direction of the displayed text may be determined according to, for example, the second viewing device 195b for which the left-eye and right-eye glasses are to be switched. In the illustrated example, the text may be displayed in a forward direction (right side up) relative to the second viewing device 195b while displayed in a backward direction (upside down) with respect to the first viewing device 195a. In this manner, it is possible to easily request that the left-eye and right-eye glasses be switched.

Figure 15D:
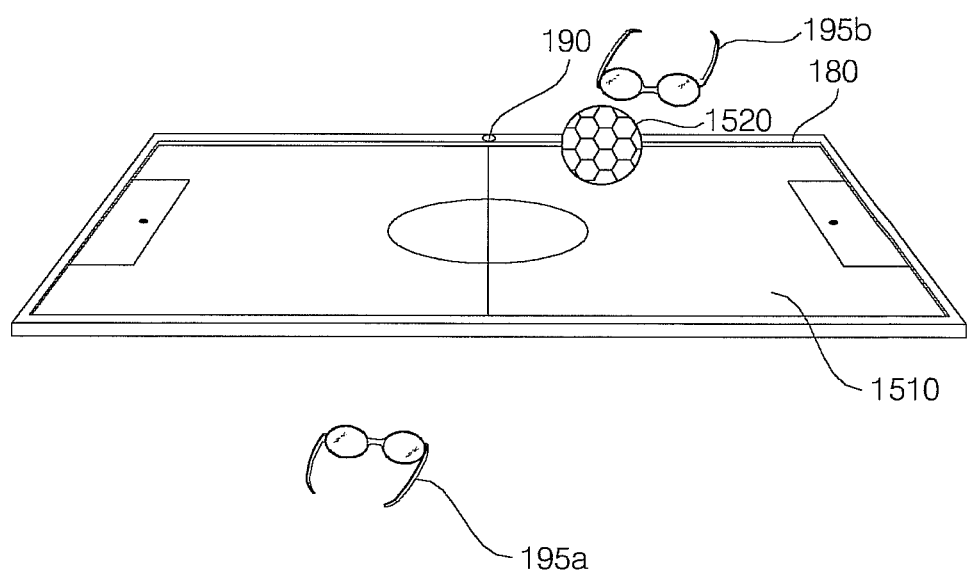

FIG. 15D illustrates that both the user wearing the first viewing device 195a and the user wearing the second viewing device 195b perceive a 3D object 1520 as a protruding 3D object after the left-eye and right-eye glasses of the second viewing device 195b are switched, unlike the case of FIG. 15A. This allows all users to reliably (or correctly) view a 3D image or a 3D object even when they are located at opposite sides.

The left-eye and right-eye glasses of the second viewing device 195b may be switched by changing (or switching) the opening times of the left-eye and right-eye glasses of the second viewing device 195b when the second viewing device 195b is a shutter glasses type. For example, the left-eye and right-eye glasses of the second viewing device 195b may be switched by opening the glasses (e.g., activating), which are originally opened in the order from the left-eye glass to the right-eye glass, in the order from the right-eye glass to the left-eye glass.

On the other hand, when the second viewing device 195b is a polarized glasses type, the left-eye and right-eye glasses of the second viewing device 195b may be switched by switching the left-eye glass that is polarized in a first direction and the right-eye glass that is polarized in a second direction with each other. Alternatively, the left-eye and right-eye glasses of the second viewing device 195b may be switched by switching the polarization directions of the left and right-eye glasses. For example, the left-eye and right-eye glasses of the second viewing device 195b may be switched by changing the polarization direction of the left-eye glass to the second direction and changing the polarization direction of the right-eye glass to the first direction.

Figure 16A:
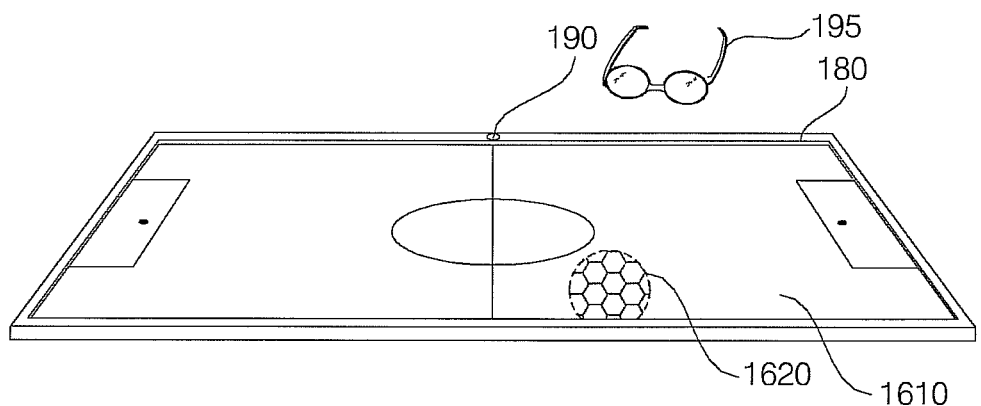

FIGS. 16A to 16D illustrate a situation where one viewing device is provided, unlike FIGS. 15A to 15D in which a plurality of viewing devices is provided. In this embodiment, the 3D viewing device 195 is arranged at the same position as the second viewing device 195b in FIGS. 15A to 15D. Referring to FIG. 16A, an image 1610 and a 3D object 1620 may be displayed on the display 180 when the display 180 is arranged parallel to the ground. As described above, a user wearing the 3D viewing device 195 may perceive the 3D object 1620 to be recessed into the display rather than to protrude.

Figure 16B:
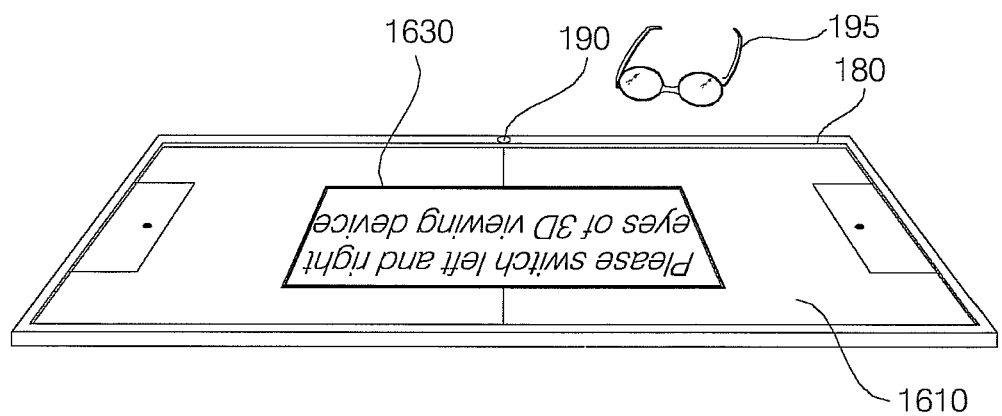
Figure 16C:
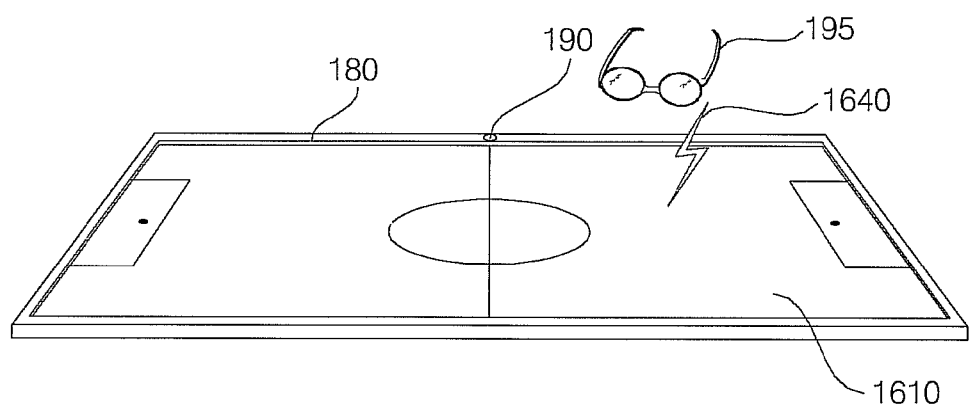
Figure 16D:
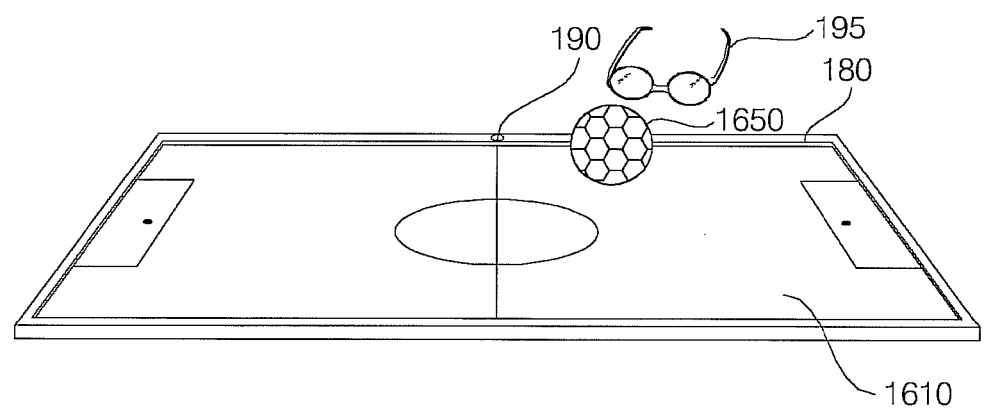

When the controller 170 has determined, through the sensor unit 160 or the like, that the 3D viewing device 195 is located near the upper portion of the display 180, on which the image capture unit 190 is provided, beyond the 3D visible range as described above, the controller 170 may issue a request to switch the left-eye and right-eye glasses by displaying an object 1630, which requests that the left-eye and right-eye glasses be switched, on the display 180 as shown in FIG. 16B or by wirelessly transmitting a message 1640, which requests that the left-eye and right-eye glasses be switched, to the 3D viewing device 195 as shown in FIG. 16C. Such switching of the left-eye and right-eye glasses may allow the user to perceive the 3D object 1650 to protrude when viewed through the 3D glasses 195, as shown in FIG. 16D. This may allow the user to reliably (or correctly) view a 3D image or a 3D object.

Moreover, when the 3D glasses 195 receives the request to switch the configuration of the lenses, either by a message displayed on the display or transmitted through the wireless communication interface, the 3D glasses 195 may be reconfigured manually by a user or automatically by the image display apparatus 100. For example, a button or switch 918, as shown in FIG. 9, may be provided on the image display apparatus 100 (e.g., on the display 180, 3D glasses 195, etc.) such that a user may manually change either the synchronization of the lenses (e.g., timing of the lenses to open or close) or the polarization of the lenses. Alternatively, the configuration of the 3D glasses 195 may be changed automatically by controller 920 once the 3D glasses is determined to be outside the prescribed 3D visible range. Here, the displayed or transmitted message 1530, 1540 may be a notification to the user that the timing or polarization of the glasses 195 has been automatically changed.

Figure 17:
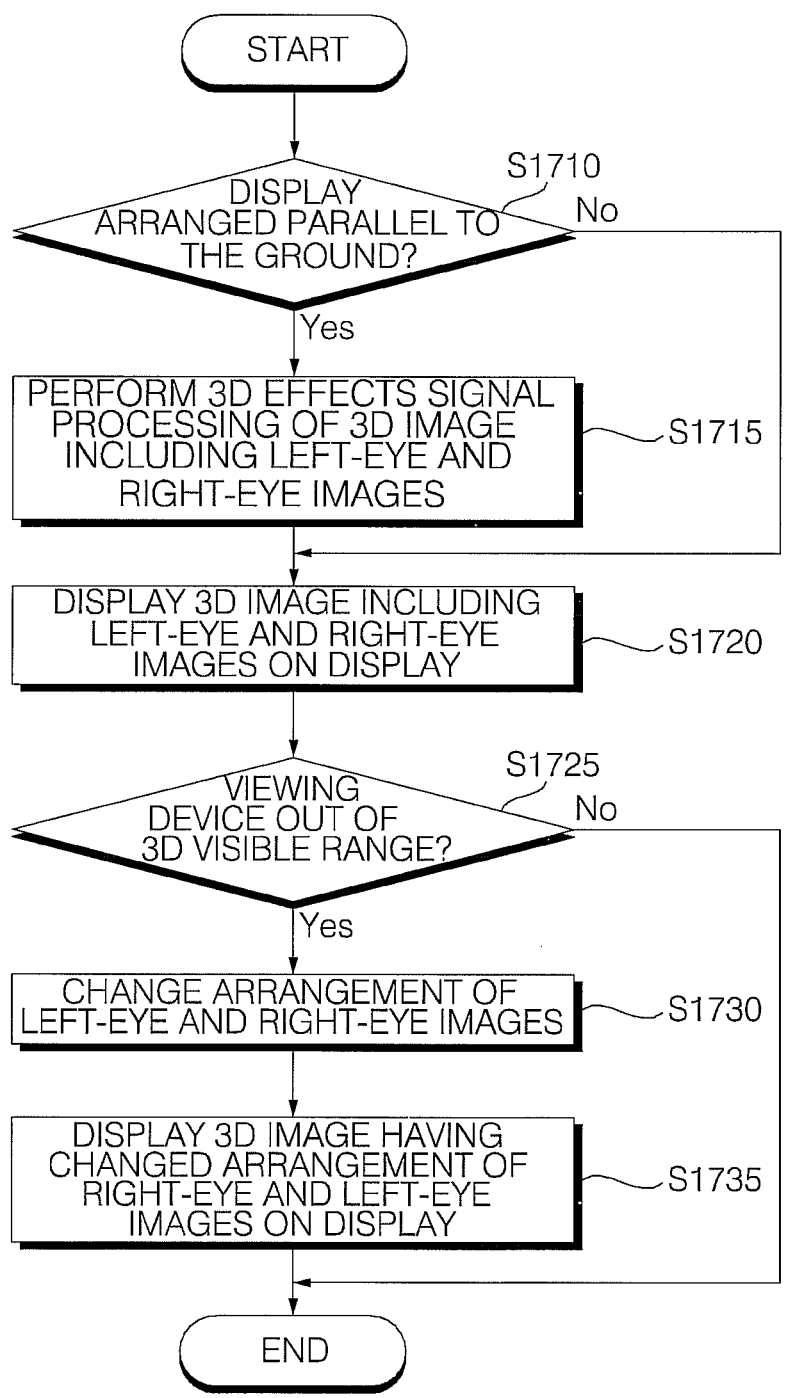
FIG. 17 is a flow chart of a method for operating an image display apparatus according to an embodiment of the present disclosure.

FIG. 17 is a flow chart illustrating a method for operating an image display apparatus according to an embodiment of the present disclosure and FIGS. 18A to 20 illustrate various examples of the method for operating an image display apparatus shown in FIG. 17. First, the controller 170 determines whether or not the display is arranged parallel to the ground, in step S1710. When the display is arranged parallel to the ground, the controller 170 performs 3D effects signal processing on a 3D image including a left-eye image and a right-eye image, in step S1715. The controller 170 then displays the 3D image including the left-eye and right-eye images on the display, in step S1720. When the display is arranged perpendicular to the ground, the controller 170 may perform step S1720 to display the 3D image including the left-eye and right-eye images on the display. Steps S1710 to S1720 of FIG. 17 correspond to steps S1110 to S1120 of FIG. 11, and therefore, repetitive description of steps S1710 to S1720 are omitted herein.

The controller 170 then may determine whether or not the position of the viewing device is outside or beyond the 3D visible range, in step S1725. The sensor unit 160 or the image capture unit 190 may detect the position of the 3D viewing device 195 for 3D image viewing. For example, the user or the 3D viewing device 195 may be detected using a position sensor in the sensor unit 160. The position of the 3D viewing device 195 may also be detected using the wireless communication interface 198 of the image display apparatus 100 which communicates with the wireless communication unit 930 of the 3D viewing device 195.

The controller 170 may determine whether or not the position of the viewing device is outside the 3D visible range based on a signal detected through the sensor unit 160 or the image capture unit 190 or a signal received through the wireless communication device 198. The 3D visible range may be a range in which a 3D object, which has been processed so as to appear to protrude as illustrated in FIG. 15A to FIG. 16D, correctly appears as a protruding 3D object rather than a sunken 3D object to a user wearing the 3D viewing device. For example, the 3D visible range may be an angular range that allows a proper 3D viewing orientation.

Figure 18A:
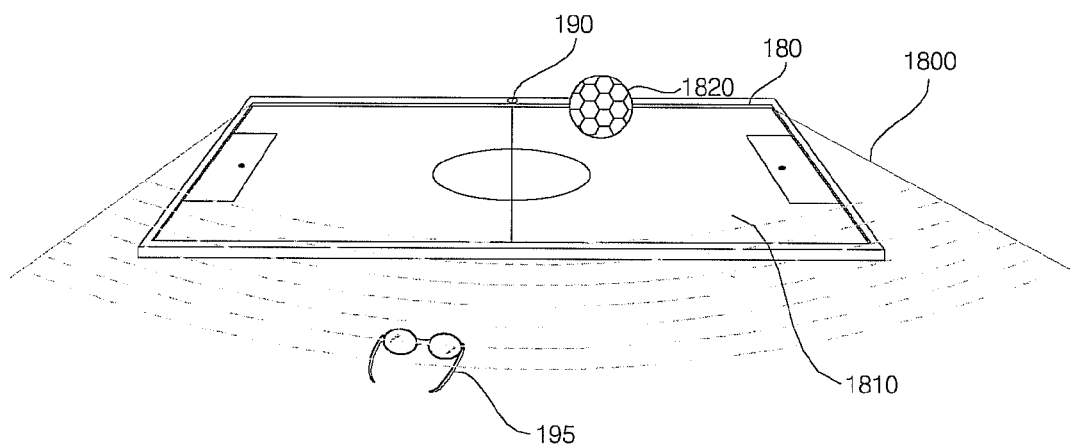
FIGS. 18A to 20 illustrate various examples of the method for operating an image display apparatus of FIG. 17.

FIG. 18A illustrates that, while an image 1810 is displayed on a display 180 which is arranged parallel to the ground and which includes an image capture unit 190 provided at the upper portion thereof, a 3D object, which has been processed so as to appear to protrude, correctly appears as a protruding 3D object 1820 to a user wearing the 3D viewing device 195 at a position within a 3D visible range 1800. For example, the 3D visible range 1800 may indicate a range of positions near the lower portion of the display 180 on which the image capture unit 190 is not provided.

Figure 18B:
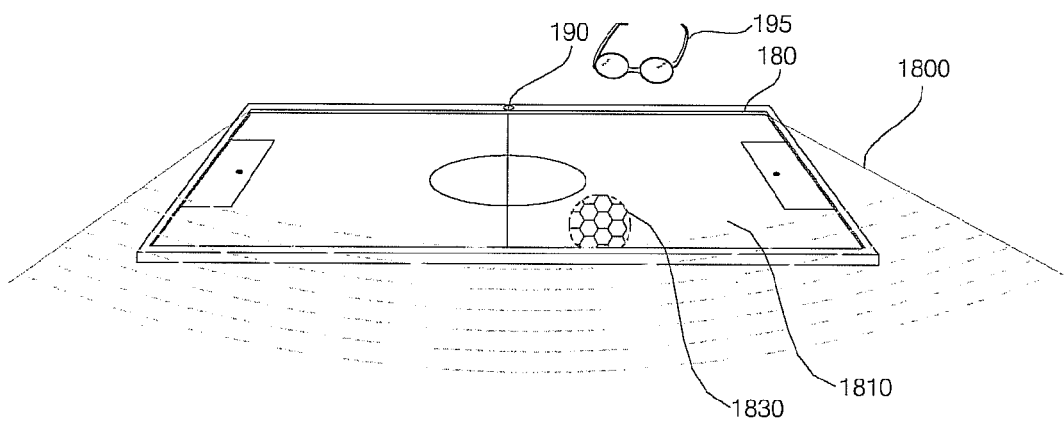

FIG. 18B illustrates that, while an image 1810 is displayed on a display 180 which is arranged parallel to the ground and which includes an image capture unit 190 provided at the upper portion thereof, a 3D object, which has been processed so as to appear to protrude, appears as a sunken 3D object 1830 to a user wearing the 3D viewing device 195 at a position outside the 3D visible range 1800. For example, the 3D invisible range may indicate a range of positions near the upper portion of the display 180 on which the image capture unit 190 is provided.

When the position of the 3D viewing device 195 is outside the visible range, the controller 170 may change the arrangement of the left-eye image and the right-eye image, in step S1730. The formatter 260 in the controller 170 may arrange the images according to the 3D image format described above with reference to FIG. 3. When the position of the 3D viewing device 195 is outside the visible range, the formatter 260 in the controller 170 may change the order of arrangement of the images.

Figure 3B:
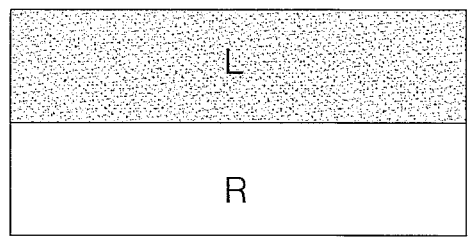
Figure 3C:
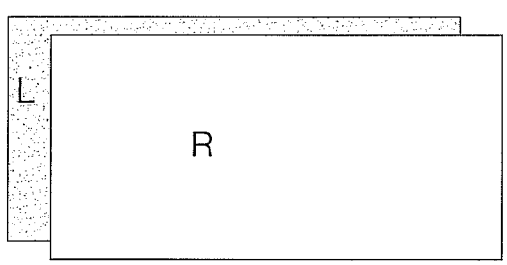
Figure 3D:
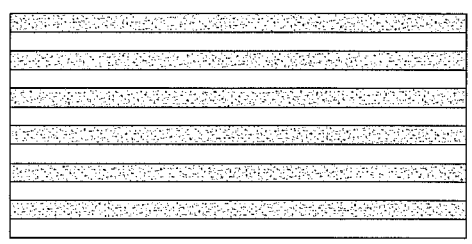
Figure 3E:
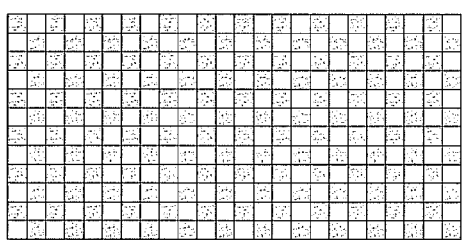
Figure 19A:
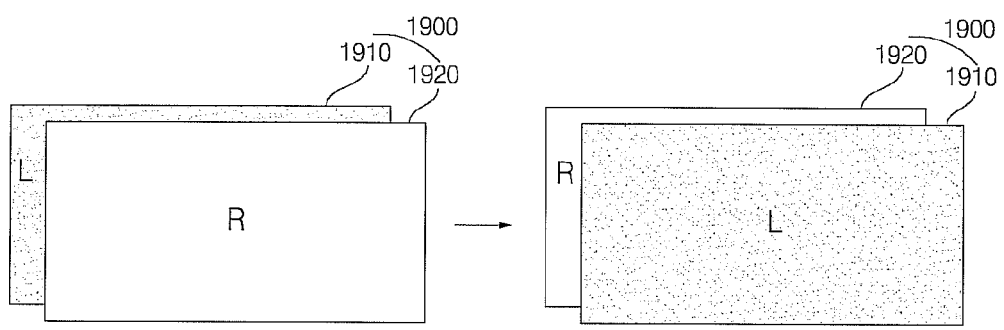

FIG. 19A illustrates a change in the order of arrangement of a left-eye image and a right-eye image under the frame sequential format as shown in FIG. 3C. For example, the formatter 260 in the controller 170 may change the original arrangement of a left-eye image 1910 and a right-eye image 1920 included in a 3D image 1900, in which the left-eye image 1910 is first arranged in time then the right-eye image 1920 is subsequently arranged, to an arrangement in which the right-eye image 1920 is first arranged in time then the left-eye image 1910 is sequentially arranged.

Figure 19B:
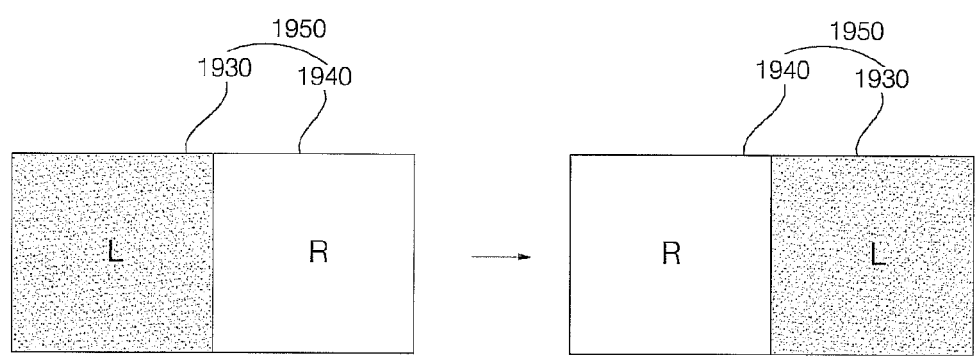

FIG. 19B illustrates a change in the arrangement of a left-eye image and a right-eye image under the side by side format as shown in FIG. 3A. For example, the formatter 260 in the controller 170 may change the original arrangement of a left-eye image 1930 and a right-eye image 1940 included in a 3D image 1950, in which the left-eye image 1930 is arranged to the left and the right-eye image 1940 is arranged to the right, to an arrangement in which the right-eye image 1940 is arranged to the left and the left-eye image 1930 is arranged to the right.

Figure 19C:
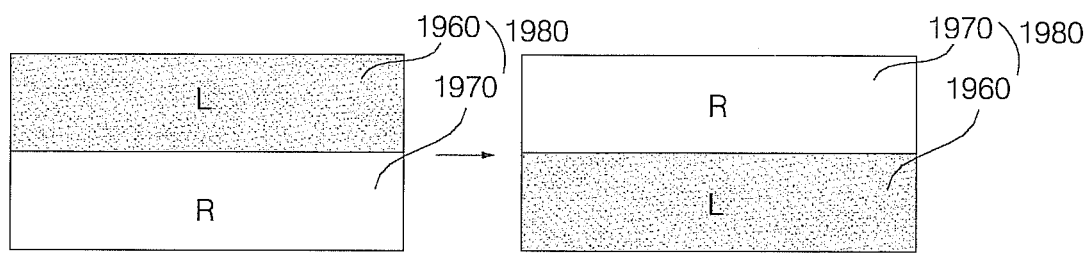

FIG. 19C illustrates a change in the order of arrangement of a left-eye image and a right-eye image under the top/down format as shown in FIG. 3B. For example, the formatter 260 in the controller 170 may change the original arrangement of a left-eye image 1960 and a right-eye image 1970 included in a 3D image 1980, in which the left-eye image 1960 is arranged at the top and the right-eye image 1970 is arranged at the bottom, to an arrangement in which the right-eye image 1970 is arranged at the top and the left-eye image 1960 is arranged at the bottom. The controller 170 then may display the 3D image including the left-eye and right-eye images, the arrangement of which has been changed, on the display 180, in step S1735.

Figure 20:
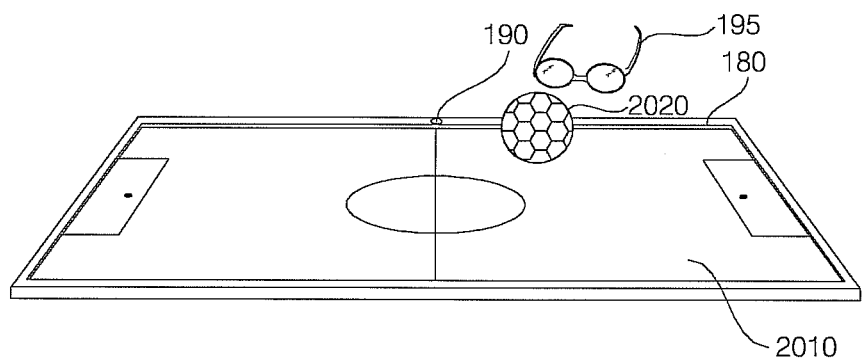

FIG. 20 illustrates a display of the image 2010 including the 3D object 2020 on the display 180 after the 3D object 2030 of FIG. 18A has been processed so as to appear to protrude, rather than recessed even though the 3D viewing device 195 is positioned outside the 3D visible range. Here, the arrangement of the left-eye and right-eye images has been changed to correct the display based on the position the 3D viewing device 195. As described above, such an arrangement change may allow the user to reliably and correctly view a 3D image or a 3D object even when the position of the 3D viewing device 195 is outside the 3D visible range.

Figure 21:
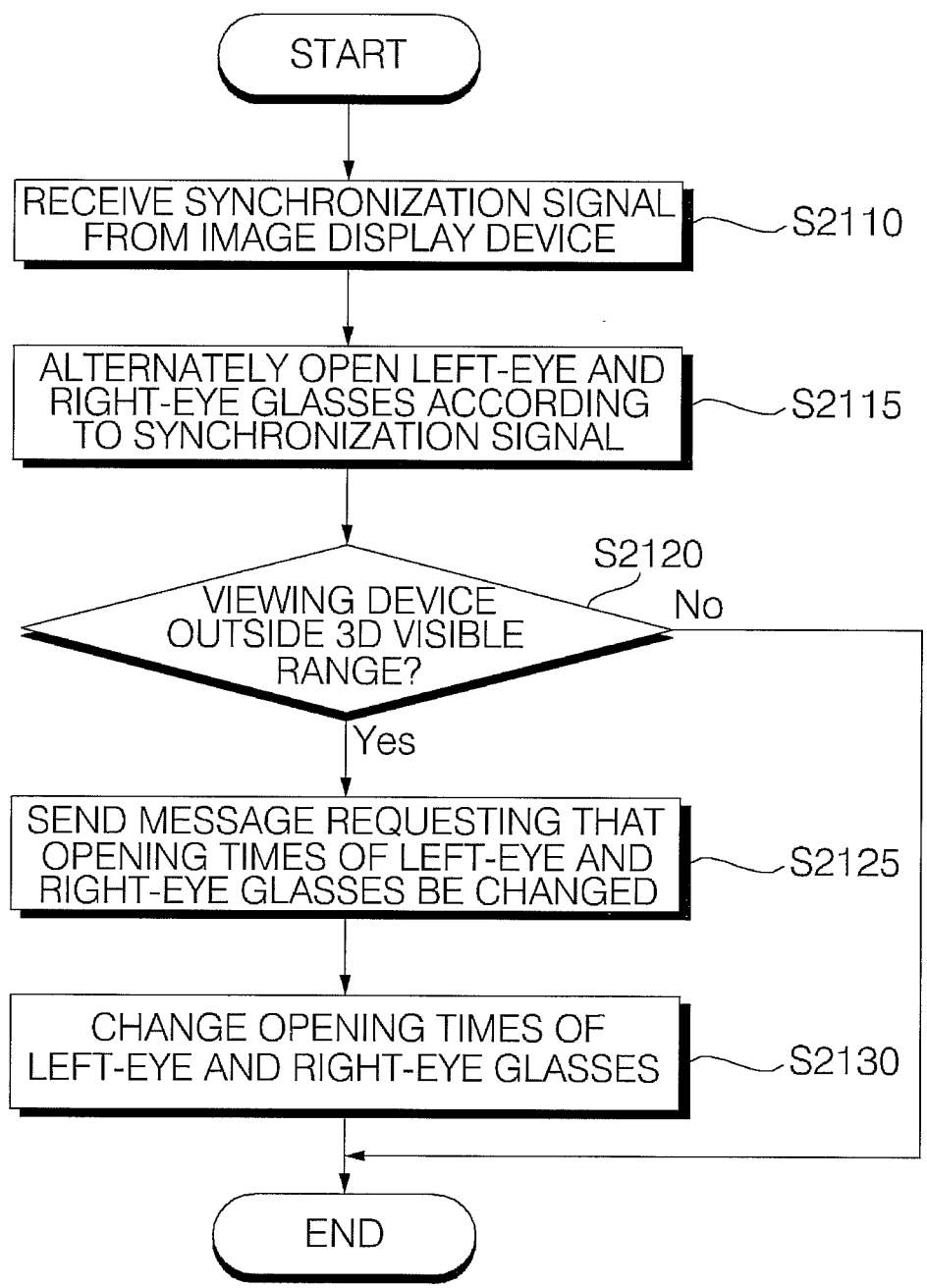
FIG. 21 is a flow chart of a method for operating a 3D viewing device according to an embodiment of the present disclosure.

FIG. 21 is a flow chart of a method for operating an image display apparatus according to an embodiment of the present disclosure and FIGS. 22A to 25 illustrate various examples of the method for operating an image display apparatus of FIG. 21. The 3D viewing device 195 may receive a synchronization signal from the image display apparatus 100, in step S2110. Specifically, the wireless communication interface 930 of the 3D viewing device 195 may receive a synchronization signal Sync for opening and closing the left-eye and right-eye glasses from the wireless communication interface 198 of the image display apparatus 100. The synchronization signal Sync may be synchronized with the display period of a left-eye image or a right-eye image of the image display apparatus 100. Simply for ease of discussion, the synchronization signal Sync is disclosed herein as being synchronized with the display period of the left-eye image of the image display apparatus 100.

The left-eye glass and the right-eye glass may be alternately opened according to the synchronization signal, in step S2115. Here, the controller 920 of the 3D viewing device 195 may control the left-eye glass and the right-eye glass to be opened and closed (active and inactive) based on a prescribed timing according to the received synchronization signal Sync. When the left-eye glass and the right-eye glass are each a type of glass that includes liquid crystal, the left-eye glass and the right-eye glass may be opened and closed by changing the polarization directions of the left-eye and right-eye glasses according to voltages applied to the left-eye and right-eye glasses.

Figure 23:
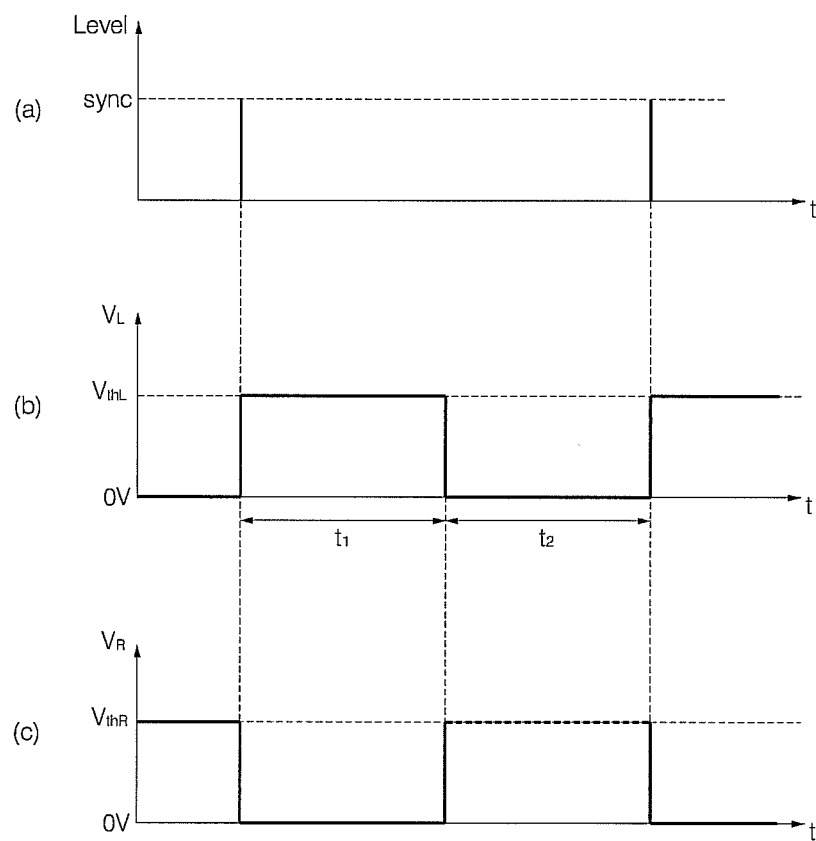

FIG. 23 illustrates voltages applied to the left-eye and right-eye glasses to open and close the left-eye and right-eye glasses according to a synchronization signal Sync. As shown in part (a) of FIG. 23, when a synchronization signal Sync, synchronized with a left-eye image frame of the image display apparatus 100, is received, the controller 920 of the 3D viewing device 195 may apply a drive voltage $V_{thL}$ to the left-eye glass 940 in synchronization with the synchronization signal Sync so that the left-eye glass 940 is opened during a first period t1 as shown in part (b) of FIG. 23. This may allow the left-eye glass 940 to be polarized in a first direction. The controller 920 may then apply a voltage of 0V which may be lower than the drive voltage $V_{thL}$ to the left-eye glass 940 so that the left-eye glass 940 is not opened during a second period t2.

The controller 920 of the 3D viewing device 195 may also apply a voltage of 0V which may lower than a drive voltage $V_{thR}$ to the right-eye glass 960 in synchronization with the synchronization signal Sync so that the right-eye glass 960 is not opened during the first period t1, as shown in part (c) of FIG. 23. The controller 920 may then apply the drive voltage $V_{thR}$ to the right-eye glass 960 so that the right-eye glass 960 is opened during the second period t2. This may allow the right-eye glass 960 to be polarized in a second direction.

The controller 920 may then determine whether or not the position of the 3D viewing device 195 is outside the 3D visible range, in step S2120. When the position of the 3D viewing device 195 is outside or beyond the 3D visible range, the controller 920 may send a message requesting that the opening times of the left-eye and right-eye glasses be changed, in step S2125.

The wireless communication interface 930 of the 3D viewing device 195 may receive a message from the image display apparatus 100 indicating that the 3D viewing device 195 is outside the visible range as shown in FIG. 15C. Here, the visible range associated with the 3D object 2230 may be the same as that described above with reference to FIGS. 18A and 18B.

The 3D viewing device 195 alone may determine whether or not the 3D viewing device 195 is outside the visible range. For example, when the 3D viewing device 195 includes a position sensor, an image capture unit, or the like, the 3D viewing device 195 may determine whether or not the 3D viewing device 195 is outside the visible range using a signal sensed through the position sensor or an image signal captured through the image capture unit.

Figure 22A:
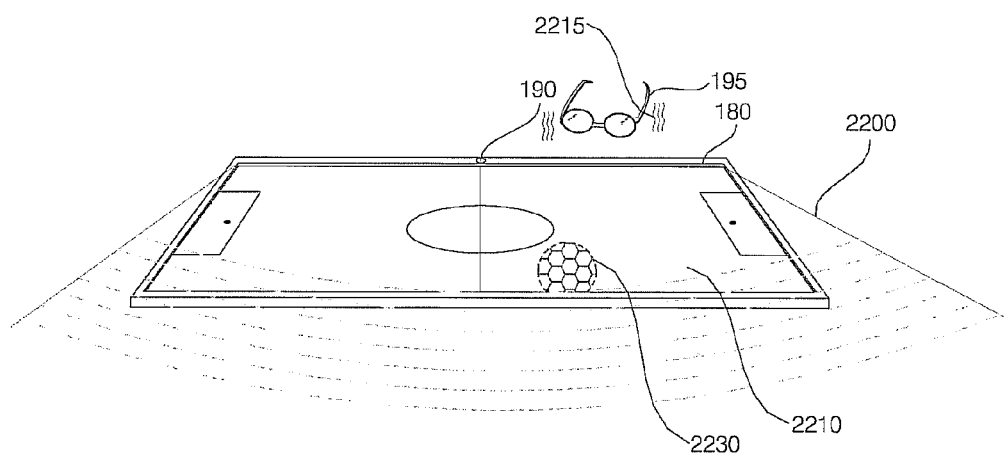

FIG. 22A illustrates an example in which the 3D viewing device 1955 is outside a visible range 2200 for an image 2210 being displayed on the display 180. Here, a 3D object, which has been processed so as to appear to protrude, may be perceived as a sunken 3D object 2230 when the 3D viewing device 195 is positioned outside the visible range 2200. In the example illustrated in FIG. 22A, a vibrating message 2215 may be provided as a request or message to change the opening time (e.g., the timing of the lenses). This allows the user to intuitively recognize the need to change the opening times (e.g., synchronization or timing).

Figure 22B:
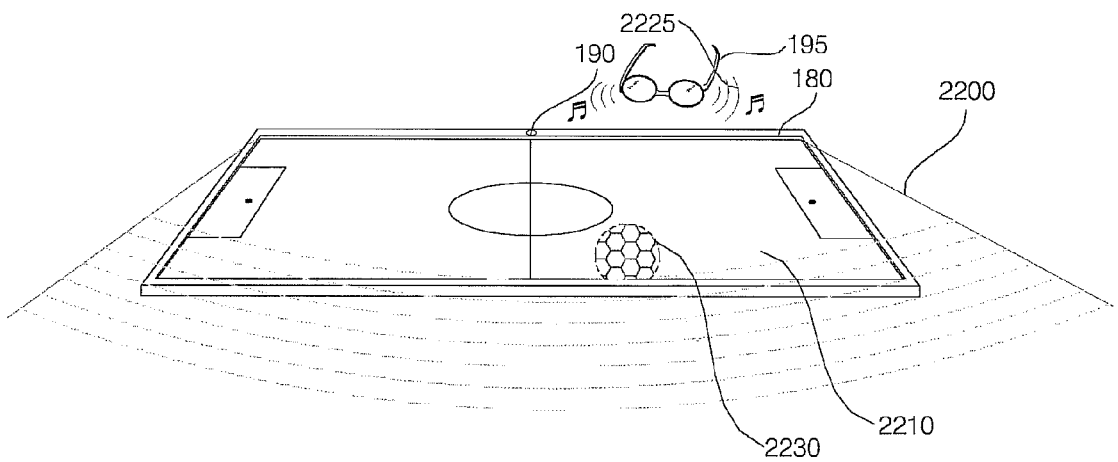

FIG. 22B illustrates an example in which an audio message 2225 may be provided as a request or message to change the opening times when the 3D viewing device 195 is beyond a visible range 2200, in contrast to the example of FIG. 22A. The timing of the glasses (opening times of the left-eye and right-eye glasses) may then be changed, in step S2130. The controller 920 of the 3D viewing device 195 may perform a control operation to change (e.g., to switch) the timing of when the left-eye and right-eye glasses are opened or active according to a received synchronization signal Sync.

FIG. 24 illustrates how voltages applied to the left-eye and right-eye glasses may be changed to change the opening and closing of the left-eye and right-eye glasses according to a synchronization signal Sync. In this embodiment, the right-eye glass 960 is synchronized to open at the rising edge or the synchronization signal Sync, in contrast to the embodiment as disclosed with reference to FIG. 23. As shown in part (a) of FIG. 24, when a synchronization signal Sync synchronized with a left-eye image frame of the image display apparatus 100 is received, the controller 920 of the 3D viewing device 195 may apply a drive voltage $V_{thR}$ to the right-eye glass 960 in synchronization with the synchronization signal Sync so that the right-eye glass 960 is opened during a first period t1, as shown in FIG. 24C. This may allow the right-eye glass 960 to be polarized in the second direction. The controller 920 then may apply a voltage of 0V which is lower than the drive voltage $V_{thR}$ to the right-eye glass 960 so that the right-eye glass 960 is not opened during a second period t2.

The controller 920 of the 3D viewing device 195 then may apply a voltage of 0V which may be lower than a drive voltage $V_{thL}$ to the left-eye glass 940 in synchronization with the synchronization signal Sync so that the left-eye glass 940 is not opened during the first period t1, as shown in part (b) of FIG. 24. The controller 920 then may apply the drive voltage $V_{thL}$ to the left-eye glass 940 so that the left-eye glass 940 is opened during the second period t2. This may allow the left-eye glass 940 to be polarized in a first direction. In this manner, it is possible to easily change the timing of the 3D viewing device 195 to open or close the left-eye and right-eye glasses such that 3D object 2230 may be correctly oriented when the 3D viewing device 195 is outside the viewing range associated with the 3D object 2230.

Figure 25A:
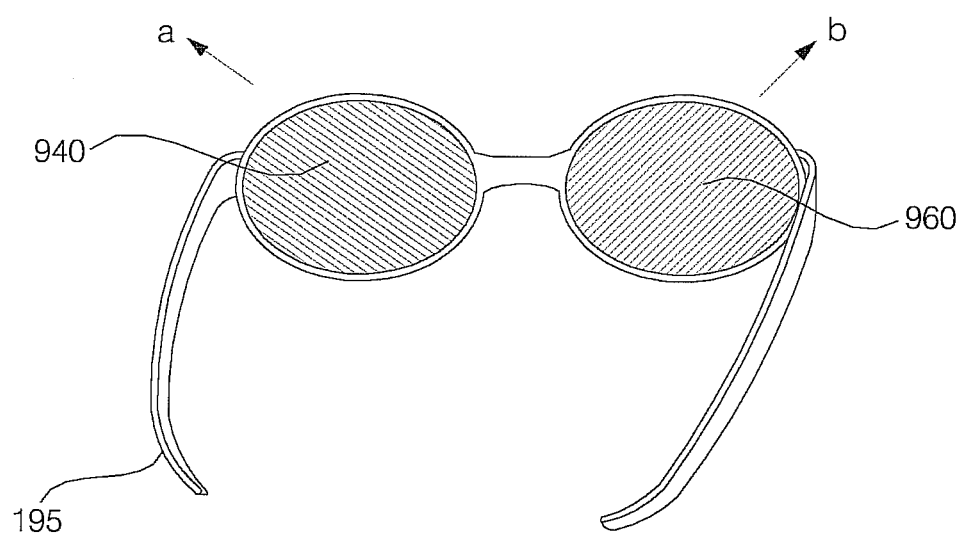
Figure 25B:
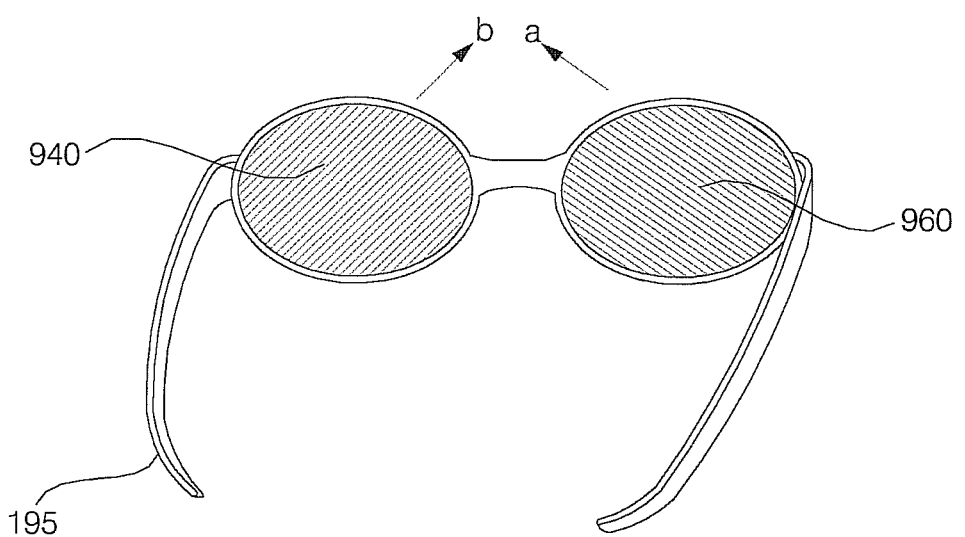

FIGS. 25A and 25B illustrate a change in the polarization directions of the left-eye glass and the right-eye glass without a change in the opening and closing cycle of the left-eye and right-eye glasses. The polarization directions of the left-eye and right-eye glasses of the 3D viewing device 195 may be changed in the case where the 3D viewing device is outside the visible range when the format of a 3D image displayed on the display 180 is the side by side format or the top/down format rather than the frame sequential format.

FIG. 25A illustrates the 3D viewing device 195 before a change in its polarization. The left-eye glass 940 may be polarized in a direction "a" and the right-eye glass 960 may be polarized in a direction "b" as shown. Here, when the left-eye glass 940 and the right-eye glass 960 are of the active type which can change the polarization direction according to an applied voltage, drive voltages $V_{thL}$ and $V_{thR}$ may be applied to the left-eye glass 940 and the right-eye glass 960, respectively, as described above with reference to FIG. 23.

FIG. 25B illustrates the 3D viewing device 195 after a change in its polarization. The left-eye glass 940 may be polarized in the direction "b" and the right-eye glass 960 may be polarized in the direction "a". Here, the right drive voltage $V_{thR}$ may be applied to the left-eye glass 940 and the left drive voltage $V_{thL}$ may be applied to the right-eye glass 960, in contrast to FIG. 25A. Hence, the left-eye and right-eye glasses may be reconfigured (e.g., switched) to correctly view a 3D object when outside the visible range associated with the 3D object. It should be appreciated that the polarization of the 3D viewing device 195 may be changed using other appropriate techniques.

Figure 26:
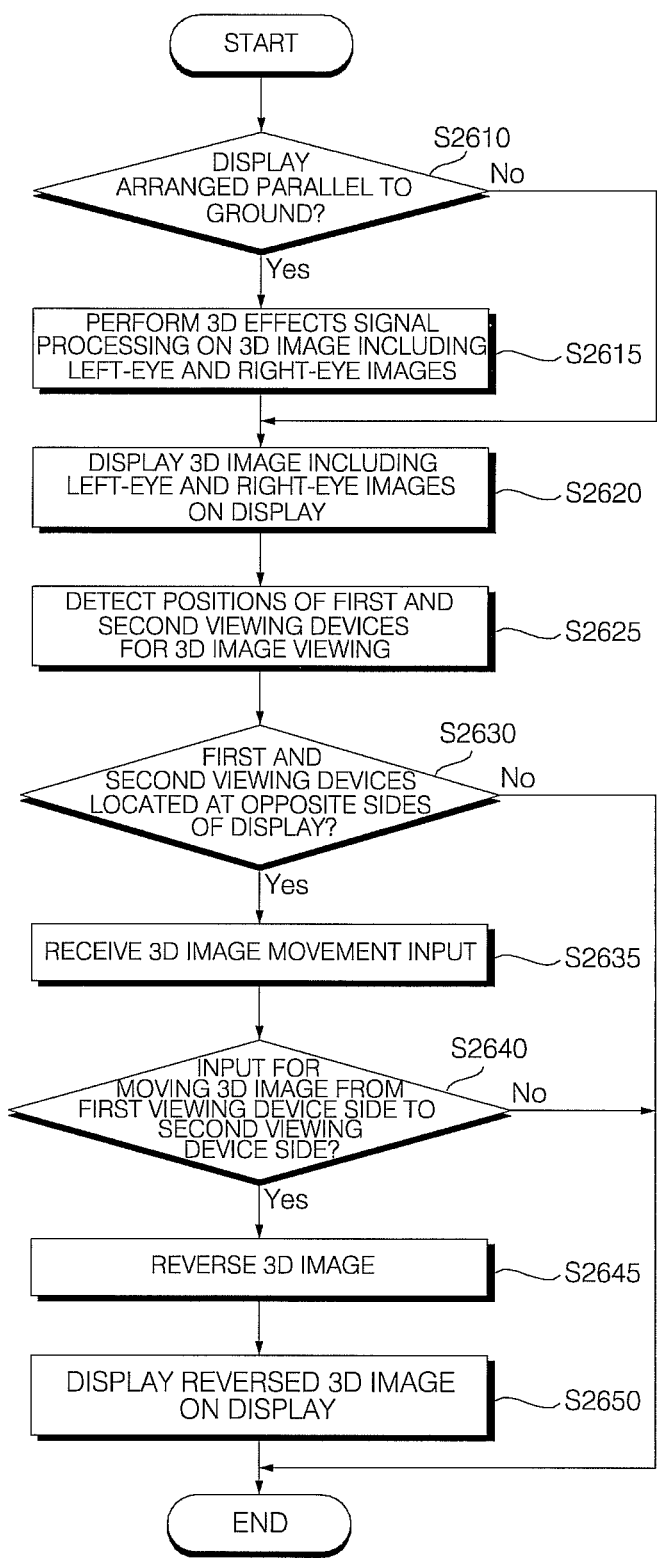
FIG. 26 is a flow chart of a method for operating an image display apparatus according to an embodiment of the present disclosure.

FIG. 26 is a flow chart of a method for operating an image display apparatus according to an embodiment of the present disclosure and FIGS. 27A to 32C illustrate various examples of the method for operating an image display apparatus of FIG. 26.

First, the controller 170 may determine whether or not the display is arranged parallel to the ground, in step S2610. In certain embodiments, the display may be determined to be in the horizontal mode when the display surface of the display is positioned to be horizontal or within a prescribed angle of incline relative to horizontal.

When the display is arranged parallel to the ground, the controller 170 performs 3D effects signal processing on a 3D image including a left-eye image and a right-eye image, in step S2615. The controller 170 then displays the 3D image including the left-eye and right-eye images on the display, in step S2620. When the display is arranged perpendicular to the ground, the controller 170 performs step S2620 to display the 3D image including the left-eye and right-eye images on the display based on this orientation. Steps S2610 to S2620 of FIG. 26 are similar to steps S1110 to S1120 of FIG. 11, and therefore, repetitive description of steps S2610 to S2620 is omitted herein.

The controller 170 may then detect the positions of a first viewing device and a second viewing device for 3D image viewing, in step S2625. The controller 170 may then determine whether or not the first viewing device and the second viewing device are located at opposite sides of the display 180, in step S2630.

When the first viewing device and the second viewing device are located at opposite sides of the display 180, the controller 170 may receive a 3D image movement input, in step S2635. The controller 170 may then determine whether or not the received movement input is an input to move a 3D image from the first viewing device side (a side of the display corresponding to the first viewing device) to the second viewing device side (a side of the display corresponding to the second viewing device), in step S2640. When the received movement input is an input to move the 3D image from the first viewing device side to the second viewing device side, the controller 170 may reverse (i.e., rotate) the 3D image, in step S2645. The controller 170 may then display the reversed 3D image on the display 180, in step S2650.

Moreover, when the 3D image is moved from the first viewing device side to the second viewing device side, a perceived view of the 3D image may be adjusted to ensure the 3D depth of perception is correctly perceived through the second viewing device. In this case, the controller 170 may adjust the display of the 3D image on the display to ensure that the 3D object is perceived to correctly protrude and/or recede, as previously discussed with reference to FIGS. 17-20. Alternatively, the perceived image of the 3D image viewed through the viewing devices may be adjusted by controller 920 of the 3D viewing devices, as previously discussed with reference to FIGS. 21-25.

Referring again to step S2625 as described above, the position of the 3D viewing device 195 for 3D image viewing may be detected using the sensor unit 160 or the image capture unit 190. For example, the user or the 3D viewing device 195 may be detected using a position sensor in the sensor unit

160. The position of the 3D viewing device 195 may also be detected using the wireless communication interface 198 of the image display apparatus 100 which communicates with the wireless communication interface 930 of the 3D viewing device 195. In step S2630, the controller 170 may determine whether or not the first viewing device and the second viewing device are located at opposite sides of the display 180 by detecting the position of the 3D viewing device 195 or the position of the user.

Figure 27A:
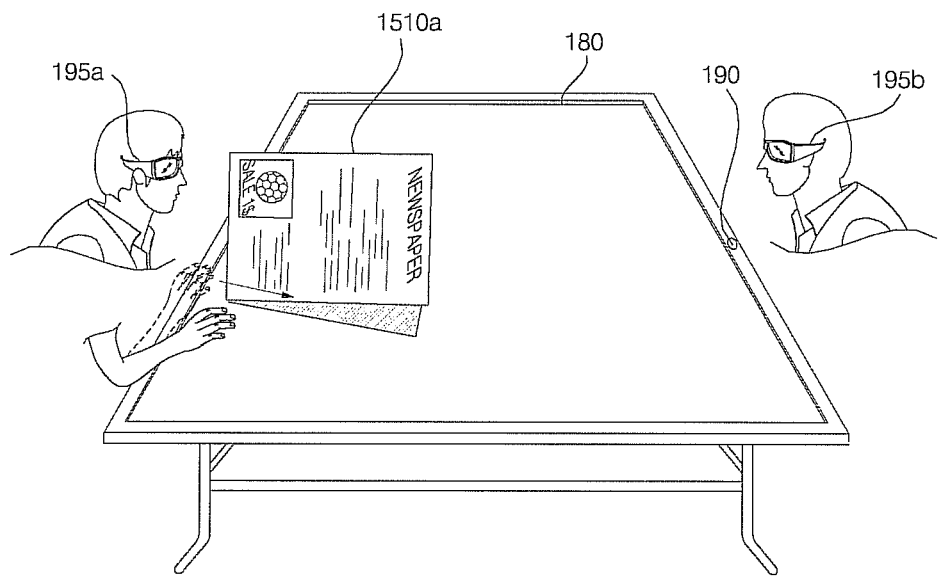
FIGS. 27A to 32C illustrate various examples of the method for operating an image display apparatus of FIG. 26.

Referring to FIG. 27A, a first user wearing the first viewing device 195*a* may be located at the lower portion of the display 180 (e.g., where the image capture unit 190 is not provided). A second user wearing the second viewing device 195*b* may be located at the opposite side, at a side corresponding to the upper portion of the display 180 (e.g., where the image capture unit 190 is provided).

In the above steps S2635 and S2640, the controller 170 may determine whether or not the received movement input is an input to move a 3D image from the first viewing device side to the second viewing device side. The sensor unit 160 or the image capture unit 190 may sense or capture a 3D image movement input by a user. For example, the input to move a displayed 3D image or 3D object may be sensed through touch or gesture by hand movement of the first user. The sensed signal may be input to the controller 170 and the controller 170 may then identify an input corresponding to the sensed signal.

As shown in FIG. 27A, a 3D image 1510*a* for the first user wearing the first viewing device 195*a* may be displayed on a first region (specifically, a lower region) of the display 180. The displayed 3D image 1510*a* may be a content related image such as a broadcast image, a web site (specifically, a news site, a magazine site, an advertisement, or the like), an electronic document screen, a video image screen, or a audio player screen.

Here, when the first user makes a 3D image movement gesture toward the second viewing device 195*b*, for example, to recommend the 3D image 1510*a* to the second user wearing the second viewing device 195*b* as shown in FIG. 27A, the controller 170 may identify a movement input corresponding to the gesture.

At step S2645, the controller 170 may reverse the 3D image to change the orientation of the 3D image for the second viewing device 195*b*. At step S2650, the controller 170 may display the reversed 3D image on the display 180 at the lower region corresponding to the second viewing device 195*b*. For example, the controller 170 may reverse the 3D image including left-eye and right-eye images for the second user wearing the second viewing device 195*b*. The formatter 260 in the controller 170 may arrange the images according to the 3D image format as described above with reference to FIGS. 3A to 3E. Moreover, the formatter 260 in controller 170 or the controller 920 in the viewing device may adjust the perceived 3D depth of perception for the second viewing device 195*b*. This process of reversing the 3D image and correcting the 3D depth of perception is described in further detail with reference to FIGS. 28 to 30 hereinbelow.

Figure 28A:
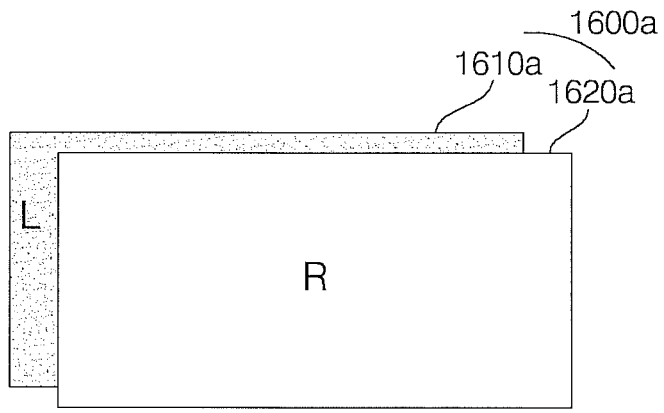
Figure 28B:
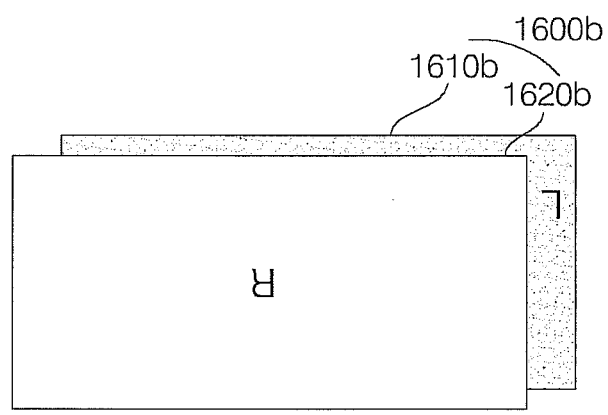
Figure 28C:
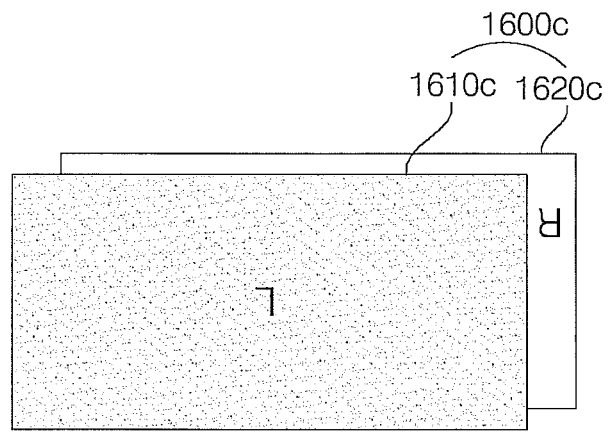

FIGS. 28A to 28C illustrate a process to rotate a 3D image including a left-eye image and right-eye image having a frame sequential format of FIG. 3C. The formatter 260 in the controller 170 may first arrange a left-eye image 1610*a* in time among the left-eye image 1610*a* and a right-eye image 1620*a*, which constitute a 3D image 1600*a* configured for display through the first viewing device 195*a*, as shown in FIG. 28A.

When the movement input is made as described above, the formatter 260 in the controller 170 may reverse (e.g., rotate) each of the left-eye image and right-eye image (e.g., rotate each image by 180 degrees) to generate a reversed 3D image 1600*b* which includes a reversed left-eye image 1610*b* and a reversed right-eye image 1620*b*, as shown in FIG. 28B.

If the second viewing device 195*b* is reconfigured to correct the depth of perception (protrusion or recession) of the 3D image viewed through the second viewing device 195*b*, then the reversed 3D image 1600*b*, as shown in FIG. 28B, may be displayed in the upper region corresponding to the second viewing device 195*b*. Here, as previously described with reference to FIGS. 21 to 25, the lens opening/closing timing of the second viewing device 195*b* may be reconfigured (e.g., switched) to correct the perceived 3D depth of the image viewed in a direction corresponding to the first viewing device 195*a*.

However, if the 3D image displayed on the display is rearranged to correct the perceived 3D depth of perception, as previously discussed with reference to FIGS. 17-20, the formatter 260 in the controller 170 may change the arrangement of the images, as shown in FIG. 28C. For example, the formatter 260 may rearrange the display of the left-eye image 1610*c* and right-eye image 1620*c* such that the left-eye image 1610*c* is displayed first in time, then the right-eye image 1620*c* is displayed thereafter. Accordingly, the 3D image 1600*c* may be correctly viewed through the second viewing device 195*b* such that the 3D depth as well as the orientation are adjusted by rearranging the displayed 3D image on the display based on the position of the second viewing device 195*b*.

Figure 29A:
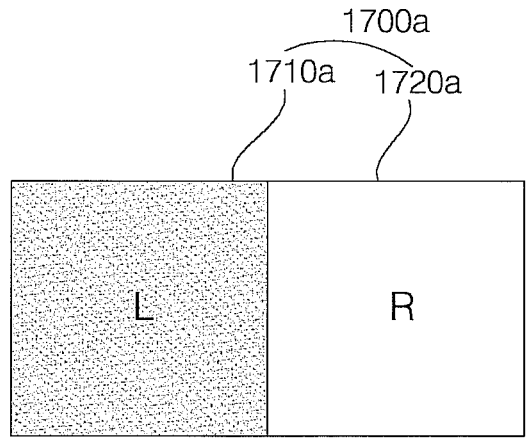
Figure 29B:
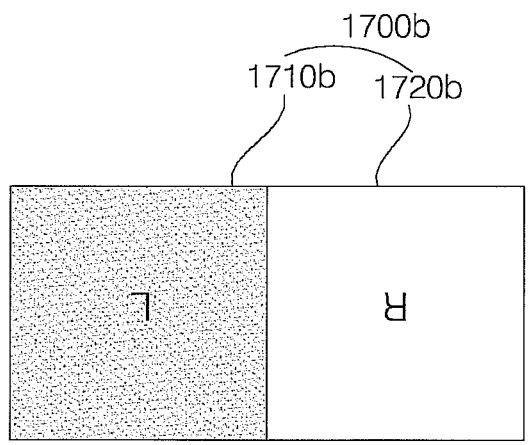
Figure 29C:
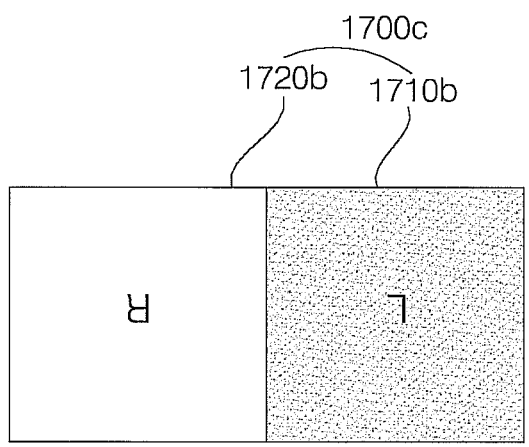

FIGS. 29A to 29C illustrate a process to reverse a 3D image including a left-eye image and a right-eye image having a side by side format of FIG. 3A. The formatter 260 in the controller 170 may arrange a left-eye image 1710*a* to the left among the left-eye image 1710*a* and a right-eye image 1720*a* which constitute a 3D image 1700*a*, and may arrange the right-eye image 1720*a* to the right, as shown in FIG. 29A. Here, the 3D image 1700*a* may be configured to be viewed in a direction corresponding to the first viewing device 195*a*.

When the movement input is made as described above, the formatter 260 in the controller 170 may reverse each of the left-eye image and right-eye image (i.e., rotates each image by 180 degrees) to generate a reversed 3D image 1700*b* including a reversed left-eye image 1710*b* and a reversed right-eye image 1720*b*, as shown in FIG. 29B.

If the second viewing device 195*b* is reconfigured to correct the depth of perception (protrusion or recession) of the 3D image viewed through the second viewing device 195*b*, then the reversed 3D image 1700*b*, as shown in FIG. 29B, may be displayed in the upper region corresponding to the second viewing device 195*b*. Here, as previously described with reference to FIGS. 21 to 25, the polarity of the second viewing device 195*b* may be reconfigured (e.g., switched) to correct the perceived 3D depth of the image viewed through the second viewing device 195*b*.

However, if the 3D image displayed on the display is rearranged to correct the perceived 3D depth of perception, as previously discussed with reference to FIGS. 17-20, the formatter 260 in the controller 170 may change the arrangement of the images, as shown in FIG. 29C. For example, the formatter 260 may arrange the reversed right-eye image 1720*b* to the left and may arrange the reversed left-eye image 1710*b* to the right to generate a new 3D image 1700*c*. As a result, the 3D image 1700*c* of FIG. 29C may correspond to an image obtained by reversing the entirety of the 3D image 1700*a* of FIG. 29A (by rotating by 180 degrees). Accordingly, the 3D image 1700*c* may be correctly viewed through the second viewing device 195*b* such that its 3D depth as well as the orientation are adjusted by rearranging the displayed 3D image on the display based on the position of the second viewing device 195*b*.

Figure 30A:
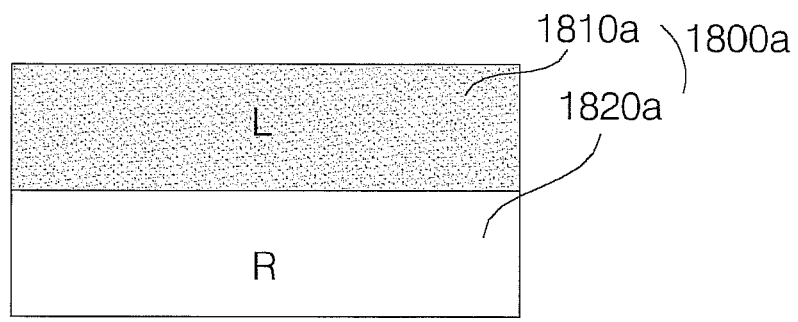
Figure 30B:
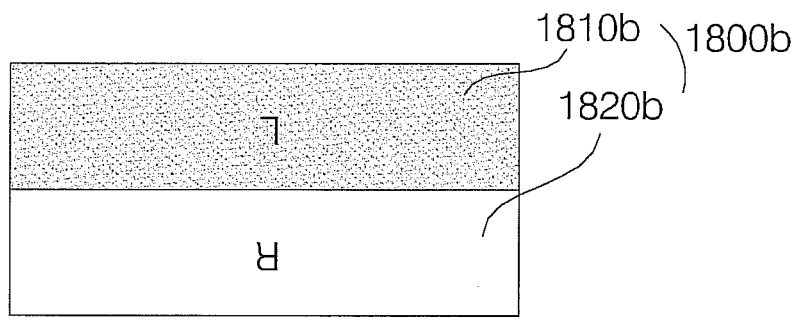
Figure 30C:
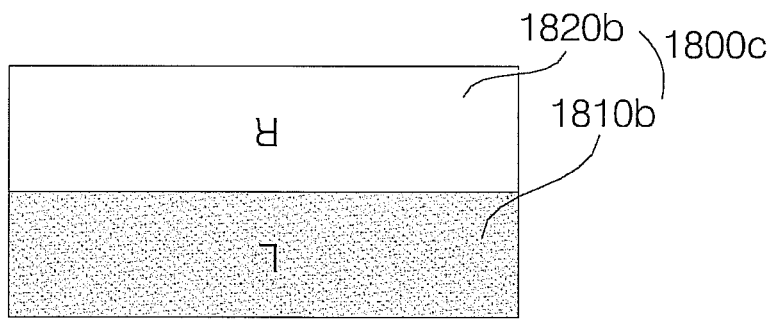

FIGS. 30A to 30C illustrate a process to reverse a 3D image including a left-eye image and a right-eye image having a top/down format of FIG. 3B. The formatter 260 in the controller 170 may arrange a left-eye image 1810*a* at the top among the left-eye image 1810*a* and a right-eye image 1820*a* which constitute a 3D image 1800*a*, and may arrange the right-eye image 1820*a* at the bottom, as shown in FIG. 30A. Here, the 3D image 1800*a* may be configured to be viewed in a direction corresponding to the first viewing device 195*a*.

When the movement input is made as described above, the formatter 260 in the controller 170 may reverse each of the left-eye image and right-eye image (i.e., rotates each image by 180 degrees) and may generate a reversed 3D image 1800*b* including a reversed left-eye image 1810*b* and a reversed right-eye image 1820*b*, as shown in FIG. 30B.

If the second viewing device 195*b* is reconfigured to correct the depth of perception (protrusion or recession) of the 3D image viewed through the second viewing device 195*b*, then the reversed 3D image 1800*b*, as shown in FIG. 30B, may be displayed in the upper region corresponding to the second viewing device 195*b*. Here, as previously described with reference to FIGS. 21 to 25, the polarity of the second viewing device 195*b* may be reconfigured (e.g., switched) to correct the perceived 3D depth of the image viewed through the second viewing device 195*b*.

However, if the 3D image displayed on the display is rearranged to correct the perceived 3D depth of perception, as previously discussed with reference to FIGS. 17-20, the formatter 260 in the controller 170 may then change the arrangement of the images, as shown in FIG. 30C. For example, the formatter 260 may arrange the reversed right-eye image 1820*b* at the top and may arrange the reversed left-eye image 1810*b* at the bottom to generate a new 3D image 1800*c*. As a result, the 3D image 1800*c* of FIG. 30C may correspond to an image obtained by reversing the entirety of the 3D image 1800*a* of FIG. 30A (by rotating by 180 degrees). Accordingly, the 3D image 1800*c* may be correctly viewed through the second viewing device 195*b* such that its 3D depth as well as the orientation are adjusted by rearranging the displayed 3D image on the display based on the position of the second viewing device 195*b*.

Figure 27B:
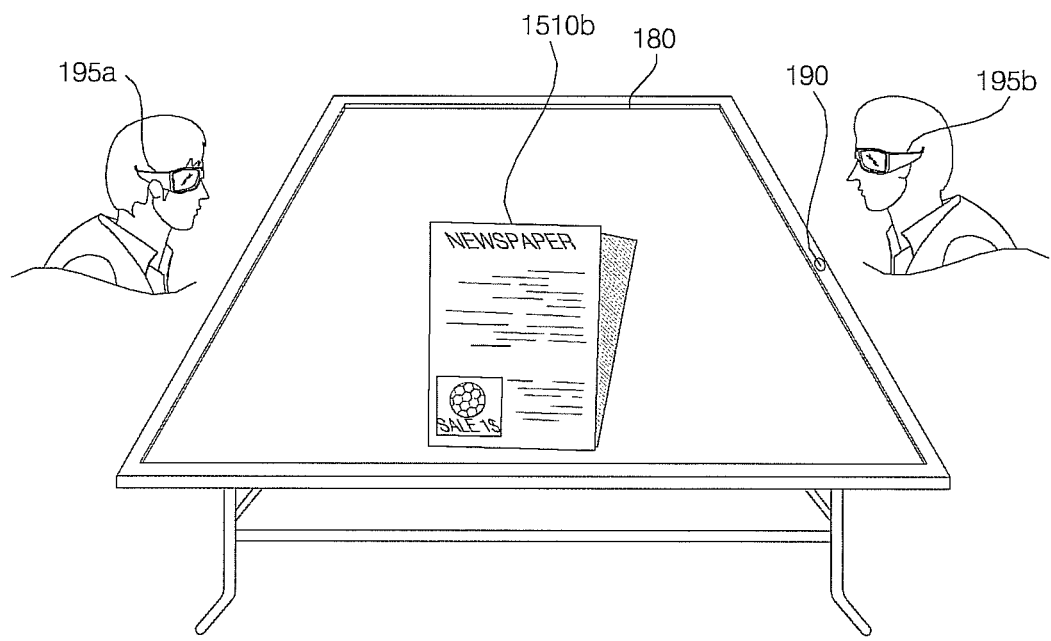
Figure 27C:
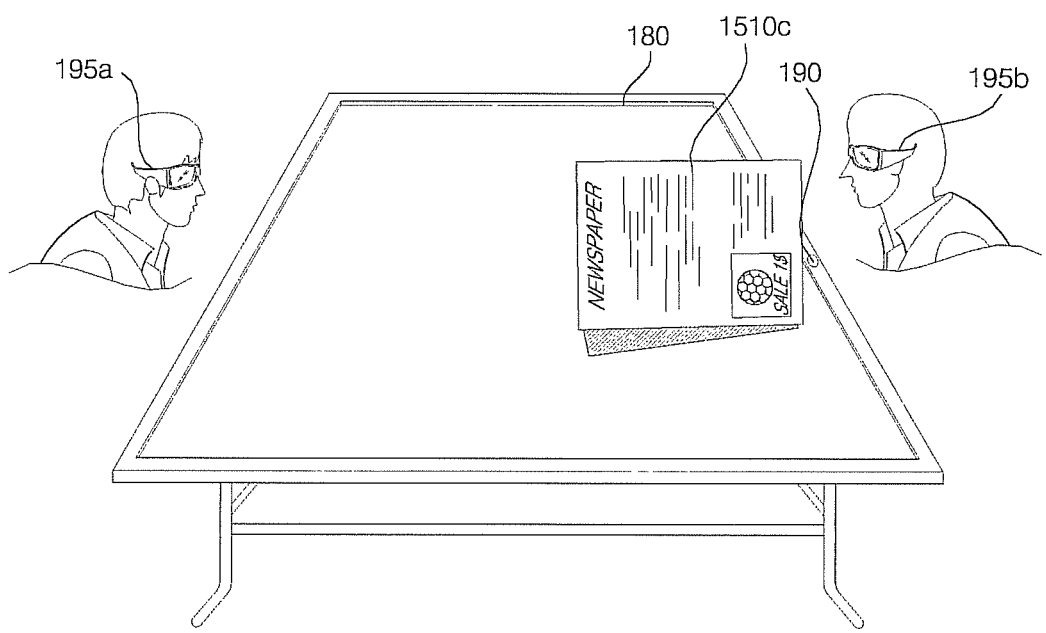

FIG. 27C illustrates that a 3D image 1510*c* for the second user wearing the second viewing device 195*b* is displayed on a second region (specifically, an upper region) of the display 180. The 3D image 1510*c* may be displayed by reversing the 3D image including the left-eye image and the right-eye image as described above. This may allow the second user to correctly view the 3D image when recommended by the first user.

Moreover, the 3D image 1510*a*, 1510*c* may be moved instantly from the first region of the display corresponding to the first viewing device (bottom of the display) to the second region of the display corresponding to the second viewing device (top of the display). Alternatively, various graphical effects may be used to move the 3D image 1510*a* across the display. For example, the 3D image 1510*a* may be displayed to slide across the display while rotating in response to the move input.

In one embodiment, a procedure for displaying a 3D image rotated by 90 degrees may be performed as an intermediate process before the moved 3D image is displayed on the second region of the display 180. Referring now to FIG. 27B, the 3D image 1510*a* may be rotated counterclockwise by 90 degrees to produce a 3D image 1510*b*. This image may be displayed on a third region (specifically, a right region) of the display 180. To accomplish this, the formatter 260 in the controller 170 may rotate the 3D image including the left-eye image 1610*a* and the right-eye image 1620*a* as illustrated in FIG. 28A by 90 degrees in a counterclockwise direction. Similarly, the formatter 260 may also rotate the 3D image including the left-eye image 1710*a* or 1810*a* or the right-eye image 1720*a* or 1820*a* illustrated in FIG. 29A or FIG. 30A by 90 degrees in the counterclockwise direction. This may allow the user to intuitively recognize that the 3D image is rotated and moved by the movement input. Of course, the 3D image 1510*a* may be rotated by 90 degrees in the clockwise direction to produce an image for display on a fourth region (specifically, a left region) of the display 180.

Figure 31A:
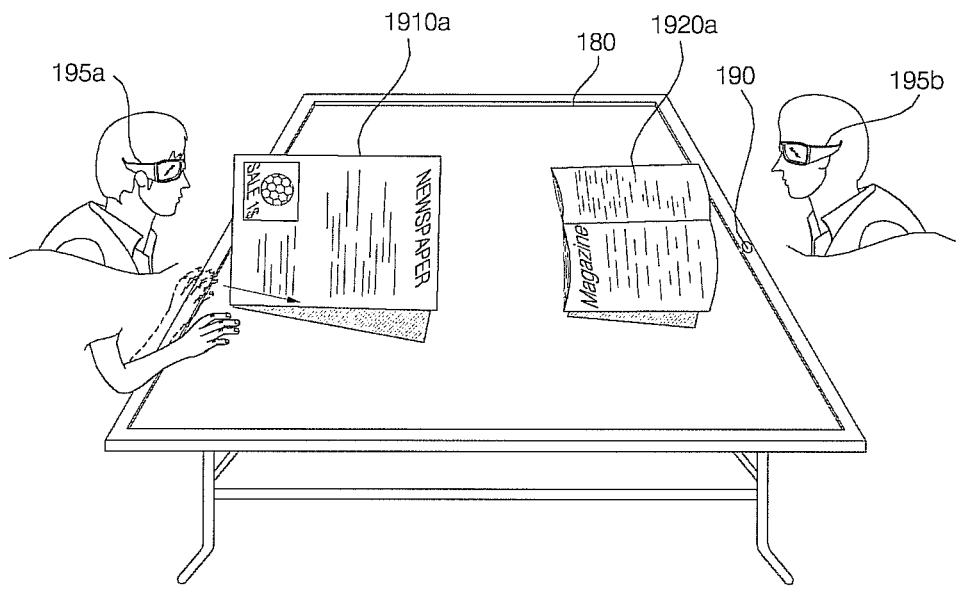

FIGS. 31A to 31D and FIGS. 32A to 32C illustrate various examples of a movement of a 3D image between two users located at opposite sides. First, FIG. 31A illustrates that a 3D image 1910*a* for the first user wearing the first viewing device 195*a* is displayed on a first region (specifically, a lower region) of the display 180 and a 3D image 1920*a* for the second user wearing the second viewing device 195*b* is displayed on a second region (specifically, an upper region) of the display 180.

FIG. 31A differs from FIG. 27A in that another 3D image 1920*a* which is different than 3D image 1910*a* may be displayed on the second region. The displayed 3D image 1910*a* or 1920*a* may be a content related image such as a broadcast image, a web site (specifically, a news site, a magazine site, an advertisement, or the like), an electronic document screen, a video image playback screen, or a audio player screen.

Here, when the first user makes a 3D image movement gesture toward the second viewing device 195*b*, for example, to recommend the 3D image 1910*a* to the second user wearing the second viewing device 195*b*, as shown in FIG. 31A, the controller 170 may identify and generate a movement input corresponding to the gesture.

Figure 31B:
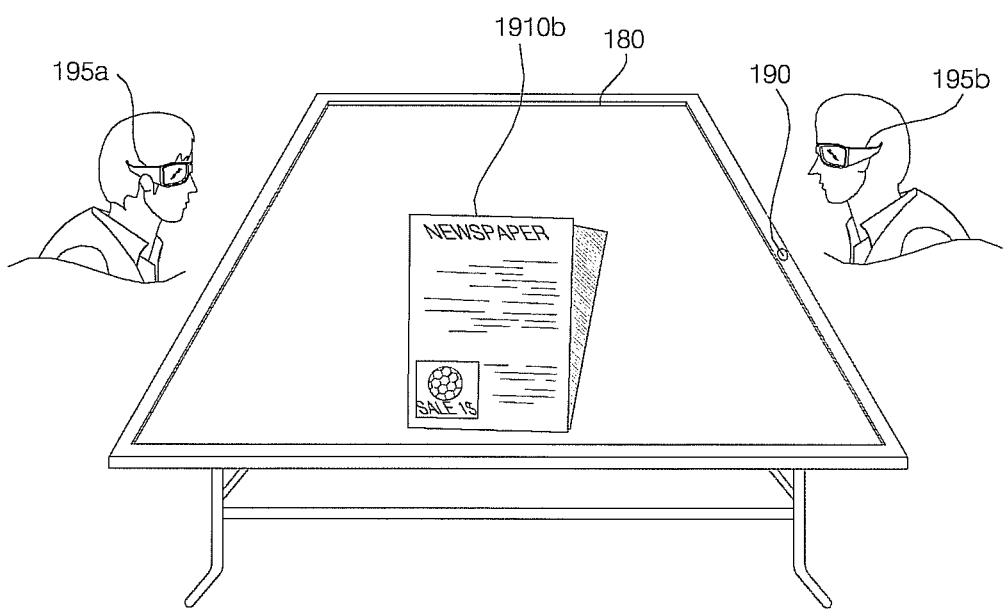

FIG. 31B illustrates a display of the 3D image 1910*b* obtained by rotating the 3D image 1910*a* of FIG. 31A by 90 degrees in a counterclockwise direction for display in a third region (specifically, a right region) of the display 180, similar to FIG. 27B. Here, the 3D image 1920*a* displayed in the second region of the display 180 may be removed to prevent overlap between the 3D image 1920*a* displayed on the second region and the 3D image 1910*b* displayed on the third region.

Figure 31C:
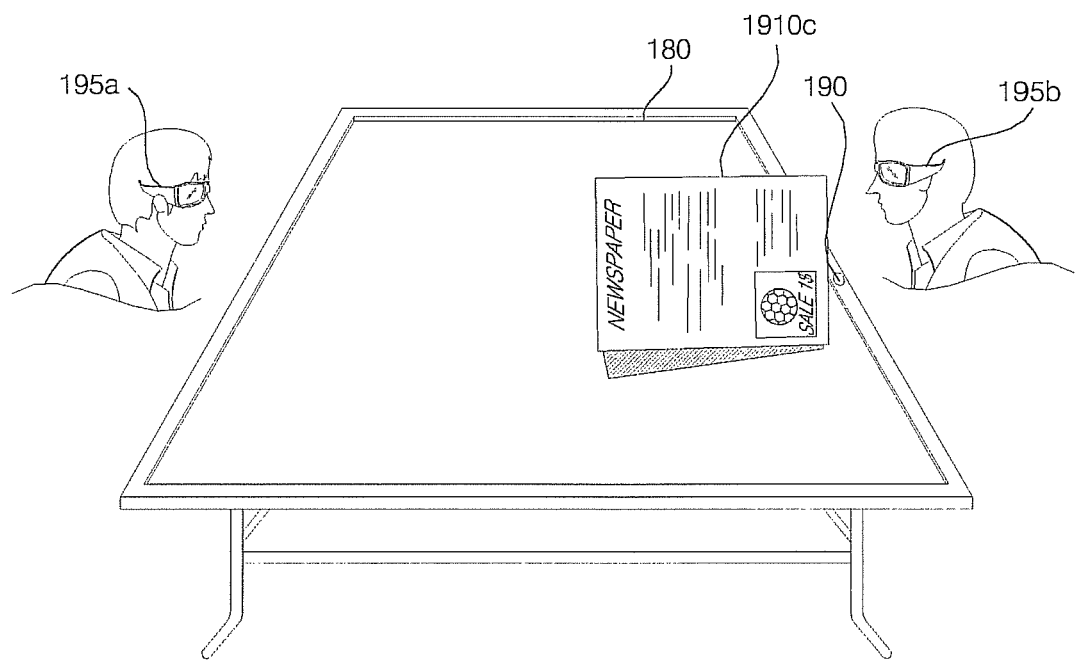

FIG. 31C illustrates a display of a 3D image 1910*c* obtained by reversing the entirety of the 3D image including the left-eye and right-eye images for display in the second region (specifically, the upper region) of the display 180, similar to FIG. 27C.

This may allow the second user wearing the 195*b* to perceive a 3D image recommended by the first user as protruding without distortion. Hence, the user may correctly view the 3D image even though the 3D image is moved, e.g., viewed from a different direction corresponding to the second viewing device 195*b*.

Figure 32A:
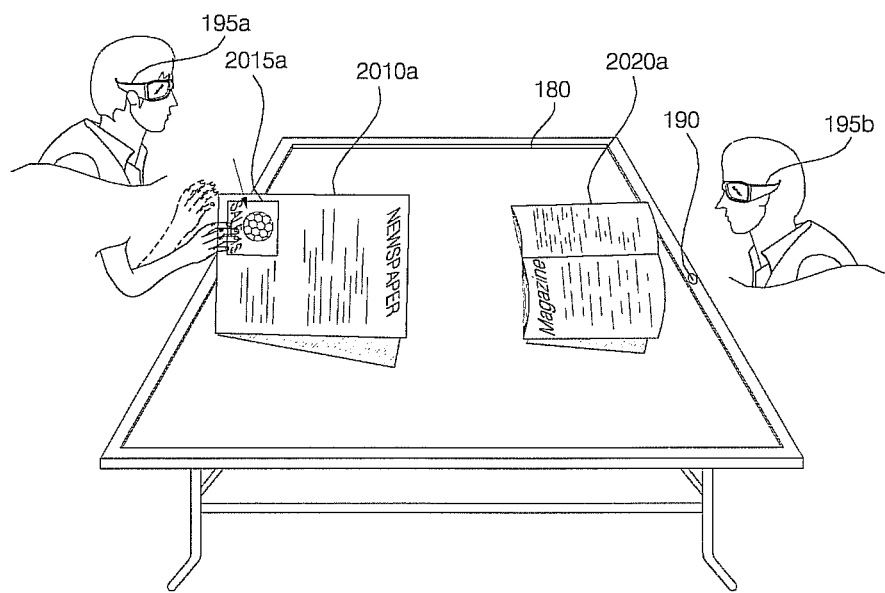
Figure 32B:
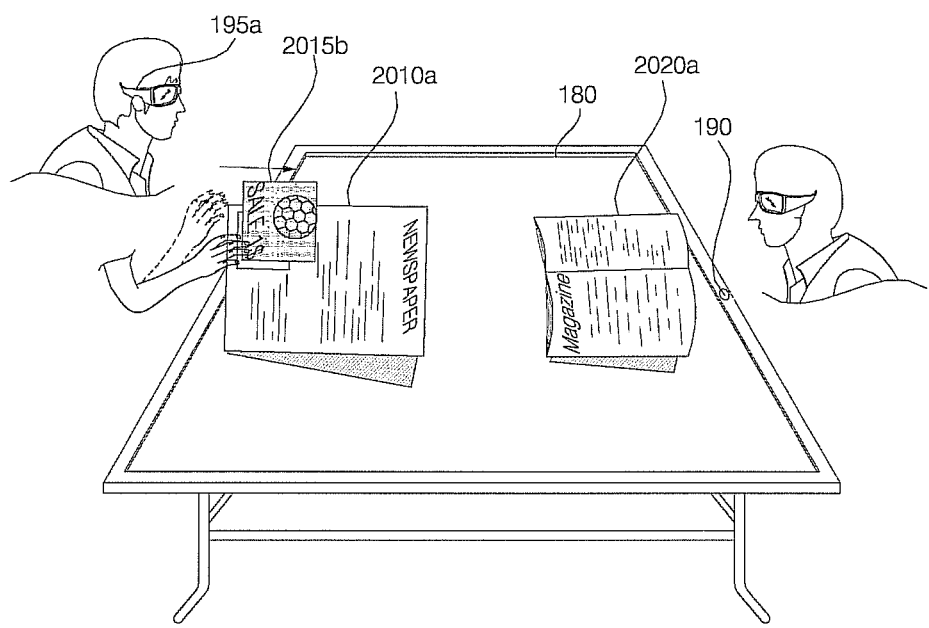
Figure 32C:
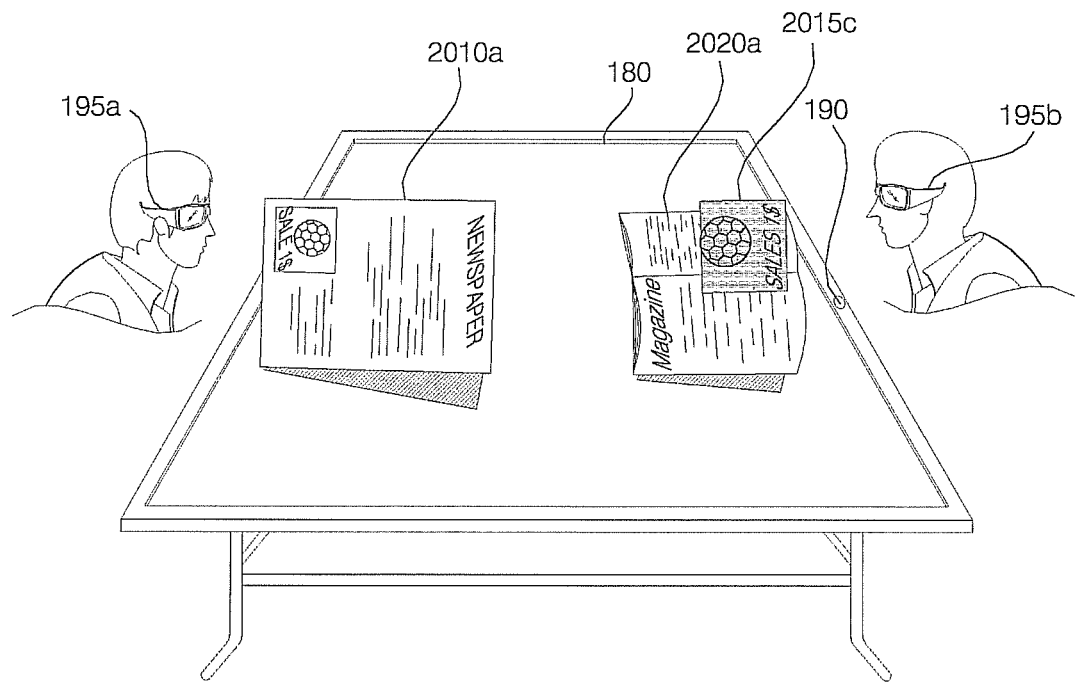

FIGS. 32A to 32C illustrate various examples of moving an object within a 3D image, similar to FIGS. 31A to 31D. First, FIG. 32A illustrates that a 3D image 2010*a* for the first user wearing the first viewing device 195*a* is displayed on a first region (specifically, a lower region) of the display 180 and a 3D image 2020*a* for the second user wearing the second viewing device 195*b* is displayed on a second region (specifically, an upper region) of the display 180.

The displayed 3D image 2010*a* or 2020*a* may be a content related image such as a broadcast image, a web site (specifically, a news site, a magazine site, an advertisement, or the like), an electronic document screen, a video image screen, or an audio player screen.

Here, when the first user makes a 3D image movement gesture to select a specific object 2015*a* in the 3D image 2010*a*, for example, to recommend the specific object 2015*a* to the second user wearing the second viewing device 195*b*, as shown in FIG. 32A, the controller 170 may identify and generate a movement input corresponding to the gesture through the sensor unit 160 or the image capture unit 190.

FIG. 32B illustrates a display of the selected object 2015*b* at a depth (perceived depth of perception) which is different than for the 3D image 2010*a*. For example, the selected object 2015*b* may appear to protrude more than the 3D image 2010*a* when the object 2015*b* is selected. Moreover, when the first user makes a 3D image movement gesture to move the selected object 2015*b* toward the second viewing device 195*b* to recommend the 3D image 1510*a* to the second user wearing the second viewing device 195*b*, the controller 170 may generate a movement input corresponding to the gesture.

FIG. 32C illustrates a display of the object 2015*c* for which a movement input has been made in the second region (upper region) of the display 180 at a depth which may be different from the 3D image 2020*a* displayed in the second region for the second user wearing the second viewing device 195*b*. The 3D object 2015*c* may be obtained by reversing the 3D object 2015*b* of FIG. 32B (i.e., rotating the 3D object by 180 degrees) by a process as described above with reference to FIGS. 26 to 31. This may allow the second user to reliably view the 3D image 2020*a* as well as the object 2015*c*.

The movable object 2015*c* may be one of a variety of displayed objects including, for example, an EPG information which may be broadcast to the display apparatus 100 during viewing of a broadcast image. The movable object 2015*c* may also be specific program information in the EPG. For example, one user may perform such an object movement operation to recommend broadcast information or a specific program to another user. This allows users to easily move a 3D image or part of the 3D image while viewing the 3D image.

Figure 33:
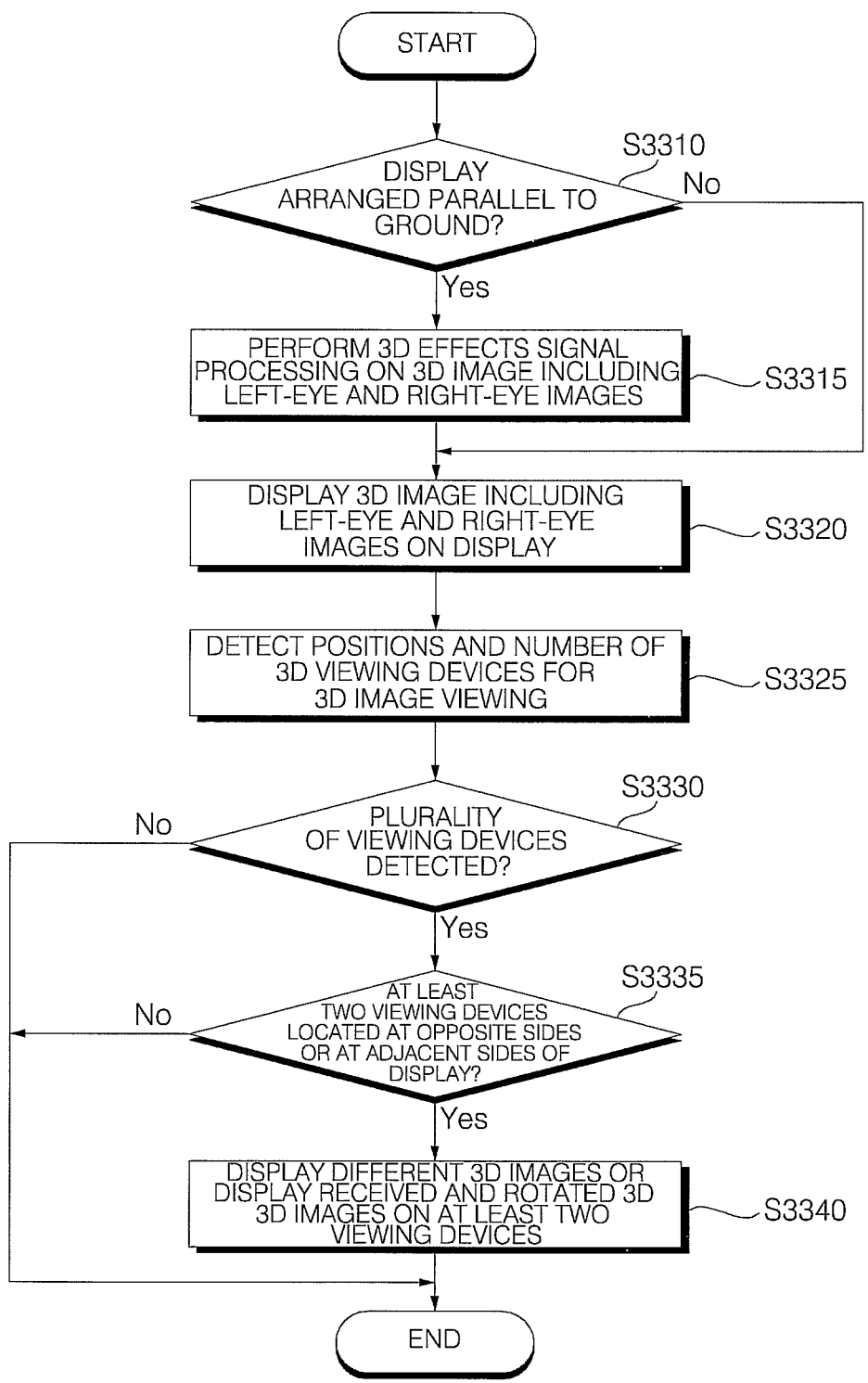
FIGS. 33 and 34 are flow charts of a method for operating an image display apparatus according to an embodiment of the present disclosure.
Figure 34:
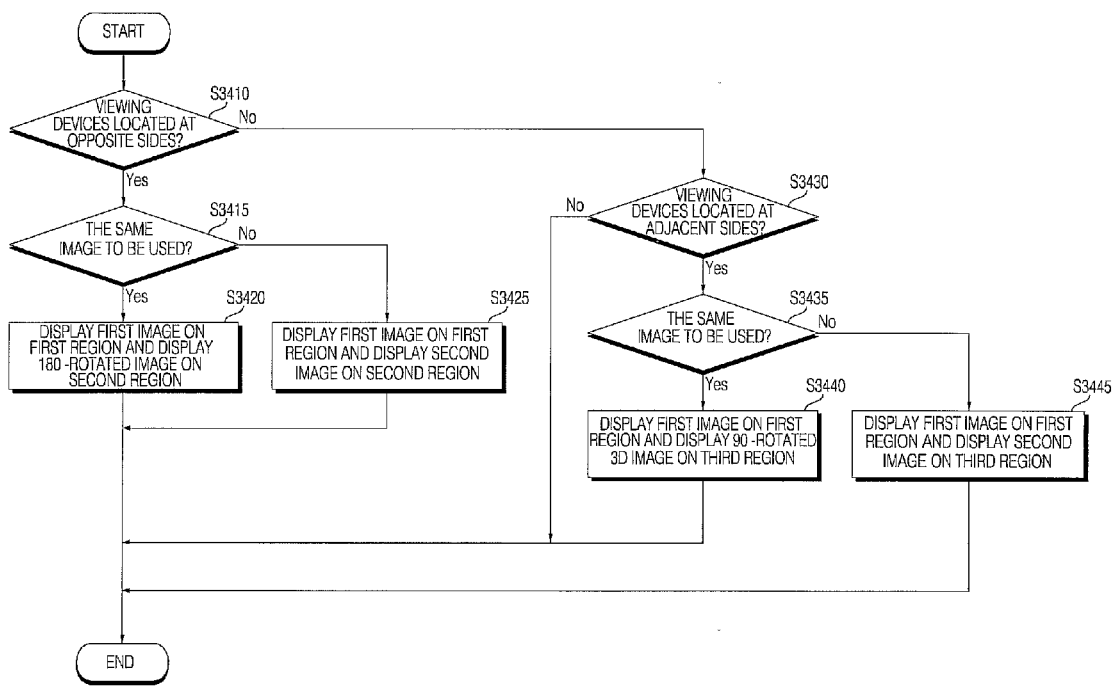

FIGS. 33 and 34 are a flow charts of a method for operating an image display apparatus according to an embodiment of the present disclosure, and FIGS. 35 to 47 illustrate various examples of the method for operating an image display apparatus shown in FIGS. 33 and 34. Referring to FIG. 33, the controller 170 may determine whether or not the display is arranged parallel to the ground, in step S3310. When the display is arranged parallel to the ground or within a prescribed angle relative to horizontal, the controller 170 may perform 3D effects signal processing on a 3D image including a left-eye image and a right-eye image, in step S3315. The controller 170 may then display the 3D image including the left-eye and right-eye images on the display, in step S3320. When the display is arranged perpendicular to the ground, the controller 170 may perform step S3320 to display the 3D image including the left-eye and right-eye images on the display corresponding to this orientation of the display. Steps S3310 to S3320 correspond to steps S1110 to S1120 of FIG. 11, and therefore, repetitive description of previously disclosed steps is omitted herein.

In step S3325, the controller 170 may detect the number of viewing devices for 3D image viewing as well as the positions of the 3D viewing devices. The controller 170 may then determine whether a plurality of 3D viewing devices have been detected, in step S3330. When a plurality of 3D viewing devices are detected, the controller 170 may determine whether or not the positions of at least two of the detected 3D viewing devices are at opposite sides or at adjacent sides of the display 180, in step S3335. When the positions of the at least two detected 3D viewing devices are at opposite sides or at adjacent sides of the display 180, the controller 170 may display different 3D images on the at least two detected 3D viewing devices. Alternatively, the controller 170 may display the 3D image for one of the detected 3D viewing devices while displaying a modified 3D image (e.g., obtained by rotating and adjusting the 3D depth of the 3D image) for another 3D viewing device, in step S3340.

In the above step S3325, the number of 3D viewing devices for 3D image viewing and the positions of the 3D viewing devices may be detected using the sensor unit 160 or the image capture unit 190. For example, each user or each 3D viewing device 195 may be detected using a position sensor in the sensor unit 160. The position of each 3D viewing device 195 may also be detected using the wireless communication interface 198 of the image display apparatus 100 which communicates with the wireless communication unit 930 of the 3D viewing device 195.

In the above steps S3330 and S3335, the controller 170 may detect the position of each 3D viewing device 195 or the position of each user to determine the number of the 3D viewing devices and to determine whether or not the positions of at least two of the detected 3D viewing devices are at opposite sides or at adjacent sides of the display 180 when a plurality of the 3D viewing devices is detected.

FIG. 34 is a flow chart of a method of displaying a 3D image to illustrate the step S3340 of FIG. 33 described above in further detail. Here, the controller 170 may determine whether at least two of detected 3D viewing devices are located at opposite sides with respect to the display, in step S3410. When the positions of the at least two detected 3D viewing devices are at opposite sides of the display 180, the controller 170 may determine whether or not the same image is to be used to display 3D images on the 3D viewing devices, in step S3415. If the controller 170 determines that the same image is to be used, the controller 170 may display a first image on the first region of the display 180 and may display a processed image (e.g., an image obtained by rotating the first image by 180 degrees and correcting the 3D depth based on the position of the second viewing device) on the second region of the display 180, in step S3420.

Figure 35A:
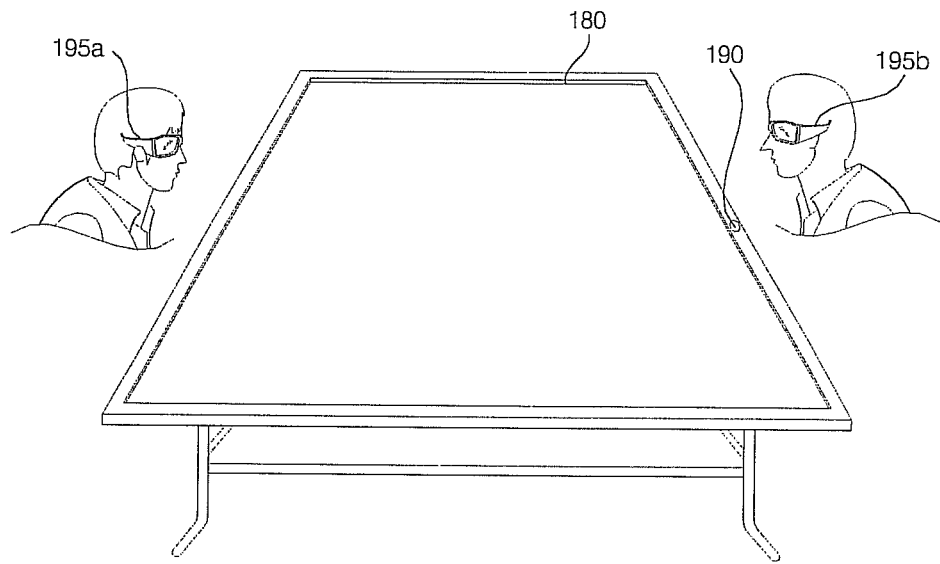
FIGS. 35A to 47 illustrate various examples of the methods for operating an image display apparatus of FIGS. 33 and 34.

For example, as shown in FIG. 35A, a first user wearing the first viewing device 195*a* and a second user wearing the second viewing device 195*b* are located at opposite sides of the display 180 in association with the above step S3410. The first user may be positioned at the lower portion of the display 180 (opposite to the image capture unit 190) and the second user may be positioned at the upper portion of the display 180 (at the side on which the image capture unit 190 is provided).

Figure 35B:
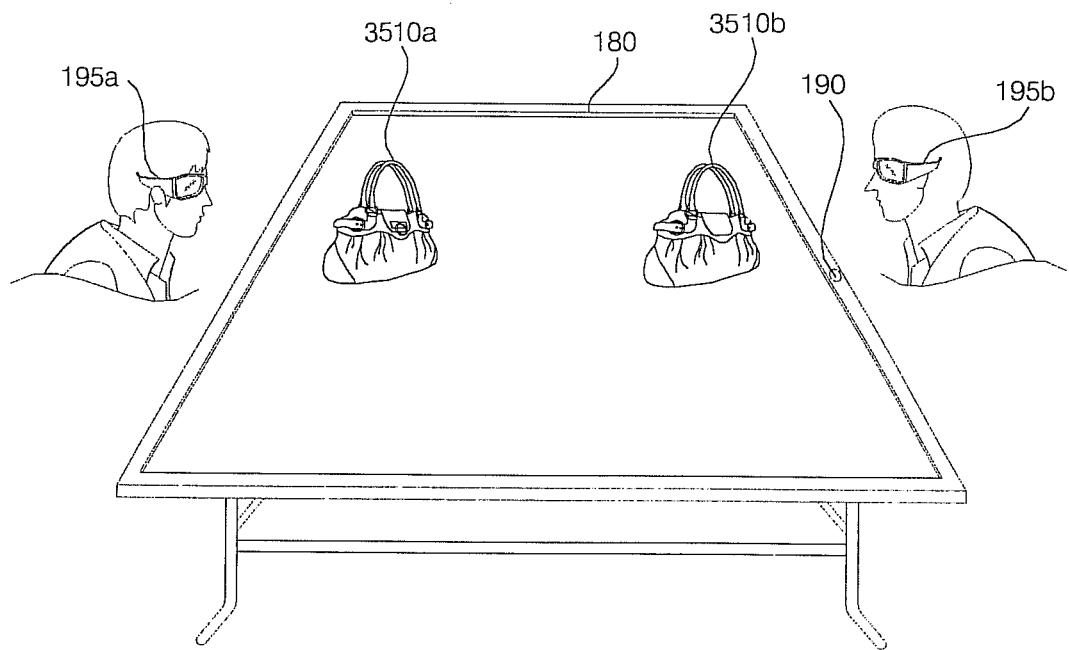

In the above steps S3415 and S3420, the controller 170 may use the same received 3D image to display 3D images on the first viewing device 195*a* and the second viewing device 195*b*. Specifically, the controller 170 may display a 3D image 3510*a* on the display 180 in synchronization with the first viewing device 195*a* and may display a 3D image 3510*b* obtained by rotating the 3D image 3510*a* by 180 degrees in synchronization with the second viewing device 195*b*, as shown in FIG. 35B.

The displayed 3D images 3510*a* and 3510*b* may be a content related image such as a broadcast image, a web site (specifically, a news site, a magazine site, an advertisement, or the like), an electronic document screen, a video playback screen, an audio player screen, or another appropriate image. The operation to rotate the received 3D image by 180 degrees may be performed by the formatter 260 in the controller 170.

This operation will be described in further detail with reference to FIGS. 36 to 39 hereinafter.

If it is determined, in step S3415, that the same image is not to be used, the controller 170 may display a first image on the first region and display a second image on the second region, in step S3425. This operation will be described in further detail with reference to FIG. 41A to 42 hereinafter.

If it is determined, in step S3410 that at least two of the detected 3D viewing devices are not located at opposite sides of the display 180, the controller 170 may determine whether or not at least two of the detected 3D viewing devices are located at adjacent sides of the display 180, in step S3430. If at least two of the detected 3D viewing devices are located at adjacent sides, the controller 170 may determine whether or not the same image is to be used, in step S3435. If it is determined that the same image is to be used, the controller 170 may display a first image on the first region and may display an image obtained by rotating the first image by 90 degrees in the third region, in step S3440. This operation will be described in further detail with reference to FIGS. 43A to 44 hereinafter.

If it is determined, in step S3435, that the same image is not to be used, the controller 170 may display a first image on the first region and may display a second image on the third region, in step S3445. This operation is similar to the above step S3425 and will be described in further detail with reference to FIGS. 41A to 42 hereinafter.

Referring now to FIG. 36, a 3D image may be obtained by rotating a received 3D image by 180 degrees under the side by side format of FIG. 3A. The formatter 260 in the controller 170 may arrange a left-eye image L and a right-eye image R that constitute a 3D image 1710 to the left and to the right, respectively, according to the side by side format as shown in FIG. 36A.

Figure 36A:
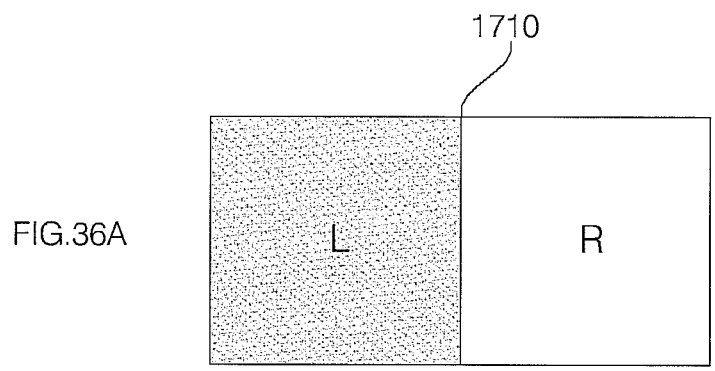
Figure 36B:
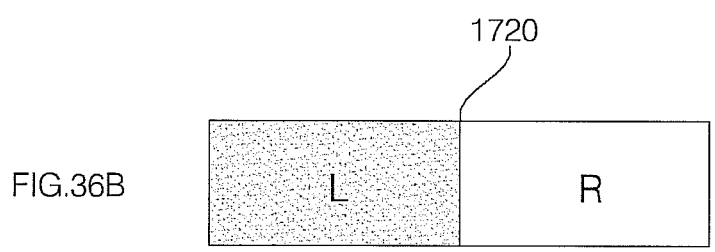

The formatter 260 in the controller 170 may then scale the size of the 3D image 1710 of FIG. 36A, as shown in FIG. 36B. In this embodiment, the 3D image 1710 may be vertically scaled (through non-proportional scaling) to generate a scaled 3D image 1720 having a height which may be ½ of the original height.

Figure 36C:
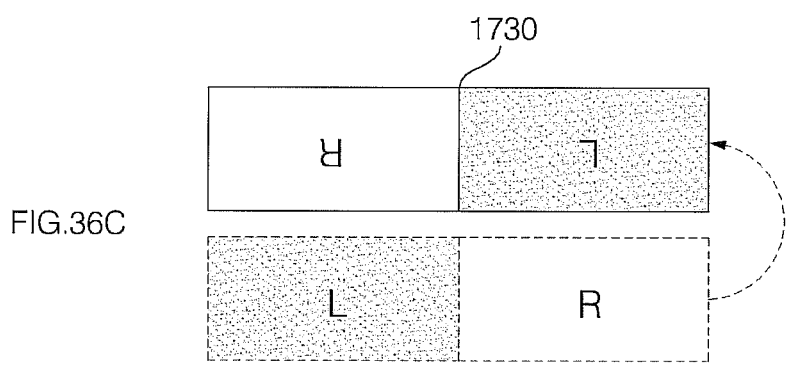
Figure 36D:
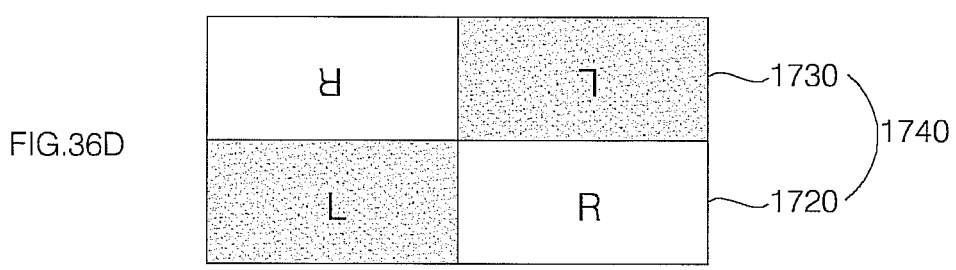

The formatter 260 in the controller 170 may then rotate the scaled 3D image 1720 by 180 degrees to generate a 180°-rotated 3D image 1730, as shown in FIG. 36C. The formatter 260 in the controller 170 may combine the scaled 3D image 1720 and the 180°-rotated 3D image 1730 to obtain a converted 3D image 1740, as shown in FIG. 36D. Accordingly, the first user wearing the first viewing device 195a and the second user wearing the second viewing device 195b may perceive the respective displayed 3D images 3510a and 3510b to be the same 3D image, as shown in FIG. 35B. For example, each image may be associated with a viewing device corresponding to its position relative to the display.

FIG. 37 illustrates another example in which a 3D image may be obtained by rotating a received 3D image by 180 degrees for the side by side format of FIG. 3A. The formatter 260 in the controller 170 may arranges a left-eye image L and a right-eye image R that constitute a 3D image 1810 to the left and to the right, respectively, according to the side by side format as shown in FIG. 37A. The formatter 260 in the controller 170 may then scale the 3D image 1810 of FIG. 37A, as shown in FIG. 37B.

Figure 37A:
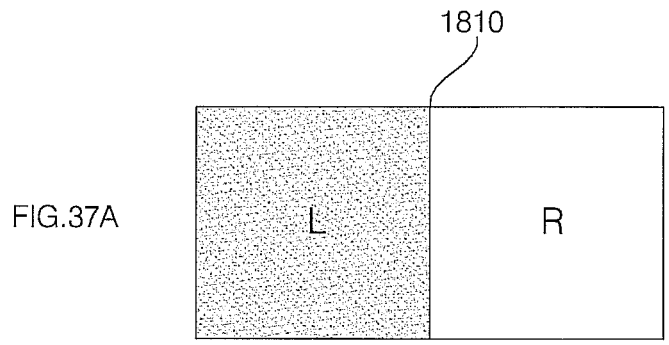
Figure 37B:
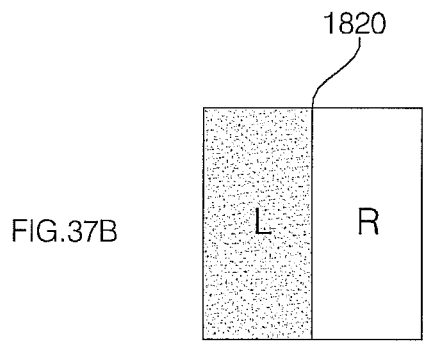
Figure 37C:
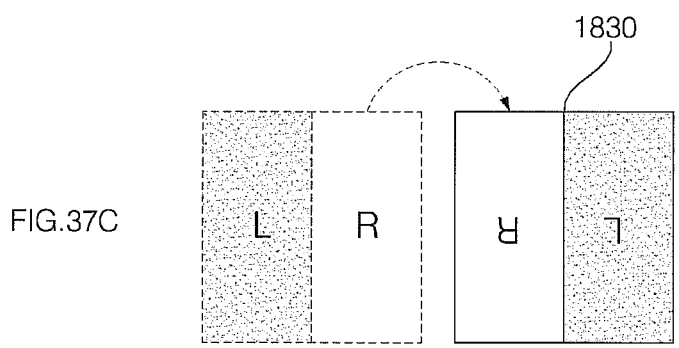
Figure 37D:
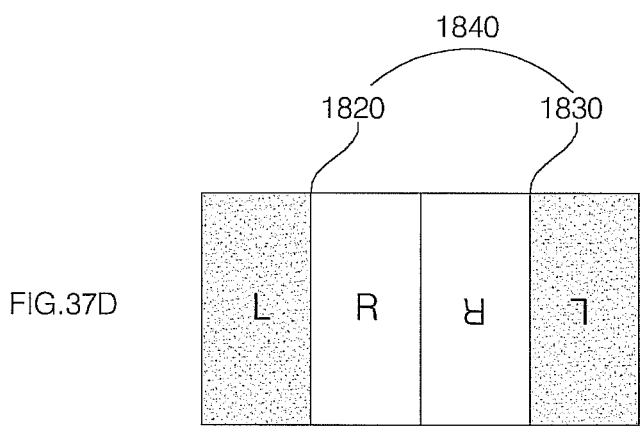

Here, in contrast to the previous embodiment of FIG. 36B, the 3D image 1810 may be scaled horizontally (through non-proportional scaling) to generate a scaled 3D image 1820 having a width which is ½ of the original image. The formatter 260 in the controller 170 may then rotate the scaled 3D image 1820 by 180 degrees to generate a 180°-rotated 3D image 1830, as shown in FIG. 37C. The formatter 260 in the controller 170 may combine the scaled 3D image 1820 and the 180°-rotated 3D image 1830 to obtain a converted 3D image 1840, as shown in FIG. 37D. Accordingly, the first user wearing the first viewing device 195a and the second user wearing the second viewing device 195b may perceive the respective displayed 3D images to be the same 3D image, as shown in FIG. 35B. For example, each image may be associated with a viewing device corresponding to its position relative to the display.

FIG. 38 illustrates an example in which a 3D image may be obtained by rotating a received 3D image by 180 degrees for the top/down format of FIG. 3B. The formatter 260 in the controller 170 may arrange a left-eye image L and a right-eye image R that constitute a 3D image 1910 at the top and at the bottom, respectively, according to the top/down format as shown in FIG. 38A. The formatter 260 in the controller 170 may then scale the 3D image 1910 of FIG. 38A, as shown in FIG. 38B.

In the example illustrated in FIG. 38, the 3D image 1910 may be vertically scaled to generate a scaled 3D image 1920 having a height which is ½ of the original height. The formatter 260 in the controller 170 may then rotate the scaled 3D image 1920 by 180 degrees to generate a 180°-rotated 3D image 1930 as shown in FIG. 38A.

Figure 38A:
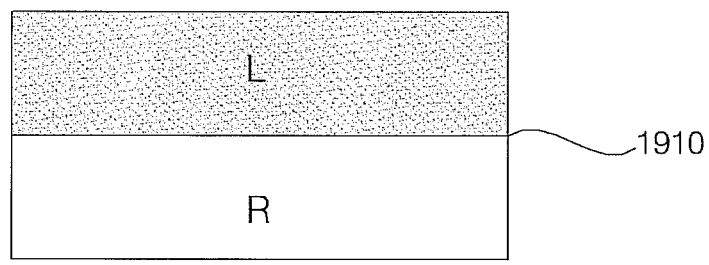
Figure 38B:
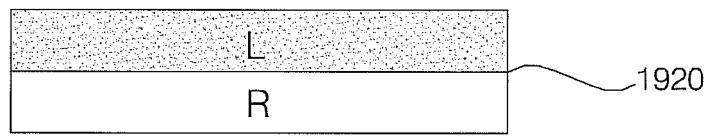
Figure 38C:
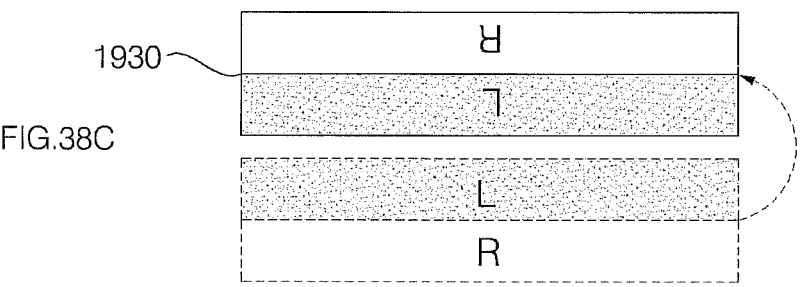
Figure 38D:
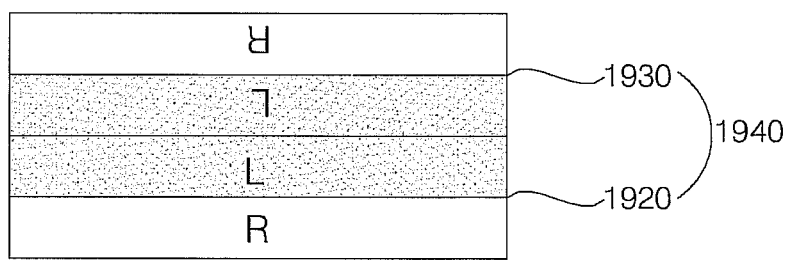

The formatter 260 in the controller 170 may combine the scaled 3D image 1920 and the 180°-rotated 3D image 1930 to obtain a converted 3D image 1940, as shown in FIG. 38D. Accordingly, the first user wearing the first viewing device 195a and the second user wearing the second viewing device 195b may perceive the respective displayed 3D images 3510a and 3510b to be the same 3D image, as shown in FIG. 35B. For example, each image may be associated with a viewing device corresponding to its position relative to the display.

FIG. 39 illustrates an example in which a 3D image may be obtained by rotating a received 3D image by 180 degrees for the frame sequential format of FIG. 3C. The formatter 260 in the controller 170 may first arrange a left-eye image (L) 2005 in time among the left-eye image (L) 2005 and a right-eye image (R) 2008 that constitute a 3D image 2010 and subsequently arranges the right-eye image (R) 2008 in time according to the frame sequential format, as shown in FIG. 39A.

Figure 39A:
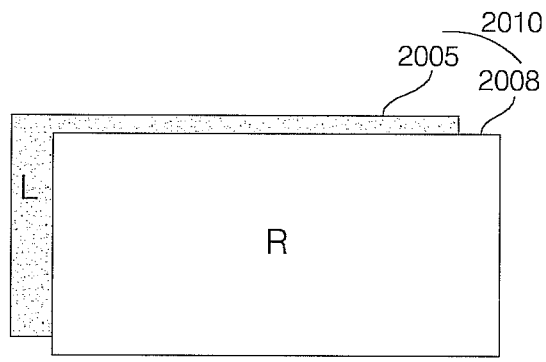
Figure 39B:
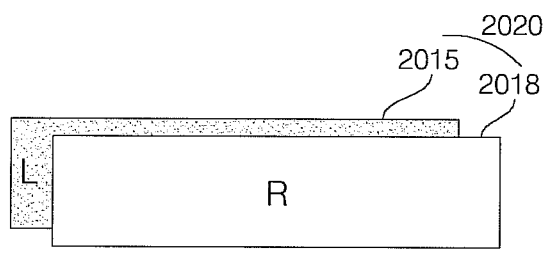

The formatter 260 in the controller 170 may then scale the 3D image 2010 of FIG. 39A, as shown in FIG. 39B. In this embodiment, the 3D image 2010 may be vertically scaled to generate a scaled 3D image 2020 having a height ½ of the original image. The scaled 3D image 2020 may include a scaled left-eye image 2015 and a scaled right-eye image 2018.

Figure 39C:
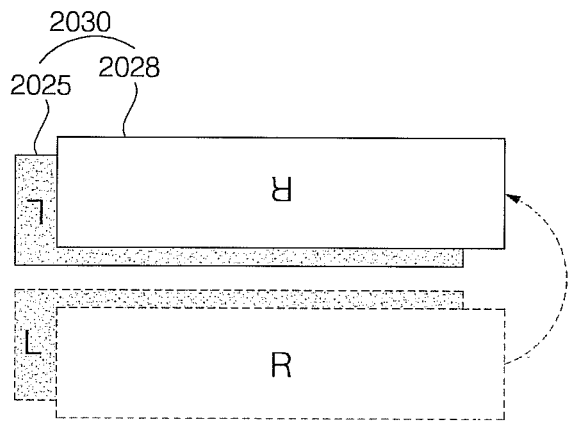
Figure 39D:
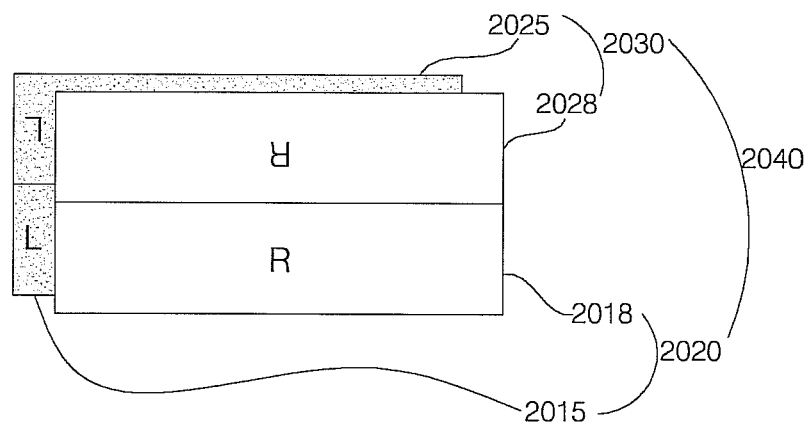

The formatter 260 in the controller 170 may then rotate the scaled 3D image 2020 by 180 degrees to generate a 180°-rotated 3D image 2030, as shown in FIG. 39C. The 180°-rotated 3D image 2030 may include a 180°-rotated left-eye image 2025 and a 180°-rotated right-eye image 2028. The formatter 260 in the controller 170 may combine the scaled 3D image 2020 and the 180°-rotated 3D image 2030 to obtain a converted 3D image 2040, as shown in FIG. 39D. Accordingly, the first user wearing the first viewing device 195a and the second user wearing the second viewing device 195b perceive the respective displayed 3D images 3510a and 3510b to be the same 3D image, as shown in FIG. 35B. For example, each image may be associated with a viewing device corresponding to its position relative to the display.

Figure 40:
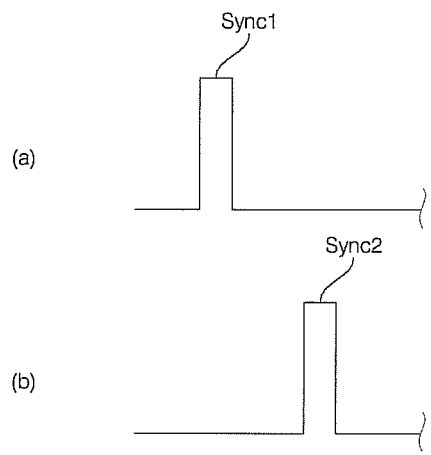

When a 3D image is transmitted in the frame sequential format, as shown in FIG. 39, the image display apparatus may transmit synchronization signals sync1 and sync2 for synchronization with the viewing devices 195a and 195b, as shown in FIG. 40. In the example illustrated in FIGS. 39 and 40, the synchronization signals sync1 and sync2 may be transmitted at different times to achieve synchronization with respective the viewing devices.

Figure 41A:
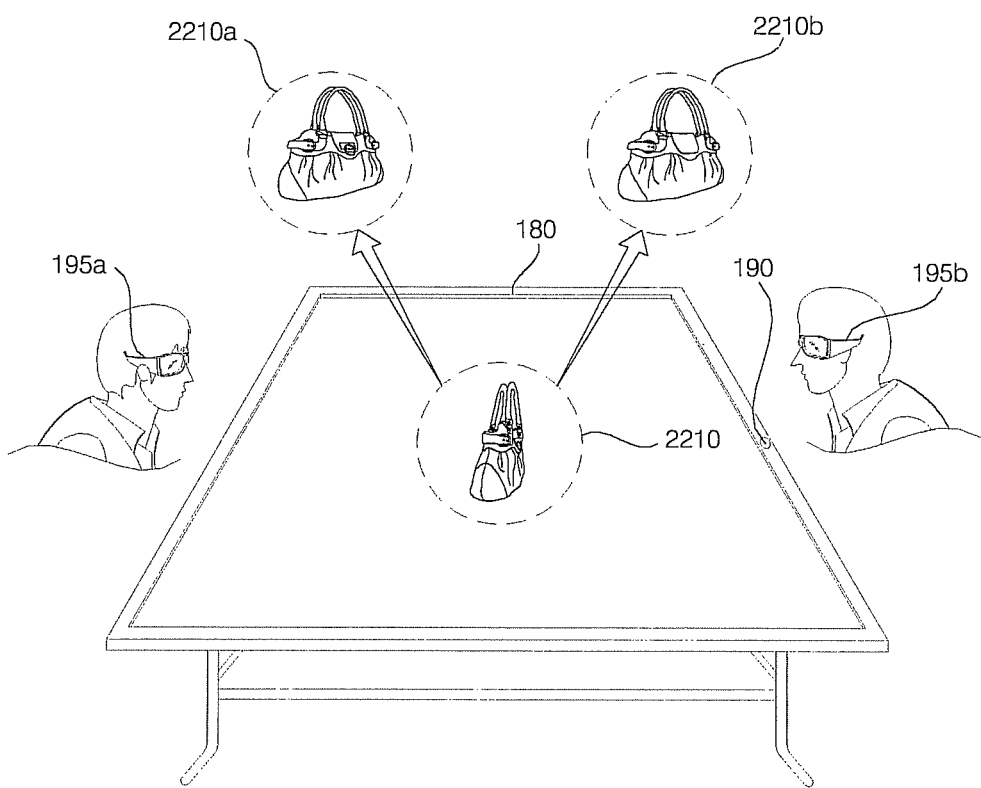

FIG. 41A illustrates a process for displaying different 3D images 2210a and 2210b in the first and second regions of the display 180 when the two viewing devices are located at opposite sides. The images 2210a and 2210b of different views may be displayed depending on the positions of the 3D viewing devices 195a and 195b instead of rotating and displaying the same 3D image, as shown in FIG. 35A.

Figure 41B:
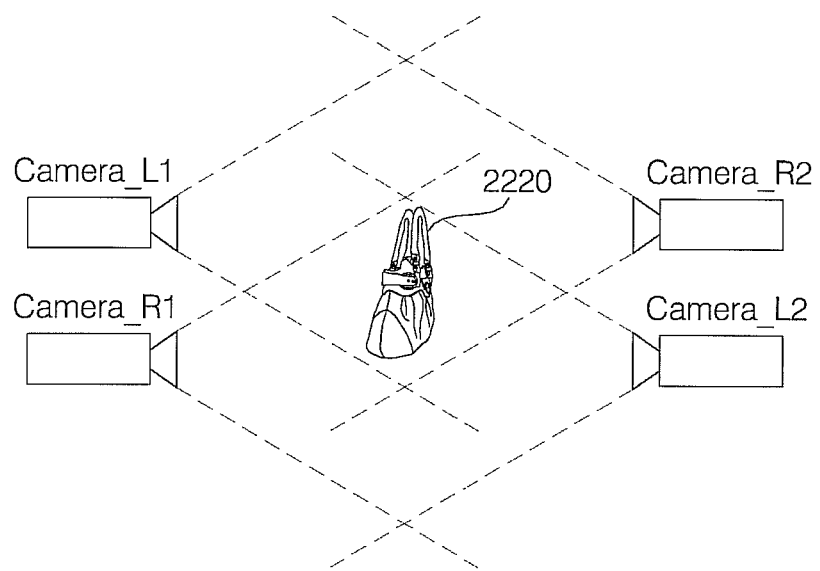

As shown in FIG. 41B, a first received image may be obtained by capturing a subject 2220 using a first left-eye camera L1 and a first right-eye camera R1 from a first side and a second received image may be obtained by capturing the subject 2220 using a second left-eye camera L2 and a second right-eye camera R2 from a second side that is opposite to the first side. When the two viewing devices 195a and 195b are located at opposite sides, the controller 170 may display first and second images 2210a and 2210b having different views to corresponding viewing devices so as to enable display of opposing surfaces of the subject. This may allow users to view a 3D image 2210 having an improved stereoscopic effect.

The controller 170 may perform a control operation to receive 3D images of different views (multiple view 3D image) to enable display of opposing surfaces when the two viewing devices 195a and 195b are located at opposite sides. For example, in the case where 3D images of different views can be transmitted to an external input device, desired ones of the 3D images of different views may be selected and received through the external input device.

Figure 42A:
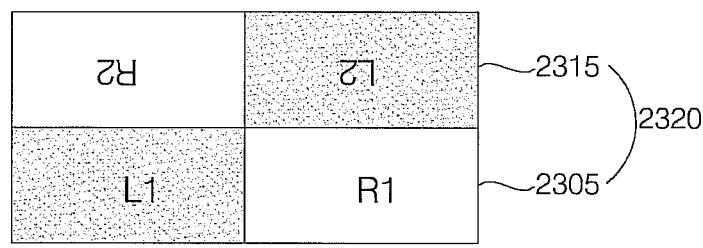
Figure 42B:
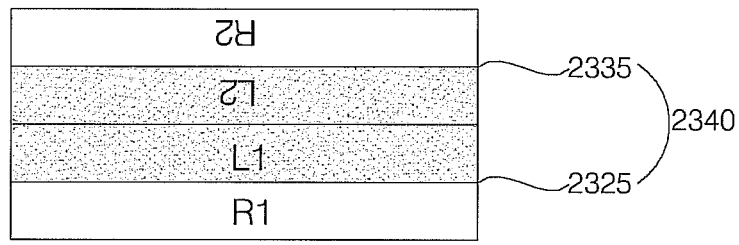
Figure 42C:
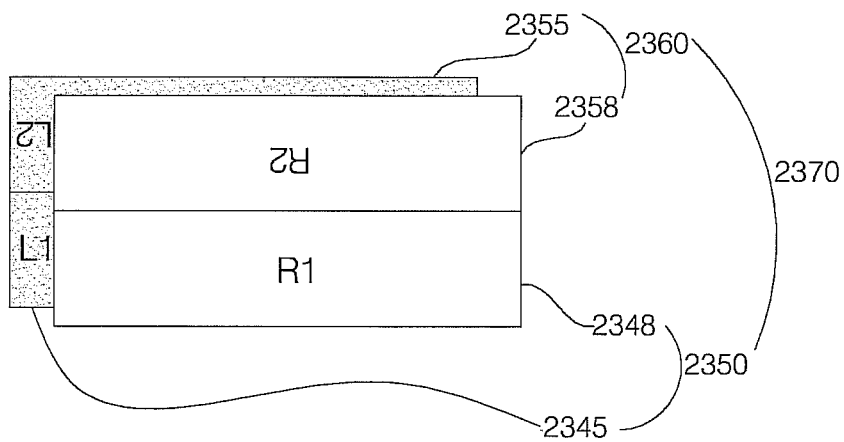

FIGS. 42A to 42C illustrate 3D images of different views having various formats in association with FIG. 41. First, FIG. 42A illustrates a 3D images of different views in the side by side format of FIG. 3A. The formatter 260 in the controller 170 may scale first and second images of different views and may combine the first scaled image 2305 and a second image 2315 obtained by rotating the first image 2305 by 180 degrees to obtain a converted 3D image 2320.

FIG. 42B illustrates 3D images of different views in the top/down format of FIG. 3B. The formatter 260 in the controller 170 may scale the first and second images of different views and may combine the first scaled image 2325 and a second image 2335 obtained by rotating the first scaled image 2325 by 180 degrees to obtain a converted 3D image 2340.

FIG. 42C illustrates 3D images of different views in the frame sequential format of FIG. 3C. The formatter 260 in the controller 170 may scale the first and second images of different views and may combine the first scaled image 2350 and a second image 2360 obtained by rotating the first image 2350 by 180 degrees to obtain a converted 3D image 2370. The first scaled image 2350 may include a scaled left-eye image 2345 and a right-eye image 2348 and the second scaled image 2360 may include a scaled left-eye image 2355 and a scaled right-eye image 2358.

Figure 43A:
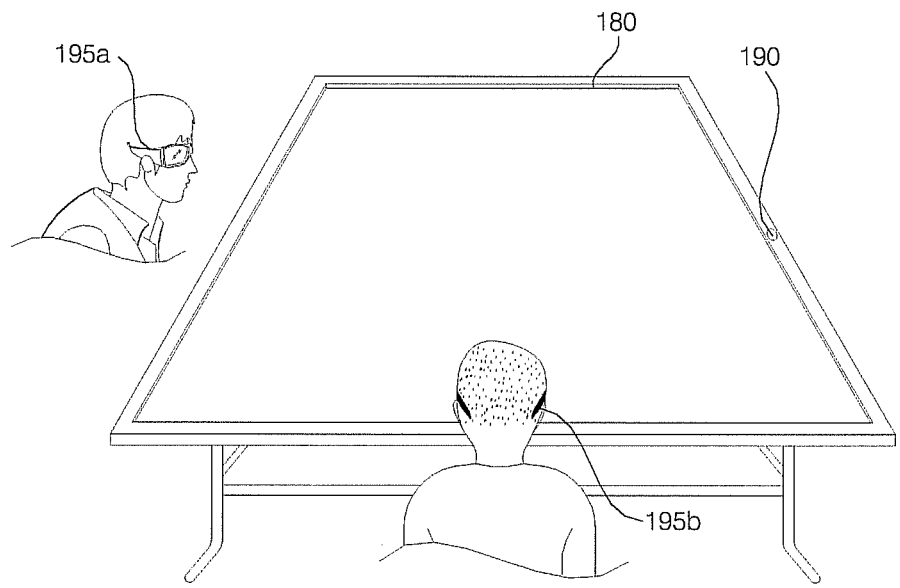

In FIG. 43A, a first user wearing the first viewing device 195a and a second user wearing the second viewing device 195b are located at opposite sides of the display 180 in association with the above steps S3430, S3435, and S3440 of FIG. 34. For example, the first viewing device 195a is positioned at the lower portion of the display 180 opposite the image capture unit 190 and the second viewing device 195b is positioned at the right side of the display 180 which corresponds to the right side of the image capture unit 190.

Figure 43B:
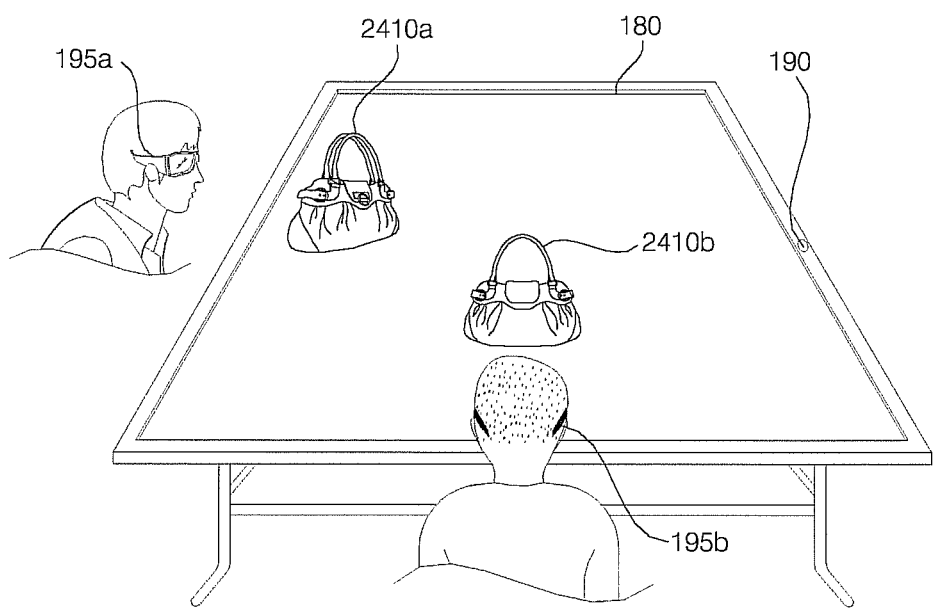

In the steps S3435 and S3440 of FIG. 34, the controller 170 may use the same received 3D image to display 3D images on the first viewing device 195a and the second viewing device 195b. Specifically, the controller 170 may display a 3D image 2410a on the display 180 synchronized with the first viewing device 195a and may display a 3D image 2410b obtained by rotating the 3D image 2410a by 90 degrees and synchronized with the second viewing device 195b, as shown in FIG. 43B.

The displayed 3D image 2410a may be a content related image such as a broadcast image, a web site (specifically, a news site, a magazine site, an advertisement, or the like), an electronic document screen, a video image screen, an audio player screen, or the like. The received 3D image may be rotated 90 degrees by the formatter 260 in the controller 170. This operation is described below with reference to FIG. 44.

Figure 44:
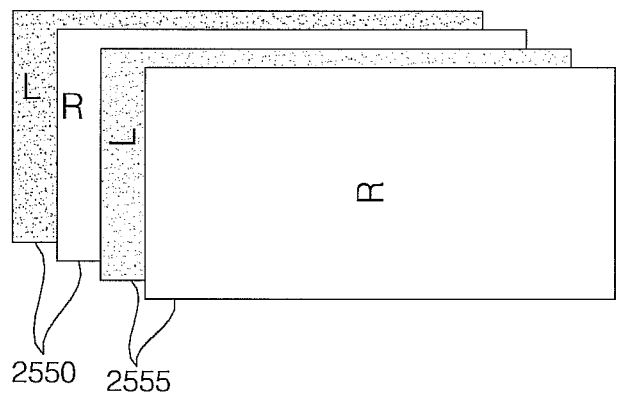

FIG. 44 illustrates an example in which a 3D image is obtained by rotating a received 3D image by 90 degrees for the frame sequential format of FIG. 3C. The formatter 260 in the controller 170 may first arrange a left-eye image (L) in time among the left-eye image (L) and a right-eye image (R) that constitute a 3D image 2550 and may subsequently arrange the right-eye image (R) in time according to the frame sequential format as shown in FIG. 44. Hence, the first and second left-eye images may be configured to be displayed prior to the first and second right-eye images, respectively, relative to time.

The formatter 260 in the controller 170 may then rotate the 3D image 2550 by 90 degrees to generate a 90°-rotated 3D image 2555 including a 90°-rotated left-eye image (L) and a 90°-rotated right-eye image (R). The formatter 260 may first arrange the 90°-rotated left-eye image (L) in time and subsequently arranges the 90°-rotated right-eye image (R) in time. Thus, the left-eye image (L), the right-eye image (R), the 90°-rotated left-eye image (L), and the 90°-rotated right-eye image (R) may be sequentially arranged. Accordingly, the first user wearing the first viewing device 195a and the second user wearing the second viewing device 195b may perceive the displayed 3D images 2410a and 2410b to be the same 3D image, as shown in FIG. 43B.

When a 3D image is transmitted in the frame sequential format as shown in FIG. 44, the image display apparatus may transmit synchronization signals sync1 and sync2 to synchronize the images with the respective viewing devices 195a and 195b, as shown in FIG. 40.

In association with the above step S3445 of FIG. 34, when the two viewing devices 195a and 195b are located at adjacent sides rather than at opposite sides, a 3D image having different views may be displayed on the two viewing devices 195a and 195b. For example, similar to FIG. 41B, multiple views of an object may be captured using a plurality of cameras. A first image (front view of object) may be captured by a first left-eye camera L1 and a first right-eye camera L2. A second image (side view of object) may be captured by a second pair of cameras, a second left-eye camera L2 and a second right-eye camera R2. Once the first and second views are received, the first image of the first view may be displayed to the first viewing device 195a at the first position, and the second image of the second view may be displayed to the second viewing device 195b at the second position. Here, the first and second views may be displayed at different times. This may allows users wearing the viewing devices 195a and 195b located at adjacent sides to perceive 3D images of different views, enjoying further improved 3D effects.

Figure 45A:
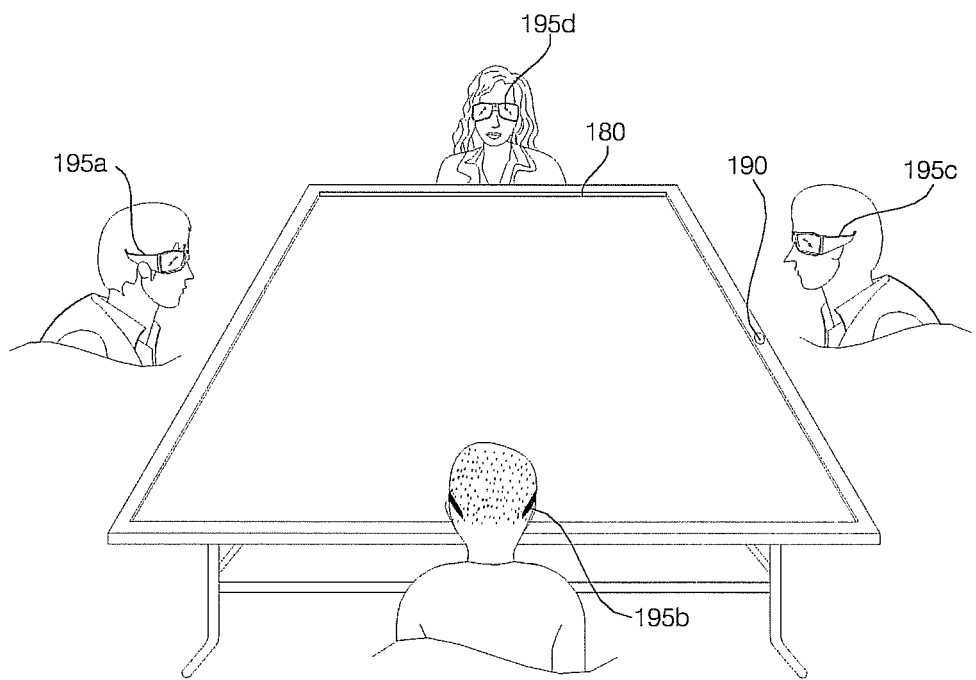

FIGS. 45A to 47 illustrate examples in which multiple 3D images are displayed on a display at different times according to a time division scheme when 3D viewing devices are located at different sides of the display. Referring to FIG. 45A, a first user wearing the first viewing device 195a may be located at the side of the lower portion of the display 180 on which the image capture unit 190 is not provided, a second user wearing the second viewing device 195*b* may be located at the side of the right portion of the display 180 which corresponds to the right side of the image capture unit 190, a third user wearing the third 3D viewing device 195*c* may be located at the side of the upper portion of the display 180 on which the image capture unit 190 is provided, and a fourth user wearing the fourth 3D viewing device 195*d* may be located at the side of the left portion of the display 180 which corresponds to the left side of the image capture unit 190.

Figure 45B:
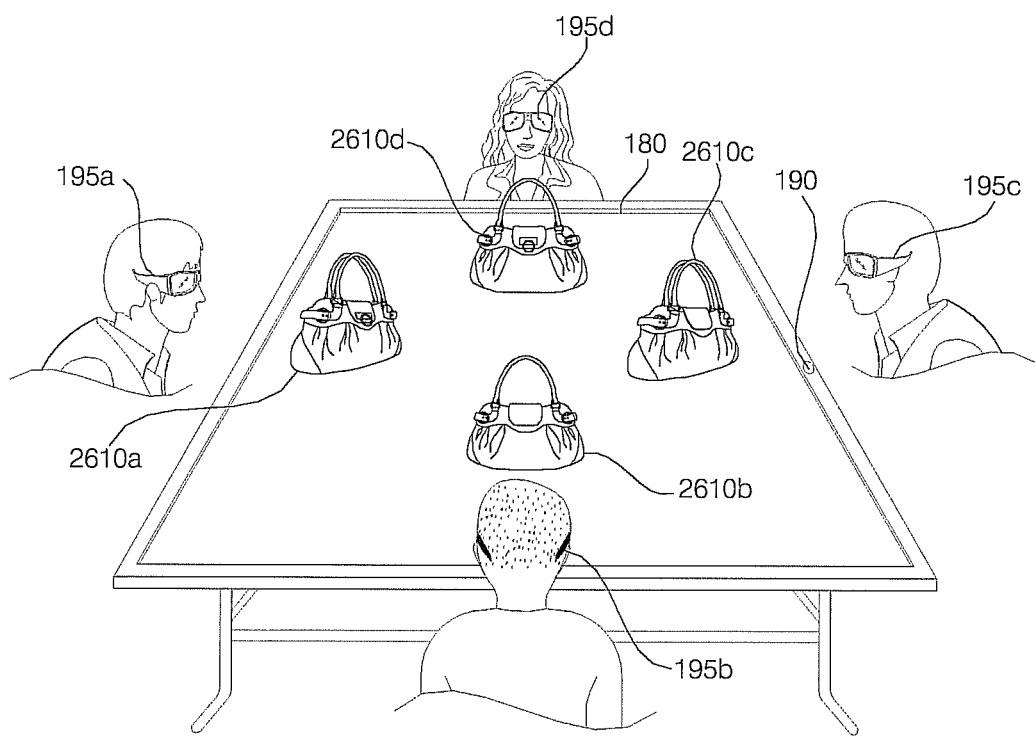

The controller 170 may display 3D images obtained using the same received 3D image to enable users wearing the first to fourth viewing devices 195*a*, 195*b*, 195*c*, and 195*d* to view the 3D images. Specifically, as shown in FIG. 45B, the controller 170 may display a received 3D image 2610*a* to be synchronized with the first viewing device 195*a*, display a 3D image 2610*b* obtained by rotating the 3D image 2610*a* by 90 degrees and synchronized with the second viewing device 195*b*, display a 3D image 2610*c* obtained by rotating the 3D image 2610*a* by 180 degrees and synchronized with the third 3D viewing device 195*c*, and display a 3D image 2610*d* obtained by rotating the 3D image 2610*b* by 270 degrees and synchronized with the fourth 3D viewing device 195*d*.

Each of the displayed 3D images 2610*a*, 2610*b*, 2610*c*, and 2610*d* may be a content related image such as a broadcast image, a web site (specifically, a news site, a magazine site, an advertisement, or the like), an electronic document screen, a video image screen, or audio player screen.

The operation to rotate the received 3D image (e.g., by 90, 180, 270 degrees) may be performed by the formatter 260 in the controller 170. This operation is described with reference to FIG. 46.

Figure 46:
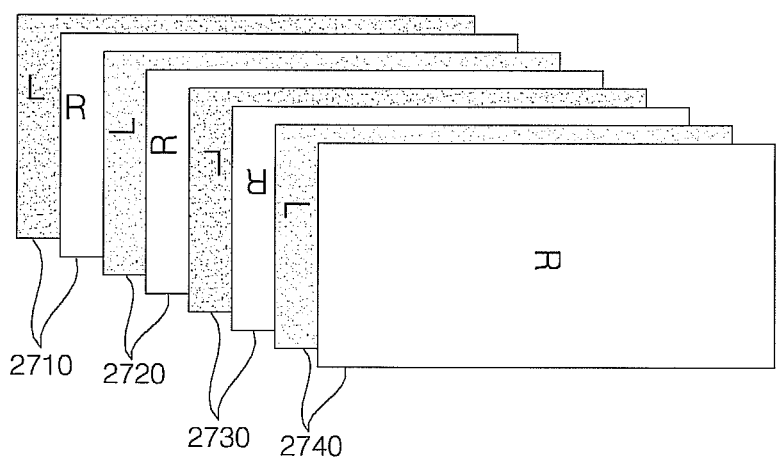

FIG. 46 illustrates an example in which a 3D image is obtained by rotating a received 3D image according to the position of each viewing device for the frame sequential format of FIG. 3C. The formatter 260 in the controller 170 may first arrange a left-eye image (L) in time among the left-eye image (L) and a right-eye image (R) that constitute a 3D image 2710 and may subsequently arrange the right-eye image (R) in time according to the frame sequential format, as shown in FIG. 46.

The formatter 260 in the controller 170 may then rotate the 3D image 2710 by 90 degrees to generate a 90°-rotated 3D image 2720 including a 90°-rotated left-eye image (L) and a 90°-rotated right-eye image (R). The formatter 260 may first arranges the 90°-rotated left-eye image (L) in time and may subsequently arrange the 90°-rotated right-eye image (R) in time.

The formatter 260 in the controller 170 may then rotate the 3D image 2710 by 180 degrees to generate a 180°-rotated 3D image 2730 including a 180°-rotated left-eye image (L) and a 180°-rotated right-eye image (R). The formatter 260 may first arrange the 180°-rotated left-eye image (L) in time and subsequently arranges the 180°-rotated right-eye image (R) in time.

The formatter 260 in the controller 170 may then rotate the 3D image 2710 by 270 degrees to generate a 270°-rotated 3D image 2740 including a 270°-rotated left-eye image (L) and a 270°-rotated right-eye image (R). The formatter 260 may first arrange the 270°-rotated left-eye image (L) in time and subsequently arranges the 270°-rotated right-eye image (R) in time.

Thus, the left-eye image (L), the right-eye image (R), the 90°-rotated left-eye image (L), the 90°-rotated right-eye image (R), the 180°-rotated left-eye image (L), the 180°-rotated right-eye image (R), the 270°-rotated left-eye image (L), and the 270°-rotated right-eye image (R) may be sequentially arranged. Accordingly, the first user wearing the first viewing device 195*a*, the second user wearing the second viewing device 195*b*, the third user wearing the third 3D viewing device 195*c*, and the fourth user wearing the fourth 3D viewing device 195*d* may each perceive the respective displayed 3D images 2610*a*, 2610*b*, 2610*c*, and 2610*d* to be the same 3D image, as shown in FIG. 45B.

Figure 47:
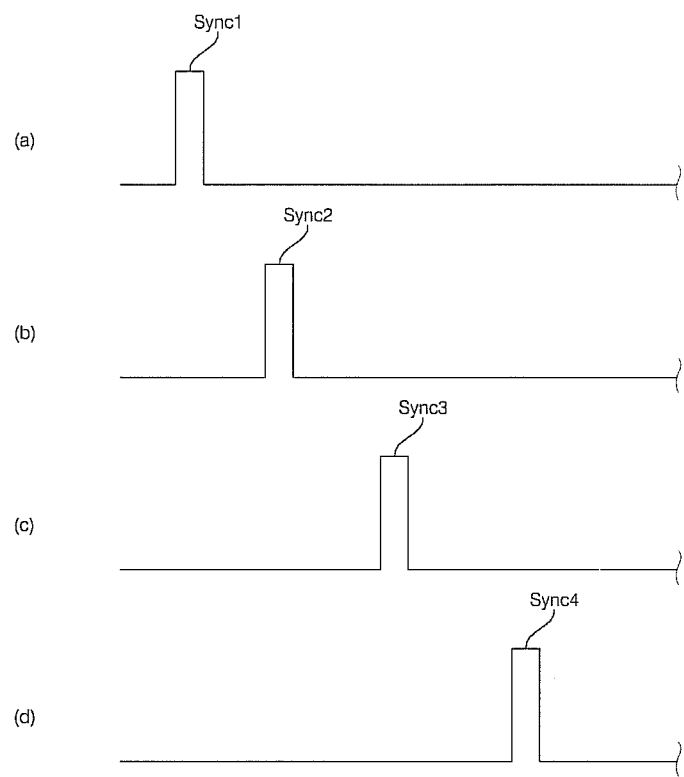

A 3D image may be transmitted in the frame sequential format, as shown in FIG. 46. Here, the image display apparatus may transmit synchronization signals to synchronize a viewing device. For example, synchronization signals sync1, sync2, sync3, and sync4 may be transmitted for synchronization with the viewing devices 195*a*, 195*b*, 195*c*, and 195*d*, as shown in FIG. 47.

Figure 48A:
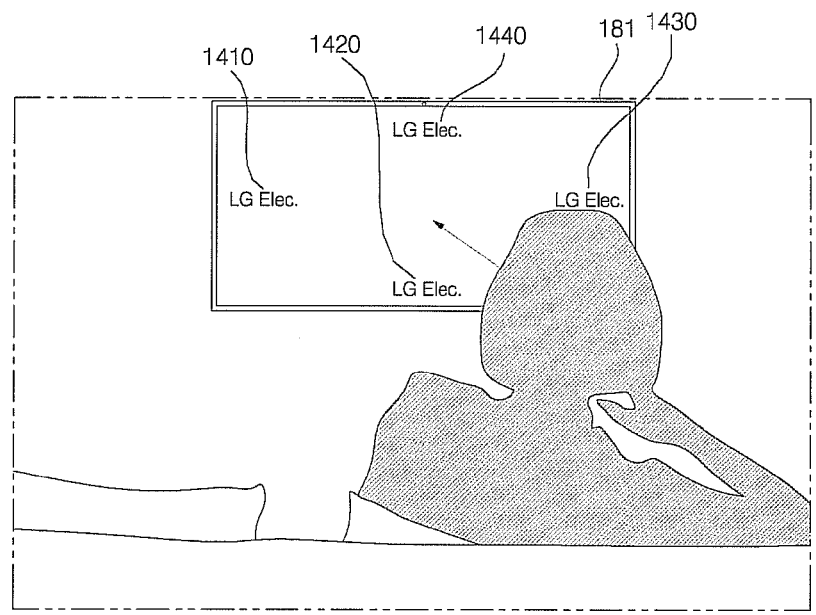
FIGS. 48A and 48B illustrate a method for operating an image display apparatus according to an embodiment of the present disclosure.
Figure 48B:
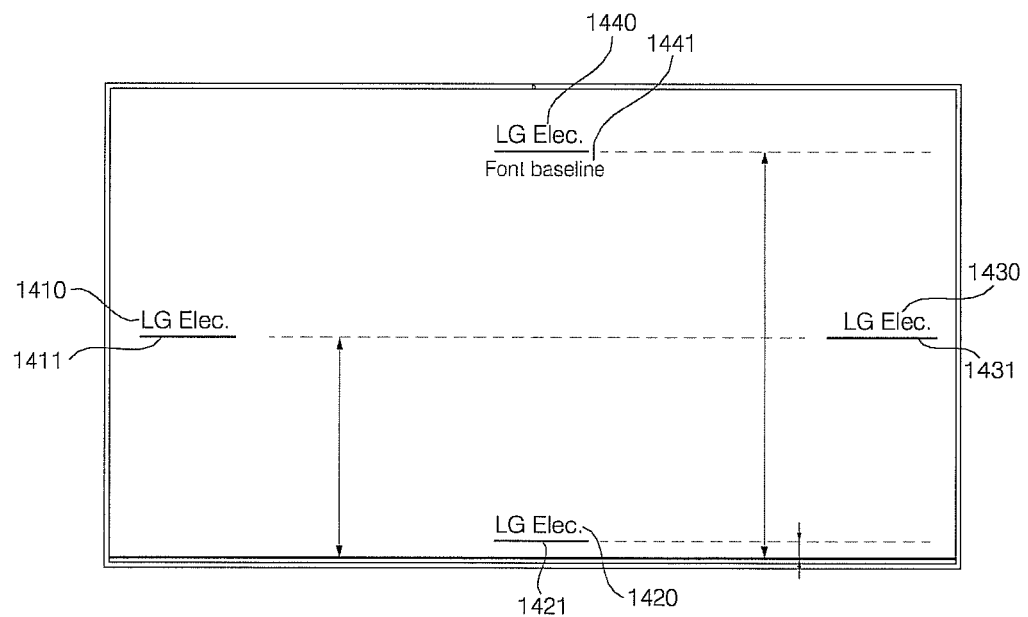

FIGS. 48A and 48B illustrate a method for operating an image display apparatus according to an embodiment of the present disclosure. More specifically, FIGS. 48A and 48B illustrate an exemplary method for displaying text on a display when the display is installed in a standard orientation. Wall-mount displays or other mount displays may be designed under the assumption that users will view the display from a single direction. Hence, the displays may be optimized for viewing from the predesigned direction, as illustrated in FIG. 48A. Accordingly, text 1410, 1420, 1430, and 1440 may also displayed in the single direction (e.g., orientation).

The displayed shape of text may vary according to font of the text and a font baseline may be used as a reference line for displaying the text. As shown in FIG. 48B, in the case of horizontal text, font baselines 1411, 1421, 1431, and 1441 for the text may be displayed parallel to the upper and lower sides of the display 180 no matter where the text is displayed and the text may be displayed along the font baselines.

Thus, an object of the present disclosure is to provide an image display apparatus and a method for operating the same, wherein screen arrangement and screen switching optimized for use of content are implemented to improve user convenience. Specifically, the present disclosure aims to provide an image display apparatus and a method for operating the same, wherein text can be displayed on a display in a manner optimized for viewing from various directions when the display is arranged horizontally.

Figure 49:
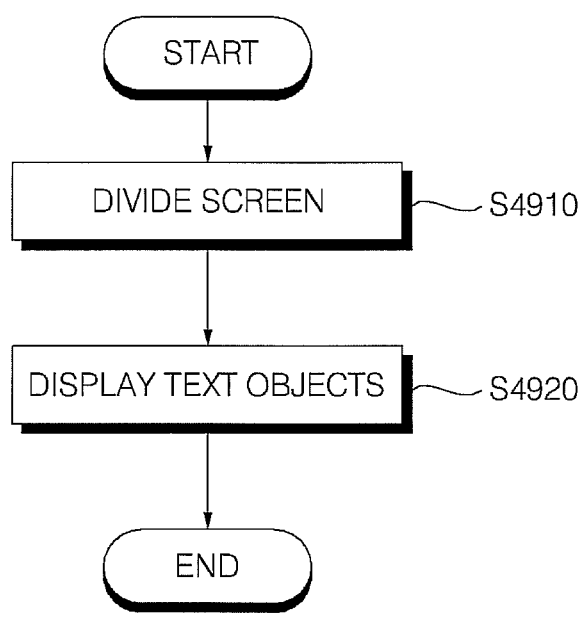
FIGS. 49 to 51 are flow charts illustrating methods for operating an image display apparatus according to an embodiment of the present disclosure.
Figure 50:
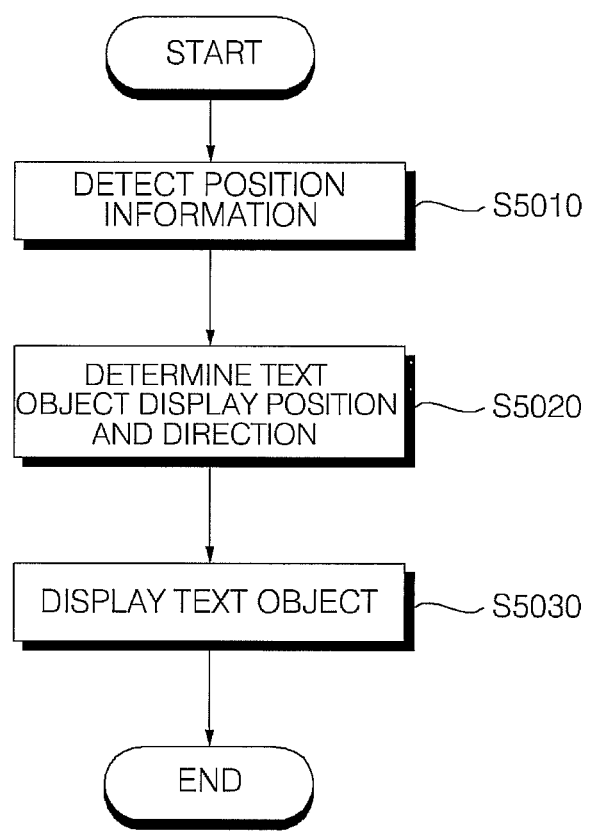
Figure 51:
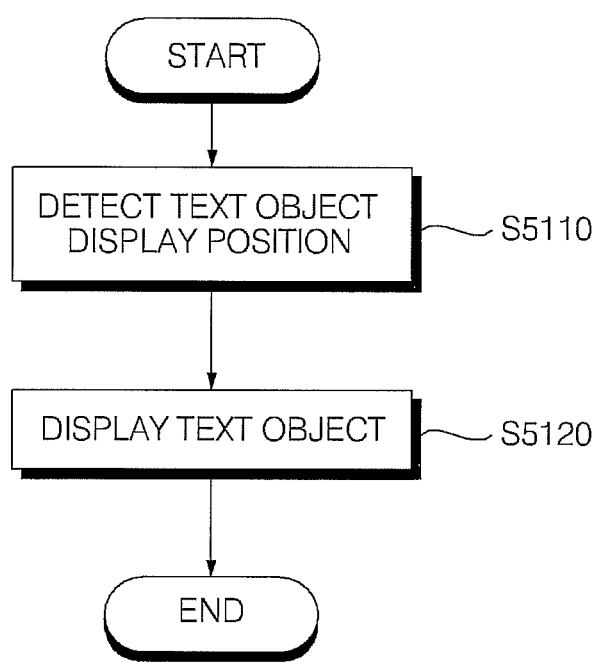

FIGS. 49 to 51 are flow charts of a method for operating an image display apparatus according to an embodiment of the present disclosure, and FIGS. 52 to 56 show various examples of the display to illustrate the method of FIGS. 49 to 51.

Referring to FIG. 49, the method for operating an image display apparatus may include a step of dividing a screen of a horizontally arranged display (e.g., table top configuration) into a plurality of regions, in step S4910. An object may then be displayed on at least one of the plurality of regions, in step S4920. Here, the object may be displayed in different directions (orientation) in the regions. The object may be a text object, an image object, or another appropriate type of object which may have a desired display orientation.

Figure 52A:
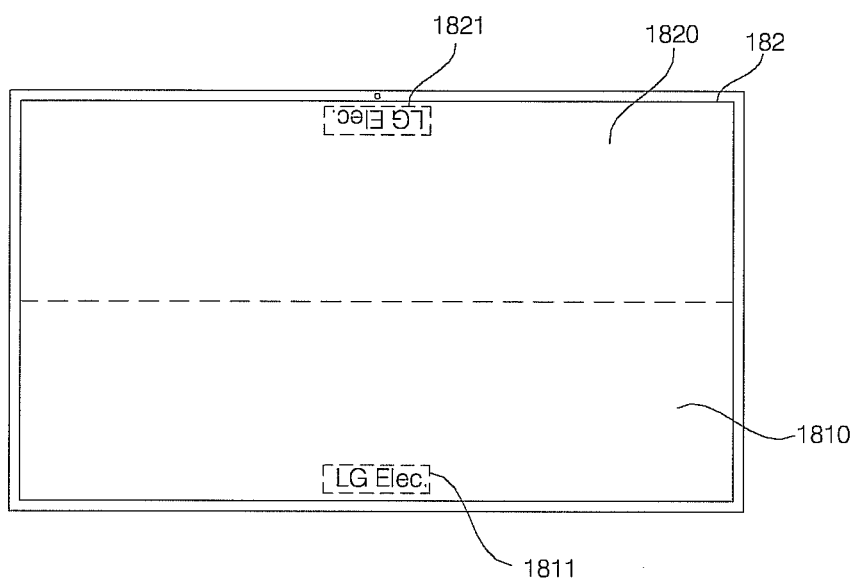
FIGS. 52A to 56 illustrate various examples of the methods for operating an image display apparatus of FIGS. 49 to 51.
Figure 52B:
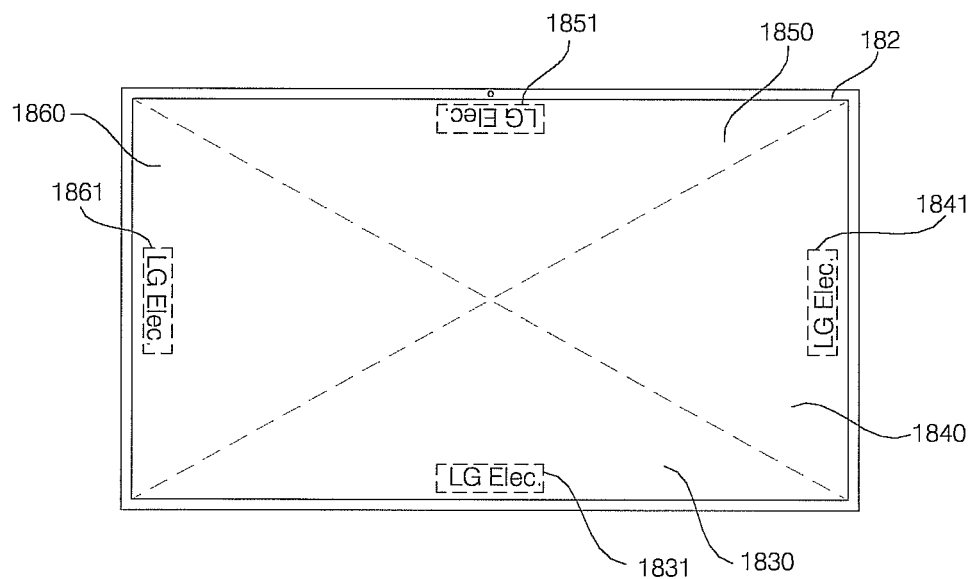

FIG. 52A illustrates an example in which the screen of the horizontally arranged display 180 is divided into two regions and FIG. 52B illustrates an example in which the screen is divided into four regions. As shown in FIGS. 52A and 52B, in the present disclosure, the text object may be displayed in different directions (e.g., orientation) inside the regions. In this manner, menus and information may be displayed to be oriented in different directions so that users who are viewing the display from different directions can view the text object from their respective directions without difficulty.

In one embodiment, the method may further include a step of detecting position information of each user, wherein the number of the plurality of regions may be equal to the number of the users and the positions of the regions may be determined according to the positions of the users. For example, if the number of detected users is 2, the screen may be divided into two regions 1810 and 1820, as shown in FIG. 52A. Here, text objects 1811 and 1821 may be displayed in different directions (orientations) in the two regions to correspond to the respective positions of the users. Moreover, if the number of detected users is 4, the screen may be divided into four regions 1830, 1840, 1850, and 1860, as shown in FIG. 52B. Here, text objects 1831, 1841, 1851, and 1861 may be displayed in different directions (orientations) in the four regions to correspond to the respective positions of the users, as shown in FIG. 52B.

In an embodiment of the present disclosure, an interface may be provided to enable both users who sit face to face to read text optimized for viewing from their respective directions when the display is horizontally arranged. For example, under the assumption that first and second users sit face to face across the display, the screen may be divided into a first and second section. The first and second sections may each occupy 50% of the screen. The first section may be assigned to the first user who sits at the same side as the first section and the second section may be assigned to the second user who sits at the same side as the second section.

Here, all text and icons displayed in the first section can be viewed from the direction of the first user while all text and icons displayed on the second section can be viewed from the direction of the second user. Moreover, an interface may be provided to display characters and text optimized for a user at each of the four sides of the display. For example, if four users are positioned at each of the four sides of a horizontally arranged display, a region of the display corresponding to each of the four sides may be configured to display objects optimized for each user's position.

It should be appreciated that the shape of the display is not limited to a rectangular shape as disclosed herein, and may have a variety of shapes, including a circular shape, square, hexagon, or the like. For example, if the display has a circular shape, it may be configured to display an object positioned and oriented at various points along the circumference thereof according to a position of the user/viewing device.

The method may further include a step of detecting position information of 3D viewing devices when 3D images are viewed using the 3D viewing devices. Here, the number of the plurality of regions may be equal to the number of the 3D viewing devices and the positions of the plurality of regions may be determined according to the positions of the 3D viewing devices.

Moreover, a font baseline may be provided in each of the one or more regions to guide the positioning of the text objects. The font baseline may be positioned in each region, parallel to one of the four corresponding sides of the display. Moreover, the font baseline may be positioned a prescribed distance from the side of the display. Hence, when the display is arranged in the horizontal configuration, the text objects may be positioned adjacent to each font baseline to correspond to the position of the user.

As shown in FIGS. 52A and 52B, the plurality of regions into which the screen is divided may have the same size. Referring again to FIG. 49, at the text object display step S4920, the number of the displayed text objects may be configured to be even and the text objects may be displayed symmetrically. For example, the screen may be divided into an even number of regions and an even number of text objects may be displayed to be symmetrical, as shown in FIGS. 52A and 52B. However, it should be appreciated that the size and position of each of the regions may be configured to be different from each other, for example, in a preference setting or by the user. In this case, the number of regions and corresponding positions may be configured based on the detected number and positions of the users.

Referring to FIG. 50, in a method for operating an image display apparatus according to an embodiment of the present disclosure, position information of a user or a 3D viewing device may be detected, in step S5010. The position and direction of a text object may be determined based on the position information of the user or the 3D viewing device, in step S5020. The text object may then be displayed on the horizontally positioned display, in step S5030. For example, an appropriate position and orientation for displaying a text object may be determined according to the detected position information of the user. Moreover, menus and information for display may also be optimized based on the position of the user.

In addition, when a 3D image is displayed, specifically, when users view 3D images using their 3D viewing devices, position information of the 3D viewing devices may be detected, appropriate positions for displaying a text object and the directions of display of the text object may be determined according to the detected position information, and menus and other types of information optimized for the positions of the users may be provided. The position information of the users or the 3D viewing devices may include at least one of the number of users or 3D viewing devices and the positions of the users or the 3D viewing devices. Here, the positions of the users or the 3D viewing devices may include a height of the user/3D viewing devices, a direction in which the user/3D viewing devices are facing, or another appropriate type of position information.

Figure 53A:
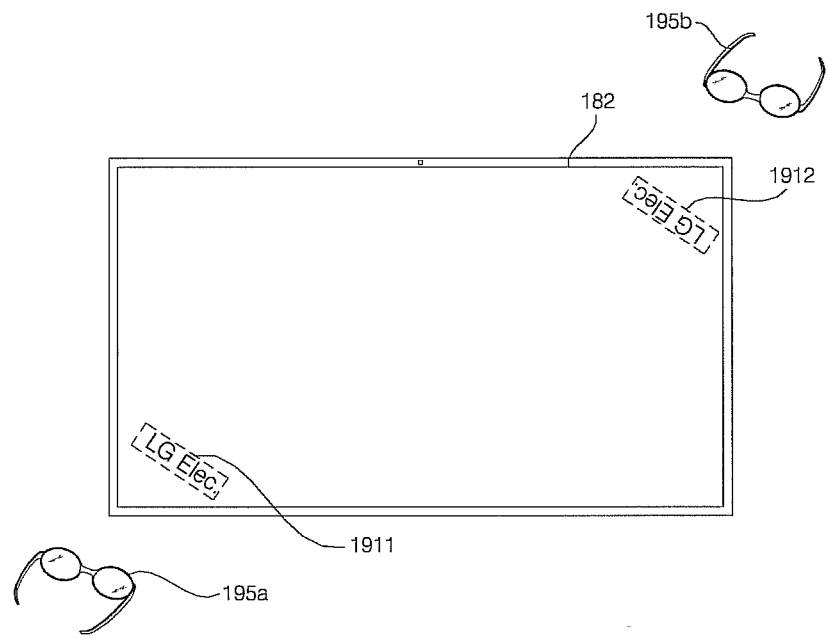

As shown in FIG. 53A, when the display 180 is arranged in a horizontal arrangement, the orientation of each text object may be controlled based on the detected position of a corresponding 3D viewing device or user. In other words, the text objects may be oriented to face the user, e.g., the bottom of the text may be directed toward the detected position of the user or 3D viewing device. Hence, when a plurality of text objects 1911 and 1912 are displayed, each of which may have the same content, the text objects 1911 and 1912 may be displayed to correspond to the position of the different 3D viewing devices 195*a* and 195*b* For example, the orientation and position of the text objects may be configured to face a respective 3D viewing device, as shown in FIG. 53A.

Figure 53B:
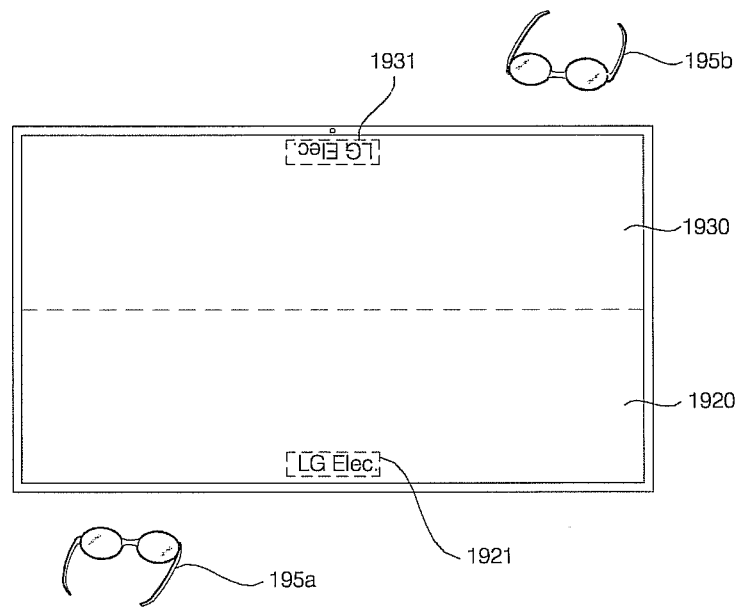

Referring to FIG. 53B, in an embodiment of the present disclosure, the display screen may be divided into a plurality of regions and the text objects 1921 and 1931 may be displayed to have different orientations in each corresponding regions 1920 and 1930, in the text object display step S5030 of FIG. 50. The number of displayed text objects may be equal to the number of detected users or 3D viewing devices. Here, a font baseline for displaying the text objects may be positioned parallel to a corresponding one of the four sides of the display, and the text object may be displayed along the font baseline.

In the text object display step S5030 of FIG. 50, the number of the displayed text objects may be configured to be even and the text objects may be displayed symmetrically. For example, the screen may be divided into an even number of regions and an even number of text objects may be displayed symmetrically to each other, as shown in FIGS. 53A and 53B.

FIG. 51 shows a flow chart of a method of operating an image display apparatus according to an embodiment of the present disclosure. This method may include determining a position for displaying a text object, in step S5110, and displaying the text object, in step S5120, as shown in FIG. 51.

Here, the text object may be displayed to be parallel to one of the four sides of the display which may be arranged horizontally.

Figure 54A:
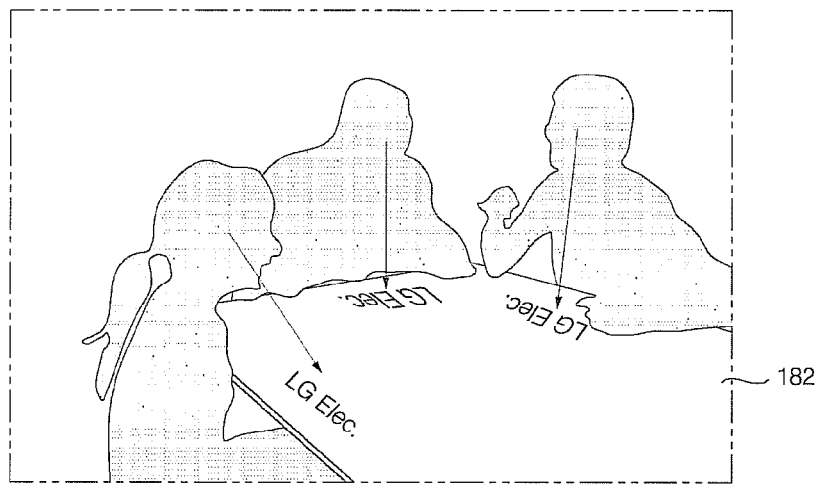

A plurality of users sitting around the horizontally arranged display 180 may view content from various directions, as shown in FIG. 54A. A user may often view the display 180 while sitting at one of the four sides of the display. Accordingly, the text object may be displayed parallel to one of the four sides of the display nearest to the user to provide information (e.g., various menus or other types of images) to the user.

Figure 54B:
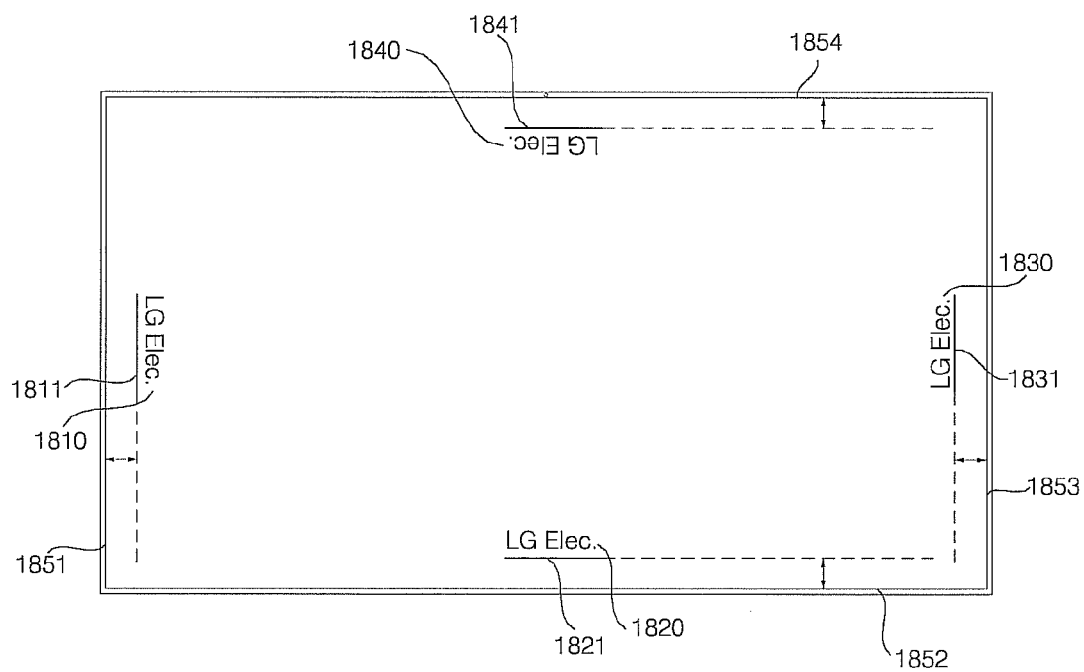

As shown in FIG. 54B, each of the font baselines 1811, 1821, 1831, and 1841 for displaying the text objects 1810, 1820, 1830, and 1840 may be positioned parallel to one of the four sides 1851, 1852, 1853, and 1854 of the display at a prescribed distance from the respective side of the display. The text objects 1810, 1820, 1830, and 1840 may then be displayed along a respective font baseline, as shown in FIG. 54B, for example, near a side of the display nearest or corresponding to a position of a user.

When a display is positioned vertically, a text object may be displayed such that the bottom of the text object is directed downward even when the text object is displayed at a position near one of the left or right side of the display. However, when the display is arranged horizontally as disclosed herein, users (or 3D viewing devices) may be located at all sides of the display. Accordingly, a text object may be displayed at a position and in a direction (or orientation) optimized according to the position of each user or the type of the text object so that the user can interact with the display regardless of the side at which they are seated.

In an embodiment, the method of FIG. 51 may further include a step of dividing the screen of the display into a plurality of regions, wherein the text object may be displayed in different directions on the regions. In another embodiment, the position determination step S5110 of FIG. 51 may further include a step of detecting position information of the users, wherein a position for displaying the text object may be determined according to the number of the detected users and the detected positions of the users.

In addition, the position determination step S5110 may further include a step of detecting position information of 3D viewing devices when a 3D image is displayed, specifically, when users view 3D images using their 3D viewing devices. Here, a position for displaying the text object may be determined according to the number of the detected 3D viewing devices and the detected positions of the 3D viewing devices.

In the text object display step S5120, the number of the displayed text objects may be even and the text objects may be displayed symmetrically from each other. For example, the display screen may be divided into an even number of regions and an even number of text objects may be displayed in symmetrical form, as shown in FIG. 54B.

While the embodiments as disclosed with reference to FIGS. 49 to 54 have been described for displaying a text object, it should be appreciated that the embodiments are not limited thereto. For example, the displayed image may be any appropriate type of object having a desired orientation for display as well as the disclosed text objects.

Figure 55:
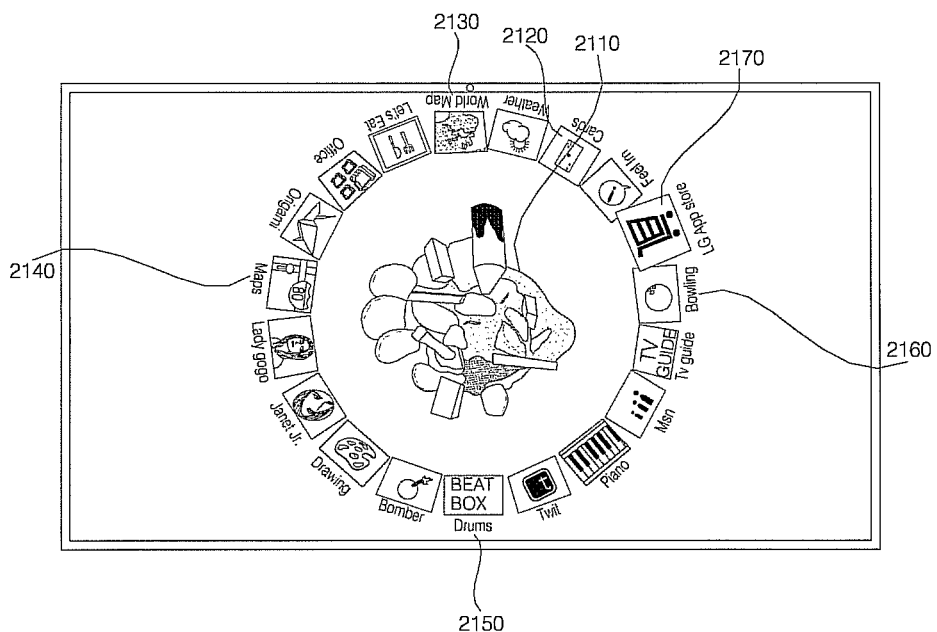

FIG. 55 illustrates an exemplary screen displayed on a horizontally arranged display. Here, a specific graphics object 2110, such as an image of a campfire, may be displayed on the display 180 that is arranged horizontally. Moreover, graphics objects 2120, 2130, 2140, 2150, 2160, and 2170 which may correspond to various menu items may be displayed on different regions of the display. The graphics object 2170 which may correspond to a selected menu item may be displayed in a different size and/or color from other objects to indicate its selection.

The graphics objects 2120, 2130, 2140, 2150, 2160, and 2170 may include text objects that are displayed in different directions, as shown in FIG. 55. The directions in which the text objects are displayed may vary according to priority levels of graphics objects included in the screen, combinations thereof, positions of the users, or the positions at which the graphics objects are displayed. The user may select one of the menu items arranged around the display and activate a corresponding function.

The menu screen of FIG. 55 may serve as a standby screen and may be used for interior decoration and mood even when content is not used on the display. For example, the menu screen of FIG. 55 may be used to allow users to sit around a virtual campfire, thereby creating a warm atmosphere. The menu screen including the virtual campfire may also be displayed in conjunction with audio playback from the display device to enable, for instance, a sing-along round a campfire. Here, lyrics of a song may also be displayed to the user and positioned near a detected user as well as oriented on the screen based on the detected positions of the user.

Figure 56:
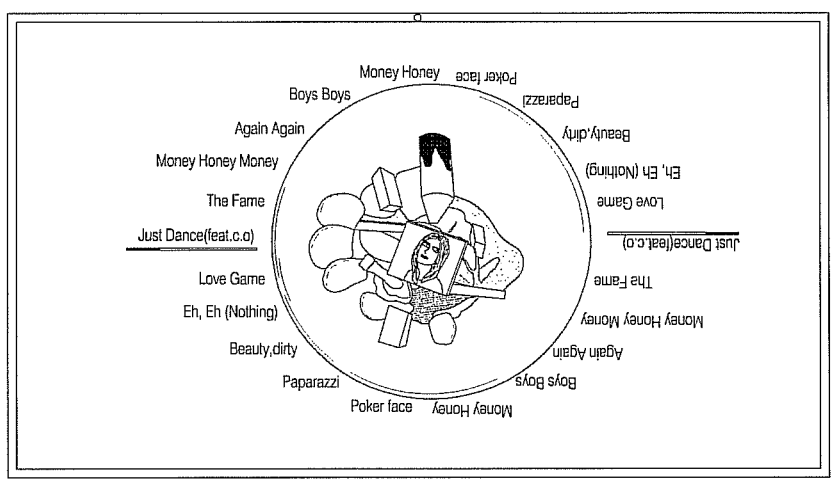

FIG. 56 illustrates that two symmetrical versions of a music content menu are displayed when two users use the music content menu. Each of the two users can control the music content menu. Each user can also conveniently control music content while using the music content no matter where the user is located.

Although the drawings mainly illustrate 3D images having a positive depth such that they appear to protrude from the display (e.g., appear to be positioned above the display), embodiments of the present disclosure may also be applied to 3D images having a negative depth such that they appear to be sunken or recessed into the display (e.g., to appear to be positioned below the display).

According to the present disclosure, using a display that is arranged horizontally, it is possible to implement a screen arrangement and screen switching optimized for use of displayed content. In addition, content (e.g., text objects) can be variously and conveniently displayed to improve user convenience and to provide enjoyment to users.

As embodied and broadly described herein, a 3D viewing device, an image display apparatus, and a method for operating the same may provide a variety of advantages. For example, a request to switch a left-eye glass and a right-eye glass of one of a first viewing device and a second viewing device for 3D image viewing may be generated upon detecting that the first viewing device and the second viewing device are located at opposite sides of a display, and the left-eye glass and the right-eye glass may be switched in response to the request, so that users may reliably (or correctly) view a 3D image or a 3D object.

Particularly, an object requesting that the left-eye and right-eye glasses be switched may be displayed on the display (e.g., a notification message). Alternatively, a message to request that the left-eye and right-eye glasses be switched may be wirelessly transmitted to each 3D viewing device. Accordingly, users may intuitively recognize the request to correct a display of a 3D object.

When the 3D viewing device is a shutter glasses type, the left-eye and right-eye glasses can be switched by switching the opening times of the left-eye and right-eye glasses. When the position of the viewing device for 3D image viewing is outside a 3D visible range, it is possible to allow users to easily and reliably (or correctly) view a 3D image or a 3D object by changing an arrangement of left-eye and right-eye images of the 3D image or 3D object without switching the left-eye and right-eye glasses of the 3D viewing device.

In an embodiment of the present disclosure, a 3D image may be moved on a display. When a movement input to move a 3D image is input, where a first viewing device and a second viewing device are located at opposite sides of a display, the 3D image may be reversed and displayed according to the movement input. This may allow the user to reliably (or correctly) view the 3D image and also to easily move the 3D image. In addition, it is also possible to allow the user to intuitively recognize movement of the 3D image by rotating and displaying the 3D image by 90 degrees before displaying the image having the changed arrangement of left-eye and right-eye images.

In an embodiment of the present disclosure, when at least two viewing devices of 3D viewing devices for 3D image viewing are located at opposite sides or at adjacent sides of the display, different 3D images may be displayed or a 3D image and a 3D image obtained by rotating the 3D image may be displayed for the at least two viewing devices. This may allow the user to reliably view a 3D image regardless of the position of the 3D viewing device of the user.

Particularly, when 3D viewing devices are located at opposite sides of the display, a received 3D image may be displayed on the display at different times according to a time division scheme or a received 3D image and a 3D image obtained by rotating the 3D image by 180 degrees may be displayed on the display according to a space division scheme, thereby allowing users to reliably view the 3D image. In addition, 3D images having opposing views may be displayed to increase the stereoscopic effects of the displayed 3D image.

When 3D viewing devices are located at adjacent sides of the display, a received 3D image may be displayed on the display at different times according to a time division scheme or a received 3D image and a 3D image obtained by rotating the received 3D image by 180 degrees may be displayed on the display in different regions thereof according to a space division scheme, thereby allowing users to reliably view the 3D image. Moreover, when 3D viewing devices are respectively located at different sides of the display, a received 3D image may be displayed on the display at different times according to a time division scheme, thereby allowing users to reliably (or correctly) view the 3D image.

Therefore, the present disclosure has been made in view of the above circumstances, and it is an object of the present disclosure to provide a 3D viewing device, an image display apparatus, and a method for operating the same, which may allow users to reliably (or correctly) view 3D images.

It is another object of the present disclosure to provide a 3D viewing device, an image display apparatus, and a method for operating the same, which may allow users to reliably (or correctly) view a 3D image on a display when the display is arranged parallel to the ground.

It is another object of the present disclosure to provide an image display apparatus and a method for operating the same, wherein a 3D image for display may be changed according to the position of a 3D viewing device.

It is another object of the present disclosure to provide an image display apparatus and a method for operating the same, wherein screen arrangement and screen switching optimized for use of content may be implemented to improve user convenience. Specifically, the present disclosure aims to provide an image display apparatus and a method for operating the same, wherein text can be displayed on a display in a manner optimized for viewing from various directions.

In accordance with an aspect of the present disclosure, the above and other objects can be accomplished by the provision of a method for operating an image display apparatus, wherein the method may include displaying a 3D image including a left-eye image and a right-eye image on a display, detecting positions of a first viewing device and a second viewing device for viewing the 3D image, and requesting that a left-eye glass and a right-eye glass of one of the first viewing device and the second viewing device be switched upon detecting that the first viewing device and the second viewing device are located at opposite sides of the display.

In accordance with an aspect of the present disclosure, there is provided a method for operating an image display apparatus, wherein the method may include displaying a 3D image including a left-eye image and a right-eye image on a display, changing an arrangement of the left-eye image and the right-eye image when a position of a viewing device for viewing the 3D image is outside a 3D visible range, and displaying a 3D image including the left-eye image and the right-eye image, the arrangement of which has been changed, on the display.

In accordance with an aspect of the present disclosure, there is provided a method for operating a 3D viewing device including a left-eye glass and a right-eye glass, wherein the method may include receiving a synchronization signal from an image display apparatus, alternately opening the left-eye glass and the right-eye glass according to the synchronization signal, and changing opening times of the left-eye glass and the right-eye glass when a position of the 3D viewing device is outside a 3D visible range of the image display apparatus.

In accordance with an aspect of the present disclosure, there is provided an image display apparatus which may include a display to display a 3D image including a left-eye image and a right-eye image, a sensor to detect positions of a first viewing device and a second viewing device to view the 3D image, and a controller to request that a left-eye glass and a right-eye glass of one of the first viewing device and the second viewing device be switched upon detecting that the first viewing device and the second viewing device are located at opposite sides of the display.

In accordance with an aspect of the present disclosure, there is provided an image display apparatus which may include a display to display a 3D image including a left-eye image and a right-eye image, a sensor to detect a position of a viewing device for viewing the 3D image, and a controller to perform a control operation to change an arrangement of the left-eye image and the right-eye image when a position of a viewing device to view the 3D image is outside a 3D visible range and to display a 3D image including the left-eye image and the right-eye image, the arrangement of which has been changed, on the display.

In accordance with an aspect of the present disclosure, there is provided a 3D viewing device which may include a left-eye glass and a right-eye glass, a wireless communication unit to receive a synchronization signal from an image display apparatus, and a controller to perform a control operation to alternately open the left-eye glass and the right-eye glass according to the synchronization signal and to change opening times of the left-eye glass and the right-eye glass when a position of the 3D viewing device is outside a 3D visible range of the image display apparatus.

In accordance with an aspect of the present disclosure, there is provided a method for operating an image display apparatus, wherein the method may include displaying a 3D image including a left-eye image and a right-eye image that are sequentially arranged on a display, receiving a movement input to move the 3D image, reversing the 3D image according to the movement input when the movement input is made to move the 3D image in a direction from a first viewing device to a second viewing device with the first and second viewing devices for viewing the 3D image being located at opposite sides of the display, and displaying the reversed 3D image on the display.

In accordance with an aspect of the present disclosure, there is provided an image display apparatus which may include a display to display a 3D image including a left-eye image and a right-eye image, a sensor to detect positions of a first viewing device and a second viewing device to view the 3D image, and a controller configured to perform a control operation to reverse the 3D image according to the movement input when the movement input is made to move the 3D image in a direction from the first viewing device to the second viewing device upon detecting that the first and second viewing devices are located at opposite sides of the display and to display the reversed 3D image on the display.

In accordance with an aspect of the present disclosure, there is provided a method for operating an image display apparatus, wherein the method may include displaying a 3D image including a left-eye image and a right-eye image that are sequentially arranged on a display, and displaying different 3D images for at least two of a plurality of 3D viewing devices or displaying a 3D image and a 3D image obtained by rotating the 3D image for the at least two viewing devices when the at least two viewing devices are located at opposite sides or at adjacent sides of the display.

In accordance with an aspect of the present disclosure, there is provided an image display apparatus which may include a display for displaying a 3D image including a left-eye image and a right-eye image, a sensor for detecting positions of viewing devices for viewing the 3D image or the number of the viewing devices, and a controller for performing a control operation for displaying different 3D images for at least two of a plurality of 3D viewing devices detected by the sensor or displaying a 3D image and a 3D image obtained by rotating the 3D image for the at least two viewing devices when the at least two viewing devices are located at opposite sides or at adjacent sides of the display.

In accordance with an aspect of the present disclosure, there is provided a method for operating an image display apparatus, wherein the method may include dividing a screen of a display that is arranged horizontally into a plurality of regions, and displaying a text object on at least one of the plurality of regions, wherein the text object may be displayed in a different direction on each of the at least one region.

In accordance with an aspect of the present disclosure, there is provided a method for operating an image display apparatus, wherein the method may include detecting position information of a user or a 3D viewing device, determining a position and a direction in which a text object is to be displayed based on the position information of the user or the 3D viewing device, and displaying the text object on a display which may be arranged horizontally.

In accordance with an aspect of the present disclosure, there is provided a method for operating an image display apparatus, wherein the method may include determining a position at which a text object is to be displayed, and displaying the text object parallel to a side nearest to the determined position among four sides of a display which may be arranged horizontally.

In accordance with an aspect of the present disclosure, there is provided an image display apparatus which may a display that is arranged horizontally, and a controller for performing a control operation for dividing a screen of the display into a plurality of regions and displaying a text object in a different direction on at least one of the plurality of regions.

As embodied and broadly disclosed herein, an image display apparatus may include a display to display a 3D image having a left-eye image and a right-eye image; a sensor to detect positions of a first viewing device and a second viewing device for viewing the 3D image; and a controller configured to request that a left-eye glass and a right-eye glass of one of the first viewing device or the second viewing device be switched if the detected positions of the first viewing device and the second viewing device correspond to opposite sides of the display. In this embodiment, the display may be positioned horizontally. When the display is positioned horizontally, at least one of a sharpness, brightness, contrast, or tint of the 3D image is changed or a size or slope of an object in the 3D image is adjusted.

In one embodiment, an image display apparatus may include a display to display a 3D image having a left-eye image and a right-eye image; a sensor to detect a position of a viewing device for viewing the 3D image; and a controller configured to change an arrangement of the left-eye image and the right-eye image when the position of a viewing device for viewing the 3D image is beyond a 3D visible range and to display the changed 3D image including the left-eye image and the right-eye image on the display.

In one embodiment, a 3D viewing device may include a left lens and a right lens; a wireless communication interface that receives a synchronization signal from an image display apparatus; and a controller configured to alternately activate the left lens and the right lens based on a first timing in response to the synchronization signal and to change the first timing of the left and right lenses to a second timing when a position of the 3D viewing device is beyond of a 3D visible range of the image display apparatus.

The second timing may activate the left and right lenses at opposite intervals with respect to the first timing. The timing of the left and right lenses may be changed if another 3D viewing device is positioned at an opposite side of the image display apparatus.

In one embodiment, a method for operating an image display apparatus may include displaying a 3D image having a left-eye image and a right-eye image on a display; detecting positions of a first viewing device and a second viewing device for viewing the 3D image; and requesting that a left-eye glass and a right-eye glass of one of the first viewing device or the second viewing device be switched if the detected positions of the first viewing device and the second viewing device correspond to opposite sides of the display. In this embodiment, if the display is positioned horizontally, the method may include changing at least one of a sharpness, brightness, contrast, or tint of the 3D image or adjusting a size or slope of an object in the 3D image.

In one embodiment, a method for operating an image display apparatus may include displaying a 3D image having a left-eye image and a right-eye image on a display; changing an arrangement of the left-eye image and the right-eye image when a position of a viewing device for viewing the 3D image is beyond a 3D visible range; and displaying the changed 3D image including the left-eye image and the right-eye image on the display.

In one embodiment, a method for operating a 3D viewing device having a left lens and a right lens may include receiving a synchronization signal from an image display apparatus; alternately activating the left lens and the right lens based on a first timing in response to the synchronization signal; and changing the first timing of the left and right lenses to a second timing when a position of the 3D viewing device is beyond a 3D visible range of the image display apparatus.

In one embodiment, an image display apparatus may include a display to display a 3D image; a sensor to detect positions of a first viewing device and a second viewing device for viewing the 3D image; and a controller configured to reconfigure the 3D image in response to an input to move the 3D image from a first position on the display corresponding to a first viewing device to a second position on the display corresponding to a second viewing device, wherein the first and second viewing devices may be positioned near different sides of the display, and to display the reconfigured 3D image at the second position on the display. In this embodiment, the 3D image may be reconfigured by rotating the 3D image on the display by 180 degrees in response to the input if the first and second viewing devices are positioned near opposite sides of the display.

In one embodiment, a method for operating an image display apparatus may include displaying a 3D image on a display having a left-eye image and a right-eye image; receiving an input to move the 3D image; reconfiguring the 3D image in response to the input if the input is to move the 3D image from a first position on the display corresponding to a first viewing device to a second position on the display corresponding to a second viewing device, wherein the first and second viewing devices may be positioned at opposite sides of the display; and displaying the reconfigured 3D image at the second position on the display.

In one embodiment, an image display apparatus may include a display to display a plurality of 3D images; a plurality of viewing devices for viewing a corresponding one of the plurality of 3D images; a sensor to detect positions of the plurality of viewing devices; and a controller configured to control a display of the plurality of 3D images to the plurality of viewing devices, wherein a first 3D image may be displayed at a first position on the display corresponding to a position of a first viewing device, a second 3D image may be displayed at a second position on the display corresponding to a position of a second viewing device, wherein the second 3D image may be a different 3D image than the first 3D image or the second 3D image may be a rotated version of the first 3D image, and wherein the second 3D image may be displayed at the second position corresponding to the position of the second viewing device if the first and second viewing devices are positioned at different sides of the display.

In this embodiment, the first 3D image and the second 3D image obtained by rotating the first 3D image by 180 degrees may be displayed in different regions of the display or at different times when the first viewing device and the second viewing device are positioned at opposite sides of the display. The first 3D image and the second 3D image obtained by rotating the first 3D image by 90 degrees may also be displayed in different regions of the display or at different times when the first viewing device and the second viewing device are positioned at adjacent sides of the display. Moreover, the first 3D image, the second 3D image obtained by rotating the first 3D image by 90 degrees, a third 3D image obtained by rotating the first 3D image by 180 degrees, and a fourth 3D image obtained by rotating the first 3D image by 270 degrees may be displayed in different regions of the display or at different times when a first to fourth viewing devices that correspond to the first to fourth 3D images are positioned at different sides of the display.

In one embodiment, a method for operating an image display apparatus may include displaying a first 3D image on a display at a first position corresponding to a position of a first viewing device; and displaying a second 3D image on the display at a second position corresponding to a position of a second viewing device, wherein the second 3D image may be a different 3D image than the first 3D image or the second 3D image may be a rotated version of the first 3D image, and wherein the second 3D image may be displayed at the second position that corresponds to the position of the second viewing device if the first and second viewing devices are positioned at different sides of the display.

In one embodiment, a method for operating an image display apparatus may include dividing a screen of a display into a plurality of regions, wherein the screen of the display may be positioned substantially horizontal; and displaying a text object on at least one of the plurality of regions, wherein the text object may be displayed to have a different orientation for each of the plurality of regions.

In this embodiment, this method may further include detecting a position of a user or a 3D viewing device relative to the display; determining a position and an orientation of the text object for display on the display that corresponds to the detected position of the user or the 3D viewing device; and displaying the text object on the display based on the determined position and orientation. Moreover, the displaying the text object may include displaying the text object to be parallel to a side of the display which is nearest to the determined position of the user or the 3D viewing device.

In one embodiment, an image display apparatus may include a display having a display screen that is positioned substantially horizontal; and a controller configured to divide the display screen into a plurality of regions and to display a text object on at least one of the plurality of regions, wherein the text object is displayed to have a different orientation for each of the plurality of regions.

As embodied and broadly disclosed herein, an image display apparatus may include one or more 3D glasses; a 3D display for displaying a 3D object for viewing with the one or more 3D glasses, wherein a display screen of the 3D display may be positioned substantially horizontal; and a controller configured to control the display of the 3D object corresponding to a position of the one or more 3D glasses. Here, the 3D object may have a first depth of perception when viewed with the 3D glasses from a first direction and a second depth of perception when viewed with the 3D glasses from a second direction. In this embodiment, controller may change the first or second depth of perception such that the 3D object viewed from the first and second directions have the same depth of perception.

In this embodiment, the controller may change a configuration of at least one of the 3D glasses to change the perceived view of the 3D object from the first or second direction. The 3D object may include a left-eye image corresponding to a left-eye lens of the one or more 3D glasses and a right-eye image corresponding to a right-eye lens of the one or more 3D glasses, and wherein the controller may change the display of the 3D object such that the right-eye lens corresponds to the left-eye image and the left-eye lens corresponds to the right-eye image. The controller may reconfigure a synchronization of the at least one 3D glasses to change the perceived view of the 3D object through the at least one 3D glasses. Moreover, the controller may also generate a message for display on the display or for transmission to the at least one 3D glasses to change a polarization of the at least one 3D glasses.

In this embodiment, the controller may change a display configuration of the left-eye image and the right-eye image of the 3D object on the display to change the perceived view of the 3D object from the first or second direction. Here, changing the display configuration may include repositioning the left-eye image and the right-eye image on the display to change the perceived view of the 3D object through at least one of the 3D glasses. Moreover, the 3D object may include a plurality of 3D images that correspond to a plurality of views of the 3D object from different directions, wherein the one or more 3D glasses may be configured to view an image that correspond to its position relative to the display. The controller may also control a display of a plurality of 3D objects, the one or more 3D glasses being configured to view at least one of the plurality of 3D objects.

The method for operating an image display apparatus according to the present disclosure can be embodied as processor readable code stored on a processor readable medium provided in the image display apparatus. The processor readable medium may include any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display apparatus comprising:
    a display to display a 3D image having a left-eye image and a right-eye image;
    a sensor to detect positions of a first viewing device and a second viewing device for viewing the 3D image; and
    a controller configured to request that a left-eye glass and a right-eye glass of one of the first viewing device or the second viewing device be switched if the detected positions of the first viewing device and the second viewing device correspond to opposite sides of the display,
    wherein the controller is configured to control the display to display an object requesting one of the first viewing device or the second viewing device to switch the left-eye and right-eye glasses, or to transmit a request to switch the left-eye and right-eye glasses to one of the first viewing device or the second viewing device, and
    wherein the direction of the displayed object is determined according to the one of the first viewing device or the second viewing device for which the left-eye and right-eye glasses are to be switched.

2. The image display apparatus of claim 1, wherein the display is positioned horizontally.

3. The image display apparatus of claim 1, wherein, when the display is positioned horizontally, at least one of a sharpness, brightness, contrast, or tint of the 3D image is changed or a size or slope of an object in the 3D image is adjusted.

4. A method for operating an image display apparatus, the method comprising:
    displaying a 3D image having a left-eye image and a right-eye image on a display;
    detecting positions of a first viewing device and a second viewing device for viewing the 3D image; and
    requesting that a left-eye glass and a right-eye glass of one of the first viewing device or the second viewing device be switched if the detected positions of the first viewing device and the second viewing device correspond to opposite sides of the display,
    wherein the requesting step includes displaying an object requesting one of the first viewing device or the second viewing device to switch the left-eye and right-eye glasses, or transmitting a request to switch the left-eye and right-eye glasses to one of the first viewing device or the second viewing device, and
    wherein the direction of the displayed object is determined according to the one of the first viewing device or the second viewing device for which the left-eye and right-eye glasses are to be switched.

5. The method according to claim 4, wherein, if the display is positioned horizontally, changing at least one of a sharpness, brightness, contrast, or tint of the 3D image or adjusting a size or slope of an object in the 3D image.

6. The image display apparatus of claim 1, wherein the controller is configured to reconfigure the 3D image in response to an input to move the 3D image from a first position on the display corresponding to a first viewing device to a second position on the display corresponding to a second viewing device, wherein the first and second viewing devices are positioned near different sides of the display, and to display the reconfigured 3D image at the second position on the display.

7. The image display apparatus of claim 6, wherein the 3D image is reconfigured by rotating the 3D image on the display by 180 degrees in response to the input if the first and second viewing devices are positioned near opposite sides of the display.

8. The method according to claim 4, further comprising:
    receiving an input to move the 3D image;
    reconfiguring the 3D image in response to the input if the input is to move the 3D image from a first position on the display corresponding to a first viewing device to a second position on the display corresponding to a second viewing device, wherein the first and second viewing devices are positioned at opposite sides of the display; and
    displaying the reconfigured 3D image at the second position on the display.

9. An image display apparatus comprising:
    a display to display a plurality of 3D images;
    a plurality of viewing devices for viewing a corresponding one of the plurality of 3D images;
    a sensor to detect positions of the plurality of viewing devices; and
    a controller configured to control a display of the plurality of 3D images to the plurality of viewing devices, wherein a first 3D image is displayed at a first position on the display corresponding to a position of a first viewing device, a second 3D image is displayed at a second position on the display corresponding to a position of a second viewing device, wherein the second 3D image is a different 3D image than the first 3D image or the second 3D image is a rotated version of the first 3D image, and wherein the second 3D image is displayed at the second position corresponding to the position of the second viewing device if the first and second viewing devices are positioned at different sides of the display, and wherein the first 3D image, the second 3D image obtained by rotating the first 3D image by 90 degrees, a third 3D image obtained by rotating the first 3D image by 180 degrees, and a fourth 3D image obtained by rotating the first 3D image by 270 degrees are displayed in different regions of the display or at different times when a first to fourth viewing devices that correspond to the first to fourth 3D images are positioned at different sides of the display.

10. The image display apparatus of claim 9, wherein the first 3D image and the second 3D image obtained by rotating the first 3D image by 180 degrees are displayed in different regions of the display or at different times when the first viewing device and the second viewing device are positioned at opposite sides of the display.

11. The image display apparatus of claim 9, wherein the first 3D image and the second 3D image obtained by rotating the first 3D image by 90 degrees are displayed in different regions of the display or at different times when the first viewing device and the second viewing device are positioned at adjacent sides of the display.

12. A method for operating an image display apparatus, the method comprising:

displaying a first 3D image on a display at a first position corresponding to a position of a first viewing device; and displaying a second 3D image on the display at a second position corresponding to a position of a second viewing device, wherein the second 3D image is a different 3D image than the first 3D image or the second 3D image is a rotated version of the first 3D image, and wherein the second 3D image is displayed at the second position that corresponds to the position of the second viewing device if the first and second viewing devices are positioned at different sides of the display, and wherein the first 3D image, the second 3D image obtained by rotating the first 3D image by 90 degrees, a third 3D image obtained by rotating the first 3D image by 180 degrees, and a fourth 3D image obtained by rotating the first 3D image by 270 degrees are displayed in different regions of the display or at different times when a first to fourth viewing devices that correspond to the first to fourth 3D images are positioned at different sides of the display.

13. The method of claim 4, further comprising:

dividing the screen of a display into a plurality of regions, wherein the screen of the display is positioned substantially horizontal; and displaying a text object on at least one of the plurality of regions, wherein the text object is displayed to have a different orientation for each of the plurality of regions.

14. The method of claim 13, further comprising detecting a position of a user or a 3D viewing device relative to the display;

determining a position and an orientation of the text object for display on the display that corresponds to the detected position of the user or the 3D viewing device; and displaying the text object on the display based on the determined position and orientation.

15. A method for operating an image display apparatus, the method comprising:

displaying a 3D image having a left-eye image and a right-eye image on a display;

detecting positions of a first viewing device and a second viewing device for viewing the 3D image;

requesting that a left-eye glass and a right-eye glass of one of the first viewing device or the second viewing device be switched if the detected positions of the first viewing device and the second viewing device correspond to opposite sides of the display;

dividing the screen of a display into a plurality of regions, wherein the screen of the display is positioned substantially horizontal;

displaying a text object on at least one of the plurality of regions, wherein the text object is displayed to have a different orientation for each of the plurality of regions detecting a position of a user or a 3D viewing device relative to the display;

determining a position and an orientation of the text object for display on the display that corresponds to the detected position of the user or the 3D viewing device; and displaying the text object on the display based on the determined position and orientation, wherein the displaying the text object includes displaying the text object to be parallel to a side of the display which is nearest to the determined position of the user or the 3D viewing device.

16. The image display apparatus of claim 1, wherein the display has a display screen that is positioned substantially horizontal, and the controller divides the display screen into a plurality of regions and controls to display a text object on at least one of the plurality of regions, wherein the text object is displayed to have a different orientation for each of the plurality of regions.

* * * * *